(12) United States Patent
Moreira Rodrigues et al.

(10) Patent No.: US 11,900,652 B2
(45) Date of Patent: Feb. 13, 2024

(54) METHOD AND COMPUTING SYSTEM FOR GENERATING A SAFETY VOLUME LIST FOR OBJECT DETECTION

(71) Applicant: MUJIN, INC., Tokyo (JP)

(72) Inventors: Jose Jeronimo Moreira Rodrigues, Tokyo (JP); Rosen Nikolaev Diankov, Tokyo (JP); Jinze Yu, Tokyo (JP); Ahmed Abouelela, Tokyo (JP); Yoshiki Kanemoto, Tokyo (JP)

(73) Assignee: MUJIN, INC., Tokyo (JP)

( * ) Notice: Subject to any disclaimer, the term of this patent is extended or adjusted under 35 U.S.C. 154(b) by 343 days.

(21) Appl. No.: 17/193,253

(22) Filed: Mar. 5, 2021

(65) Prior Publication Data
US 2022/0284216 A1 Sep. 8, 2022

(51) Int. Cl.
| | |
|---|---|
| *B25J 13/00* | (2006.01) |
| *G06V 10/75* | (2022.01) |
| *B25J 13/08* | (2006.01) |
| *B25J 9/16* | (2006.01) |
| *G06V 20/10* | (2022.01) |
| *G06V 10/25* | (2022.01) |

(Continued)

(52) U.S. Cl.
CPC .......... *G06V 10/751* (2022.01); *B25J 9/1666* (2013.01); *B25J 9/1697* (2013.01); *B25J 13/08* (2013.01);
(Continued)

(58) Field of Classification Search
CPC .... G06V 10/751; G06V 10/25; G06V 10/443; G06V 20/10; G06V 20/647;
(Continued)

(56) References Cited

U.S. PATENT DOCUMENTS

| 9,327,406 B1 * | 5/2016 | Hinterstoisser ........ B25J 9/1697 |
| 10,596,707 B2 * | 3/2020 | Katagiri ................. B25J 9/0093 |

(Continued)

FOREIGN PATENT DOCUMENTS

| JP | 1031742 A | 2/1998 |
| JP | 2018055429 A | 4/2018 |

(Continued)

OTHER PUBLICATIONS

Office Action dated Jul. 7, 2021, in Japanese Application No. 2021-078862 (with English Translation).

*Primary Examiner* — Adam R Mott
*Assistant Examiner* — Shaheda Shabnam Hoque
(74) *Attorney, Agent, or Firm* — MEDLER FERRO WOODHOUSE & MILLS PLLC

(57) ABSTRACT

A method and computing system for performing the method are presented. The method may include receiving image information representing an object; identifying a set of one or more matching object recognition templates associated with a set of one or more detection hypotheses. The method may further include selecting a primary detection hypothesis associated with a matching object recognition template; generating a primary candidate region based on the matching object recognition template; determining at least one of: (i) whether the set of one or more matching object recognition templates has a subset of one or more remaining matching templates, or (ii) whether the image information has a portion representing an unmatched region; and generating a safety volume list based on at least one of: (i) the unmatched region, or (ii) one or more additional candidate regions that are generated based on the subset of one or more remaining matching templates.

23 Claims, 58 Drawing Sheets

(51) Int. Cl.
*G06V 10/44* (2022.01)
*G06V 20/64* (2022.01)

(52) U.S. Cl.
CPC ............ *G06V 10/25* (2022.01); *G06V 10/443* (2022.01); *G06V 20/10* (2022.01); *G06V 20/647* (2022.01)

(58) Field of Classification Search
CPC .. G06V 10/245; G06V 2201/06; G06V 10/54; B25J 9/1666; B25J 9/1697; B25J 13/08; G05B 2219/31304; G05B 19/4183
See application file for complete search history.

(56) References Cited

U.S. PATENT DOCUMENTS

| | | | |
|---|---|---|---|
| 10,803,615 | B2* | 10/2020 | Konishi ................. G06V 20/64 |
| 11,117,261 | B2* | 9/2021 | Mori ...................... B25J 9/1666 |
| 2008/0181485 | A1* | 7/2008 | Beis ....................... B25J 9/1697 |
| | | | 382/209 |
| 2017/0177970 | A1* | 6/2017 | Kitajima ................. G06F 18/22 |
| 2018/0093377 | A1* | 4/2018 | Bradski .................. G06V 20/64 |
| 2018/0126553 | A1* | 5/2018 | Corkum ................. B25J 9/1697 |
| 2018/0290307 | A1* | 10/2018 | Watanabe ................ G06T 7/97 |
| 2019/0039247 | A1* | 2/2019 | Katagiri ................ G05B 19/402 |
| 2019/0197727 | A1* | 6/2019 | Konishi ............... G06V 10/751 |
| 2019/0224847 | A1* | 7/2019 | Mori ........................ G06T 7/70 |
| 2023/0040040 | A1* | 2/2023 | Ennsbrunner .......... B25J 9/1676 |

FOREIGN PATENT DOCUMENTS

| | | |
|---|---|---|
| JP | 201925634 A | 2/2019 |
| JP | 2019114103 A | 7/2019 |
| JP | 2019126866 A | 8/2019 |

* cited by examiner

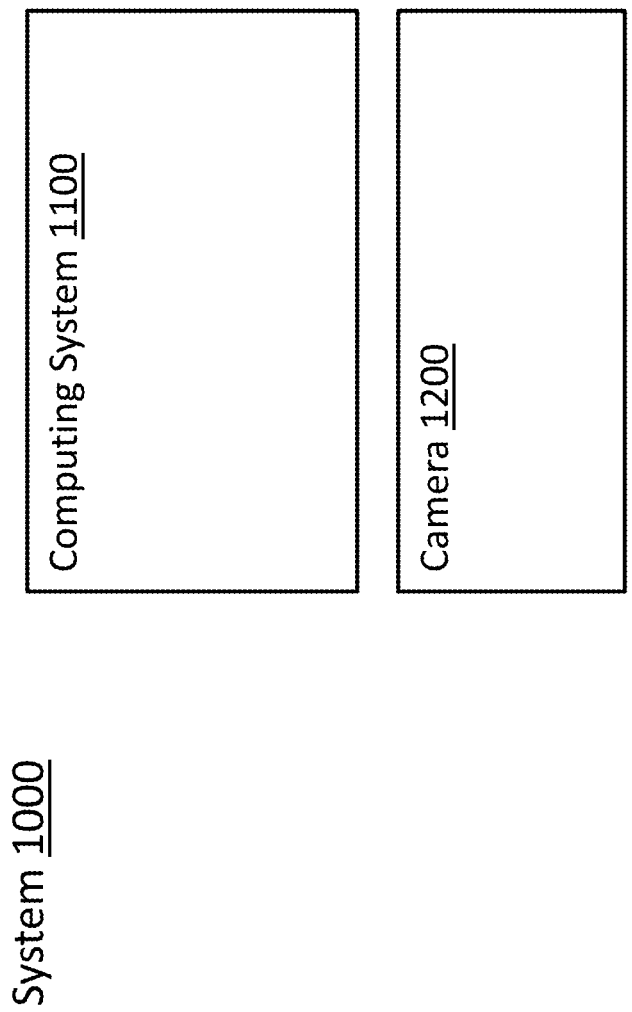

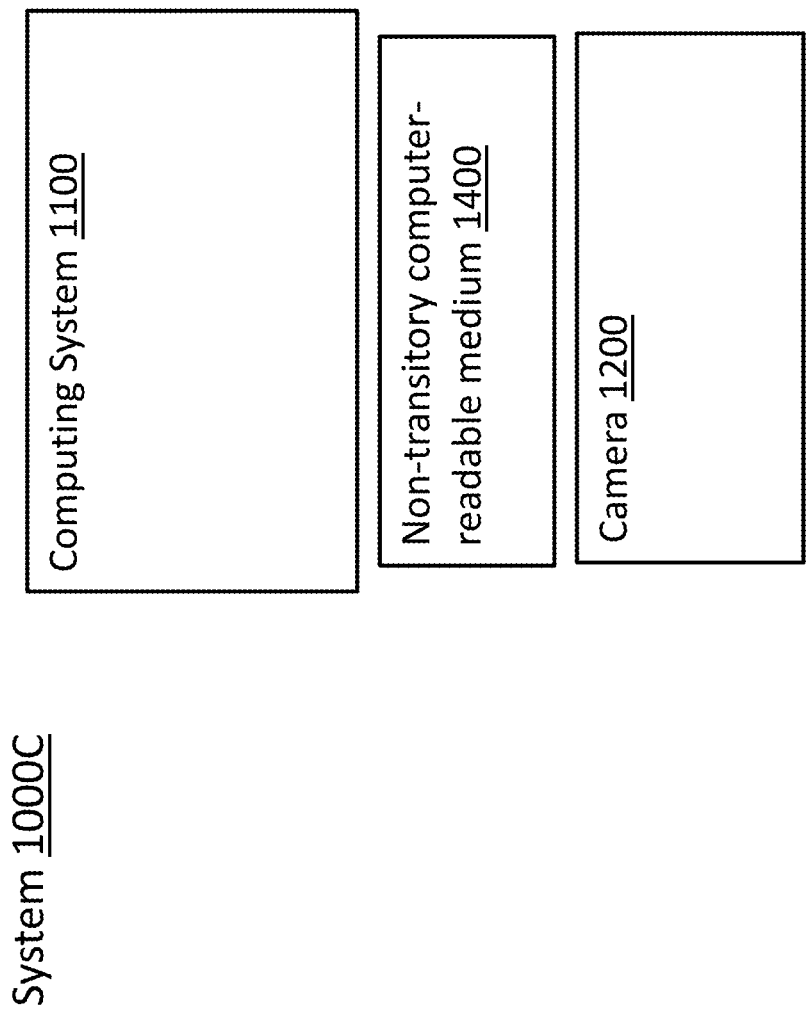

Object detection Information 6126

| Template | Detection hypothesis | Confidence Value |
|---|---|---|
| 6122A$_1$ | Detection hypothesis A$_1$: Image information represents object or object type corresponding to template 6122A$_1$ | 0.99 |
| 6122A$_2$ | Detection hypothesis A$_2$: Image information represents object or object type corresponding to template 6122A$_2$ | 0.93 |
| 6122A$_3$ | Detection hypothesis A$_3$: Image information represents object or object type corresponding to template 6122A$_3$ | 0.927 |
| 6122A$_4$ | Detection hypothesis A$_4$: Image information represents object or object type corresponding to template 6122A$_4$ | 0.2 |
| 6122A$_5$ | Detection hypothesis A$_5$: Image information represents object or object type corresponding to template 6122A$_5$ | 0.12 |

FIG. 6C

Object detection Information 6126

Primary detection hypothesis:

- Detection hypothesis $A_1$: Image information represents object or object type corresponding to Template $6122A_1$ Safety volume list:

Secondary detection hypotheses:

- Detection hypothesis $A_2$: Image information represents object or object type corresponding to Template $6122A_2$

- Detection hypothesis $A_3$: Image information represents object or object type corresponding to Template $6122A_3$

FIG. 6D

| Object detection information 7126 | Confidence value associated with detection hypotheses |
|---|---|
| Primary detection hypothesis: | |
| Detection hypothesis $7A_1$: Image information represents object or object type corresponding to Template $7122A_1$ | 0.93 |
| Safety volume list: | |
| Secondary detection hypothesis: | |
| Detection hypothesis $7B_1$: Image information represents object or object type corresponding to Template $7122B_1$ | 0.85 |

FIG. 7B

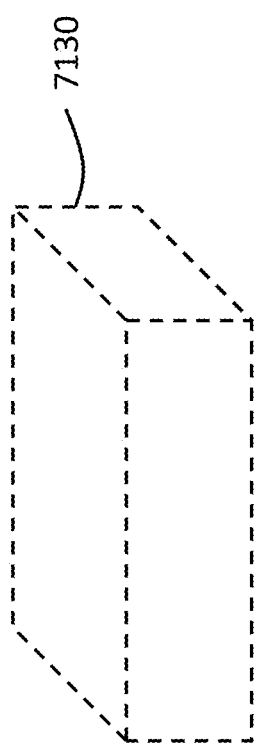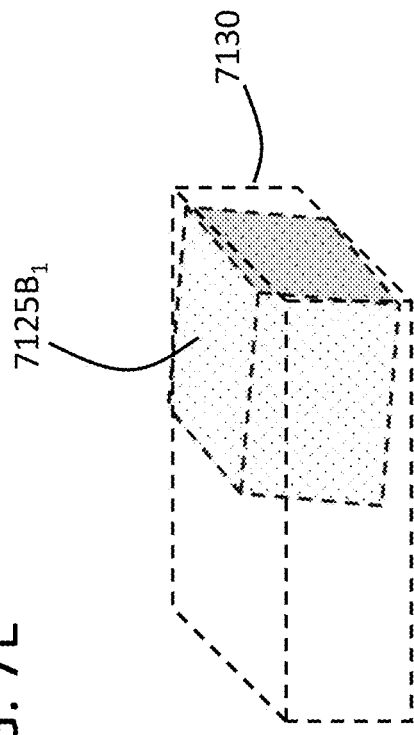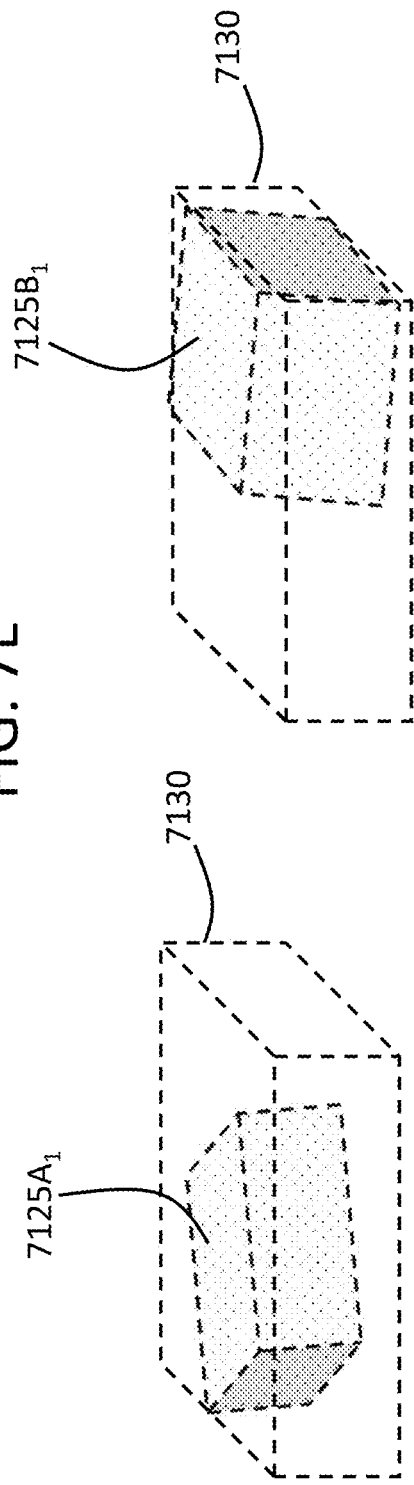
FIG. 7E
FIG. 7G
FIG. 7F

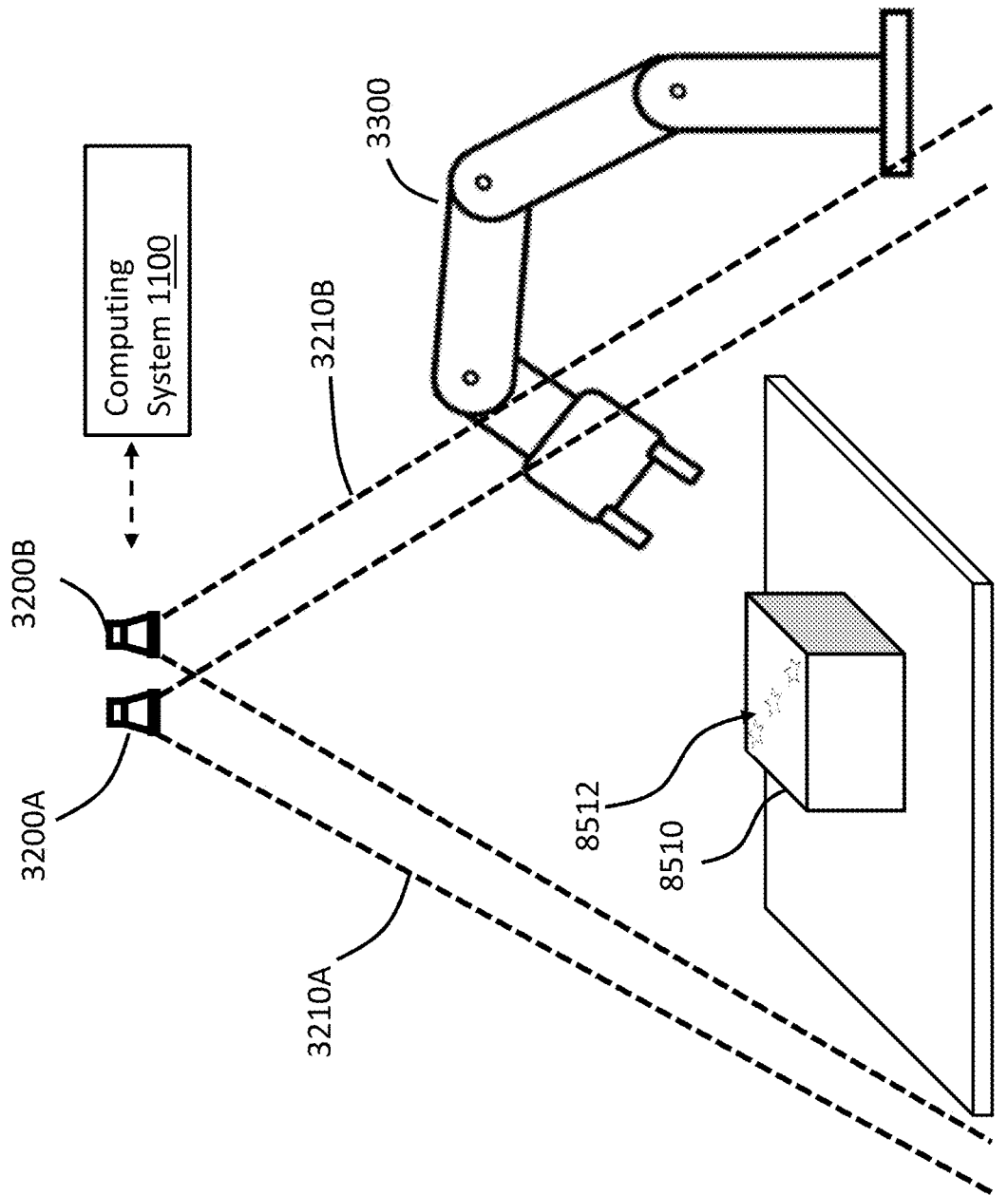

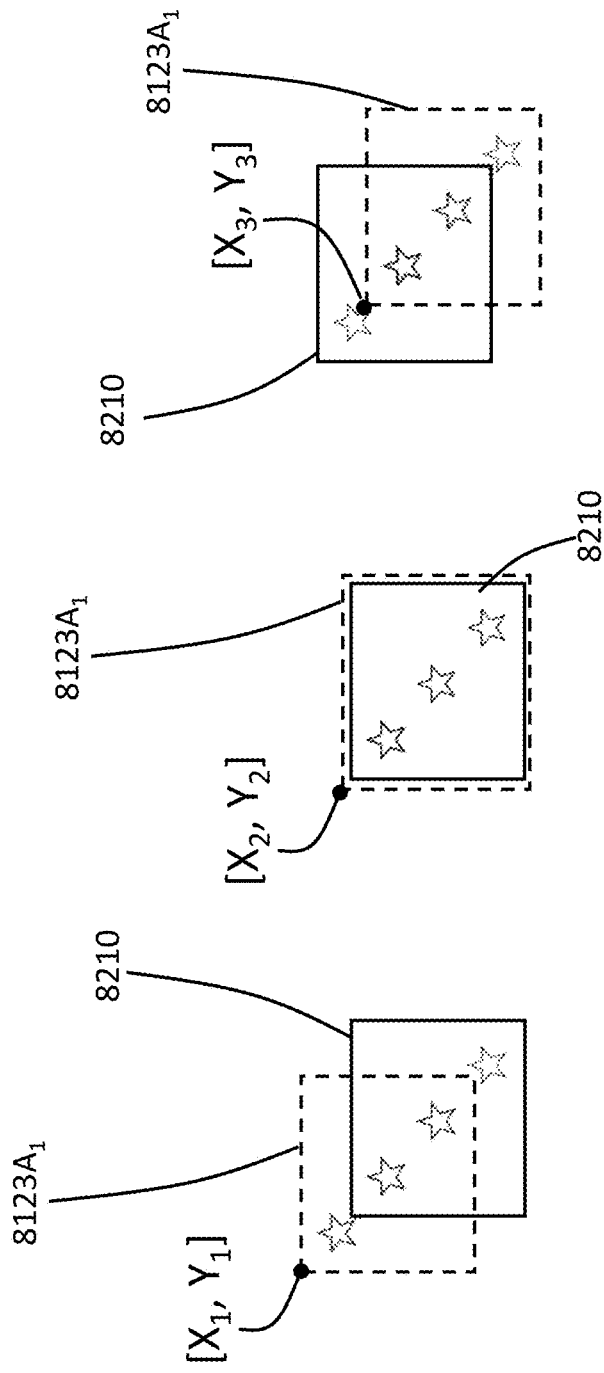

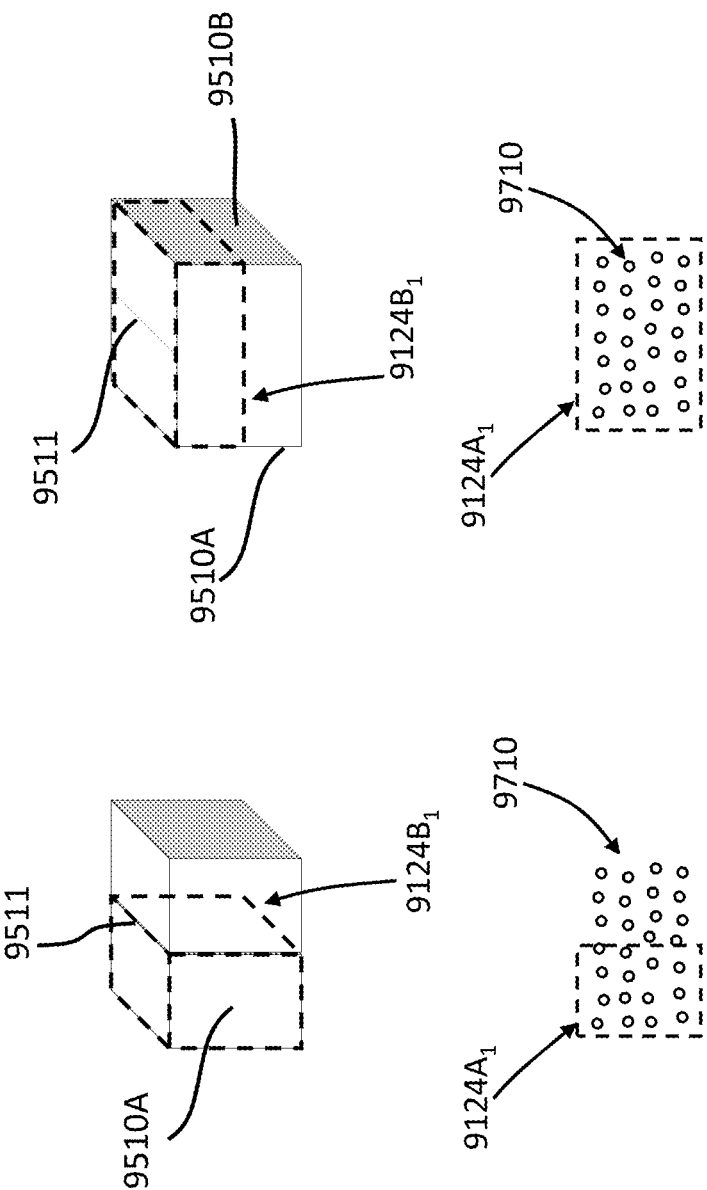

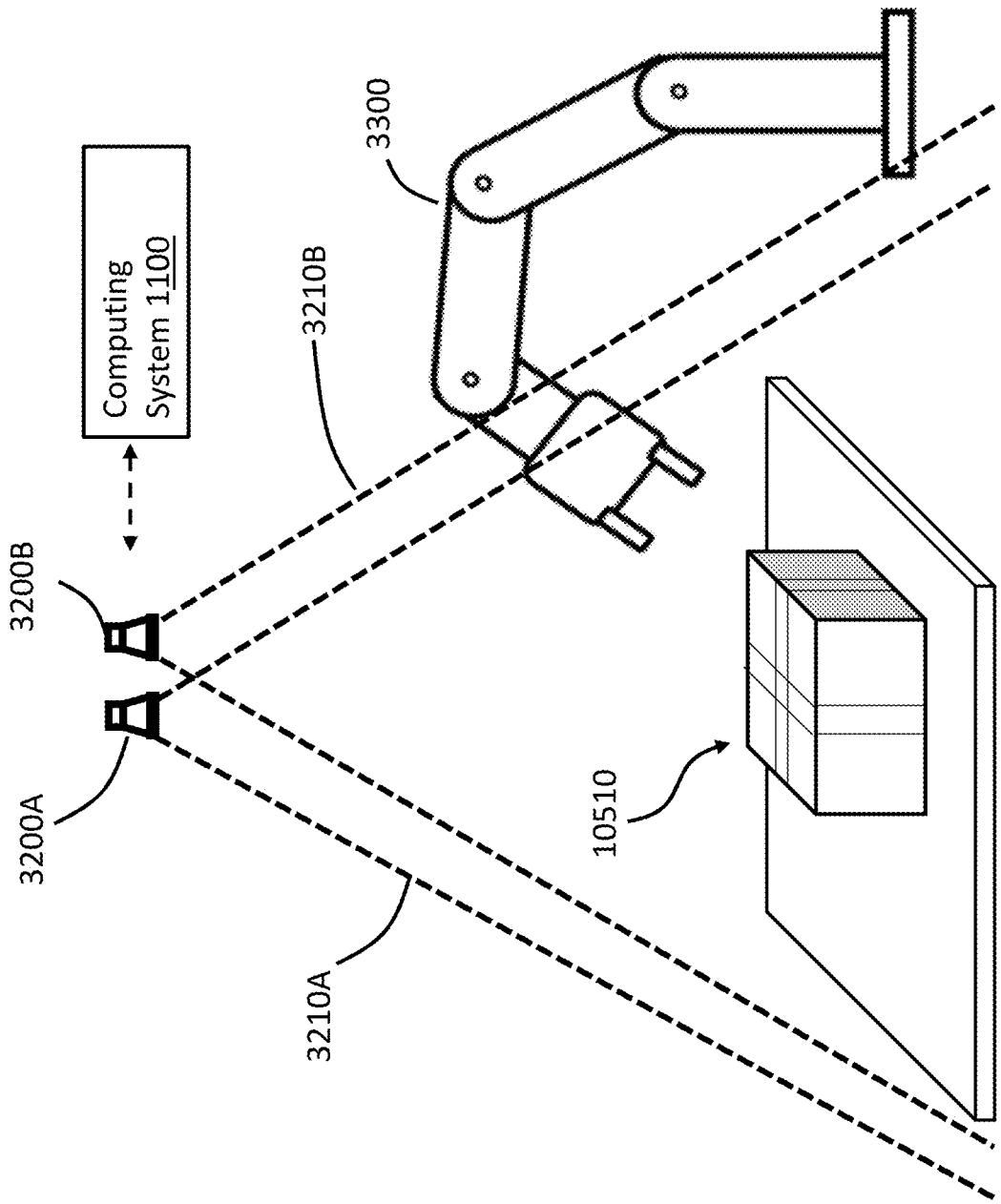

US 11,900,652 B2

METHOD AND COMPUTING SYSTEM FOR GENERATING A SAFETY VOLUME LIST FOR OBJECT DETECTION

FIELD OF THE INVENTION

The present disclosure is related to computing systems and methods for generating a safety volume list for object detection.

BACKGROUND OF THE INVENTION

As automation becomes more common, robots are being used in more environments, such as in warehousing and retail environments. For instance, robots may be used to interact with objects in a warehouse. The movement of the robot may be fixed, or may be based on an input, such as information generated by a sensor in the warehouse.

SUMMARY

One aspect of the present disclosure relates to a method performed by a computing system. The computing system may include a communication interface and at least one processing circuit. In some instances, the method may be performed when the at least one processing circuit executes instructions on a non-transitory computer-readable medium. The communication interface may be configured to communicate with a robot and with a camera having a camera field of view. The at least one processing circuit may be configured, when an object is or has been in the camera field of view, to perform the method by: receiving image information representing the object, wherein the image information is generated by the camera; identifying a set of one or more matching object recognition templates, which are one or more object recognition templates that satisfy a predefined template matching condition when compared against the image information, wherein the set of one or more matching object recognition templates are associated with a set of one or more detection hypotheses, which are one or more respective estimates on which object or object type is represented by the image information; selecting, as a primary detection hypothesis, a detection hypothesis from among the set of one or more detection hypotheses, wherein the primary detection hypothesis is associated with a matching object recognition template of the set of one or more matching object recognition templates, wherein the detection hypothesis that is selected as the primary detection hypothesis has a confidence value which is highest among a set of one or more respective confidence values, wherein the set of one or more respective confidence values are associated with the set of one or more detection hypotheses, and indicate respective degrees by which the image information matches the set of one or more matching object recognition templates associated with the set of one or more detection hypotheses; generating, as a primary candidate region, a candidate region which estimates object boundary locations for the object or estimates which locations in the camera field of view are occupied by the object, wherein the primary candidate region is generated based on the matching object recognition template associated with the primary detection hypothesis; determining at least one of: (i) whether the set of one or more matching object recognition templates has, in addition to the matching object recognition template associated with the primary detection hypothesis, a subset of one or more remaining matching object recognition templates that also satisfy the predefined template matching condition when compared against the image information, or (ii) whether the image information has a portion representing an unmatched region which is adjacent to the primary candidate region and which fails to satisfy the predefined template matching condition; in response to a determination that there is the subset of one or more remaining matching object recognition templates, or that the image information has the portion representing the unmatched region, generating a safety volume list, which is a list that describes at least one of: (i) the unmatched region, or (ii) one or more additional candidate regions that also estimate object boundary locations for the object or estimate which locations are occupied by the object, wherein the one or more additional candidate regions are generated based on the subset of one or more remaining matching object recognition templates; and performing motion planning based on the primary candidate region and based on the safety volume list, wherein the motion planning is for robot interaction between the robot and the object.

BRIEF DESCRIPTION OF THE FIGURES

FIGS. 1A-1D illustrate a system for performing object detection, consistent with embodiments hereof.

FIGS. 6A-6J illustrate various aspects of performing object detection, generating a safety volume list, or generating a bounding region based on a safety volume list, according to embodiments hereof.

FIGS. 7A-7G illustrate various aspects of performing object detection, generating a safety volume list, or generating a bounding region based on a safety volume list, according to embodiments hereof.

FIGS. 8A-8G illustrate various aspects of generating a safety volume list representing different manners of aligning an object recognition template with image information, consistent with embodiments hereof.

FIGS. 9A-9F illustrate various aspects of generating a safety volume list representing different orientations for an object shape described by an object recognition template, consistent with embodiments hereof.

FIGS. 10A-10H illustrate various aspects of identifying image regions for performing object detection, according to an embodiment hereof.

DETAILED DESCRIPTION OF THE FIGURES

Figure 1B:
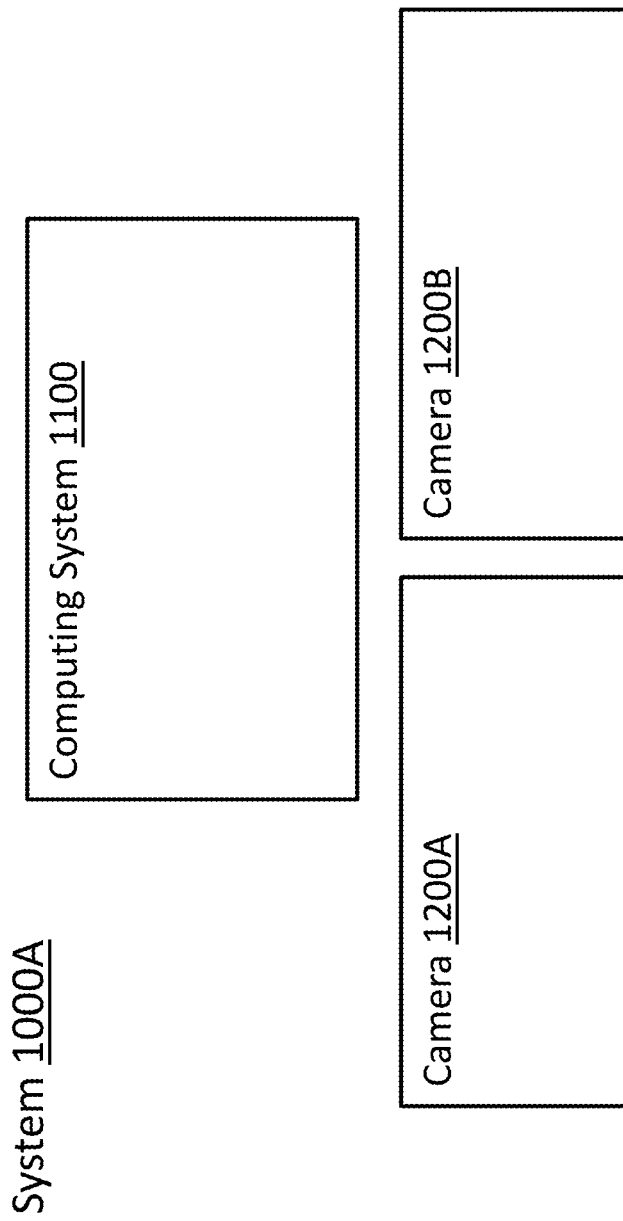

One aspect of the present disclosure relates to performing object detection, which may involve processing image information generated by a camera to detect an object or object type represented by the image information. The object detection may be performed so as to, e.g., facilitate robot interaction with the object, such as a de-palletization operation in which a robot moves the object (e.g., box) from a pallet to a destination location. Some embodiments of this disclosure relates to identifying not only a primary detection hypothesis for use in planning the robot interaction (wherein the primary detection hypothesis may be one hypothesis, guess, or estimate of what object or object type is represented by the image information), but further identifying one or more additional detection hypotheses for use in planning the robot interaction. While the primary detection hypothesis may provide useful information for planning the robot interaction, the one or more additional detection hypotheses may provide additional information which may also be useful for planning robot interaction. The additional information provided by the one or more additional detection hypotheses may, e.g., make the object detection and the planning of the robot interaction more robust and less susceptible to possible sources of error.

In an embodiment, the one or more additional detection hypotheses may be used to generate a safety volume list. In some implementations, the safety volume list may be a list that identifies the one or more additional detection hypotheses. In some implementations, the safety volume list may be a list that identifies one or more candidate regions associated with the one or more additional detection hypotheses. The candidate regions may be, e.g., estimates of a region of space in which the object is located. In some instances, the planning of the robot interaction may be based on a primary candidate region associated with the primary detection hypothesis, and may further be based on information in the safety volume list, such as the one or more candidate regions associated with the one or more additional detection hypotheses.

In some instances, the primary detection hypothesis and the one or more additional detection hypotheses may be associated with various object recognition templates. In some situations, the safety volume list may be generated when multiple object recognition templates sufficiently match the image information generated by the camera. In such a situation, the primary detection hypothesis may be associated with one of the matching object recognition templates (e.g., an object recognition template yielding a highest confidence value), while the safety volume list may be generated based on the detection hypotheses associated with remaining matching object recognition templates. In an embodiment, the safety volume list may include detection hypotheses which are sufficiently similar to the primary detection hypothesis in confidence value, and/or which have a sufficiently high confidence value. In some instances, the safety volume may include candidate regions associated with such detection hypotheses. The safety volume list may further, in an embodiment, exclude detection hypotheses with confidence values that are too low, or that are too different from a confidence value of the primary detection hypothesis. In some implementations, a determination may be made as to whether a particular candidate region has sufficient overlap with a primary candidate region associated with the primary detection hypothesis. If there is sufficient overlap, that particular candidate region may be included in the safety volume list.

In an embodiment, generating the safety volume may involve identifying different image regions within an image (e.g., a textureless 2D image), and comparing the different image regions to object recognition templates. Identifying the different regions may involve, e.g., detecting a first image region located between a set of image corners or image edges, and searching the image to determine whether it describes a second image region that extends beyond the first image region, and is located between another set of image corners or image edges. The second image region may also be compared against various object recognition templates to determine whether it matches one of the templates.

In an embodiment, the safety volume list may include an unmatched region, which may be a region that is represented by an image portion that fails to match an existing object recognition template. In some instances, the unmatched region may be a region adjacent to the primary candidate region, and may represent a physical region of space that is adjacent to the object or structure represented by the primary candidate region. In some instances, a new object recognition template may be generated based on the unmatched region.

FIG. 1A illustrates a system 1000 for performing object detection, or more specifically object recognition and/or object registration, based on image information (the terms "and/or" and "or" are used interchangeably in this disclosure). More particularly, the system 1000 may include a computing system 1100 and a camera 1200. In this example, the camera 1200 may be configured to generate image information which describes or otherwise represents an environment in which the camera 1200 is located, or more specifically represents an environment in the camera 1200's field of view (also referred to as a camera field of view). The environment may be, e.g., a warehouse, a manufacturing plant, a retail space, or some other premises. In such instances, the image information may represent objects located at such premises, such as containers (e.g., boxes, bins, or crates) holding items for storage at the premises. The system 1000 may be configured to generate, receive, and/or process the image information, such as by performing motion planning based on the image information, as discussed below in more detail. The motion planning may be used to, e.g., control a robot at the premises to facilitate robot interaction between the robot and the containers or other objects. The computing system 1100 and the camera 1200 may be located at the same premises, or may be located remotely from each other. For instance, the computing system 1100 may be part of a cloud computing platform hosted in a data center which is remote from the warehouse or retail space, and may be communicating with the camera 1200 via a network connection.

In an embodiment, the camera 1200 may be a 2D camera and/or a 3D camera. For example, FIG. 1B illustrates a system 1000A (which may be an embodiment of the system 1000) that includes the computing system 1100 as well as a camera 1200A and a camera 1200B, both of which may be an embodiment of the camera 1200. In this example, the camera 1200A may be a 2D camera that is configured to generate 2D image information which includes or forms a 2D image that describes a visual appearance of the environment in the camera's field of view. The camera 1200B may be a 3D camera (also referred to as a spatial structure sensing camera or spatial structure sensing device) that is configured to generate 3D image information which includes or forms spatial structure information regarding an environment in the camera's field of view. The spatial structure information may include depth information which describes respective depth values of various locations relative to the camera 1200B, such as locations on surfaces of various objects in the camera 1200's field of view. The depth information in this example may be used to estimate how the objects are spatially arranged in three-dimensional (3D) space. In some instances, the spatial structure information may include or may be used to generate a point cloud that describes locations on one or more surfaces of an object in the camera 1200B's field of view. More specifically, the spatial structure information may describe various locations on a structure of the object (also referred to as an object structure).

Figure 1C:
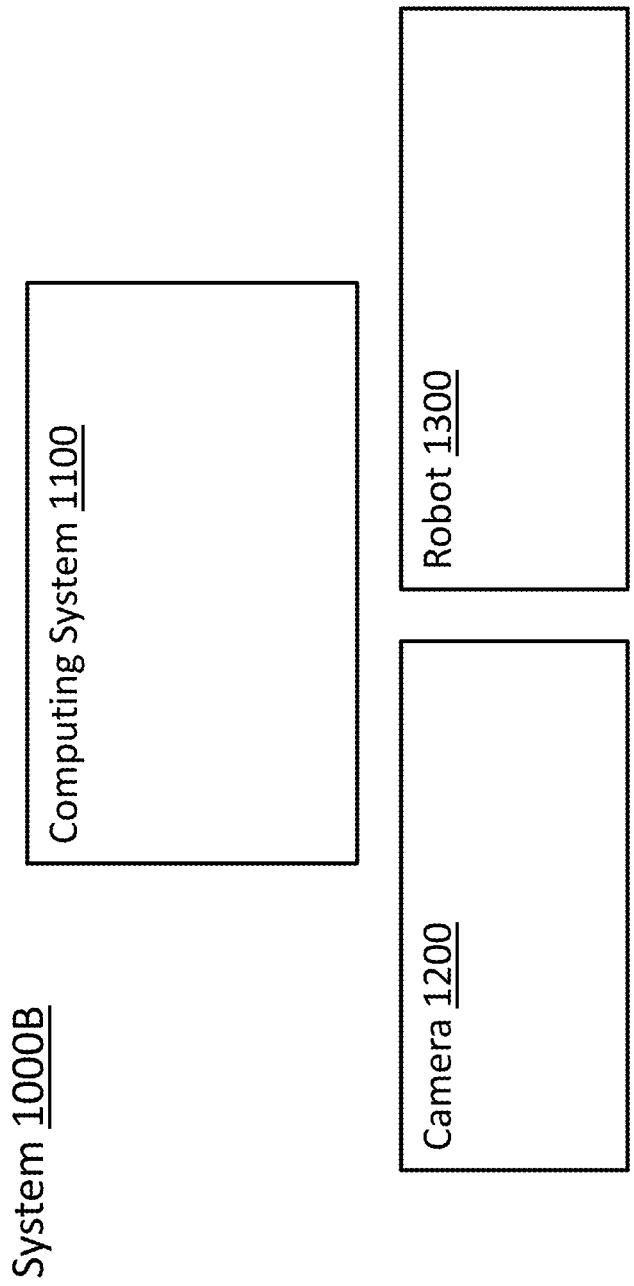

In an embodiment, the system 1000 may be a robot operation system for facilitating interaction between a robot and various objects in the environment of the camera 1200. For example, FIG. 1C illustrates a robot operation system 1000B, which may be an embodiment of the system 1000/1000A of FIGS. 1A and 1B. The robot operation system 1000B may include the computing system 1100, the camera 1200, and a robot 1300. As stated above, the robot 1300 may be used to interact with one or more objects in the environment of the camera 1200, such as with boxes, crates, bins, or other containers. For example, the robot 1300 may be configured to pick up the containers from one location and move them to another location. In some cases, the robot 1300 may be used to perform a de-palletization operation in which a stack of containers are unloaded and moved to, e.g., a conveyor belt, or to perform a palletization operation in which containers are stacked onto a pallet to prepare them for transport. In some implementations, the camera 1200 may be attached to the robot 1300, such as to a robot arm of the robot 1300. Such implementations may allow the camera 1200 to be moved to different locations and/or orientations via the robot arm. In some implementations, the camera 1200 may be separate from the robot 1300. For instance, the camera 1200 may be mounted to a ceiling of a warehouse or other structure, and may remain stationary relative to the structure.

In an embodiment, the computing system 1100 of FIGS. 1A-1C may form or be part of a robot control system (also referred to as a robot controller), which is part of the robot operation system 1000B. The robot control system may be a system that is configured to, e.g., generate movement commands or other commands for the robot 1300. In such an embodiment, the computing system 1100 may be configured to generate such commands based on, e.g., image information generated by the camera 1200/1200A/1200B. For instance, the computing system 1100 may be configured to determine a motion plan based on the image information, and generate one or more movement commands to execute the motion plan. The motion plan may be a plan for the robot to execute to move one or more objects. For example, the motion plan may involve an end effector apparatus (e.g., gripper) of the robot 1300 approaching the object, then picking up or otherwise engaging the object, and moving the object to a destination location.

In an embodiment, the computing system 1100 may form or be part of a vision system. The vision system may be a system which generates, e.g., vision information which describes an environment in which the robot 1300 is located, or more specifically describes an environment in which the camera 1200 is located. The vision information may include the 3D image information or the 2D image information discussed above, or some other image information. In some scenarios, if the computing system 1100 forms a vision system, the vision system may be part of the robot control system discussed above, or may be separate from the robot control system. If the vision system is separate from the robot control system, the vision system may be configured to output information describing the environment in which the robot 1300 is located. The information may be outputted to the robot control system, which may receive such information from the vision system and control movement of the robot 1300 based on the information.

In an embodiment, the computing system 1100 may communicate with the camera 1200 and/or with the robot 1300 via a direct connection, such as a connection provided via a dedicated wired communication interface, such as a RS-232 interface, a universal serial bus (USB) interface, and/or via a local computer bus, such as a peripheral component interconnect (PCI) bus. In an embodiment, the computing system 1100 may communicate with the camera 1200 and/or with the robot 1300 via a network. The network may be any type and/or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the computing system 1100 may communicate information directly with the camera 1200 and/or with the robot 1300, or may communicate via an intermediate storage device, or more generally an intermediate non-transitory computer-readable medium. For example, FIG. 1D illustrates a system 1000C, which may be an embodiment of the system 1000/1000A/1000B, that includes a non-transitory computer-readable medium 1400, which may be external to the computing system 1100, and may act as an external buffer or repository for storing, e.g., image information generated by the camera 1200. In such an example, the computing system 1100 may retrieve or otherwise receive the image information from the non-transitory computer-readable medium 1400. Examples of the non-transitory computer readable medium 1400 include an electronic storage device, a magnetic storage device, an optical storage device, an electromagnetic storage device, a semiconductor storage device, or any suitable combination thereof. The non-transitory computer-readable medium may form, e.g., a computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and/or a memory stick.

As stated above, the camera 1200 may be a 3D camera and/or a 2D camera. The 2D camera may be configured to generate a 2D image, such as a color image or a grayscale image. The 3D camera may be, e.g., a depth-sensing camera, such as a time-of-flight (TOF) camera or a structured light camera, or any other type of 3D camera. In some cases, the 2D camera and/or 3D camera may include an image sensor, such as a charge coupled devices (CCDs) sensor and/or complementary metal oxide semiconductors (CMOS) sensor. In an embodiment, the 3D camera may include lasers, a LIDAR device, an infrared device, a light/dark sensor, a motion sensor, a microwave detector, an ultrasonic detector, a RADAR detector, or any other device configured to capture spatial structure information.

As stated above, the image information may be processed by the computing system 1100. In an embodiment, the computing system 1100 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 1100 may be performed as part of a cloud computing platform. The computing system 1100 may be a single computing device (e.g., a desktop computer), or may include multiple computing devices.

Figure 2A:
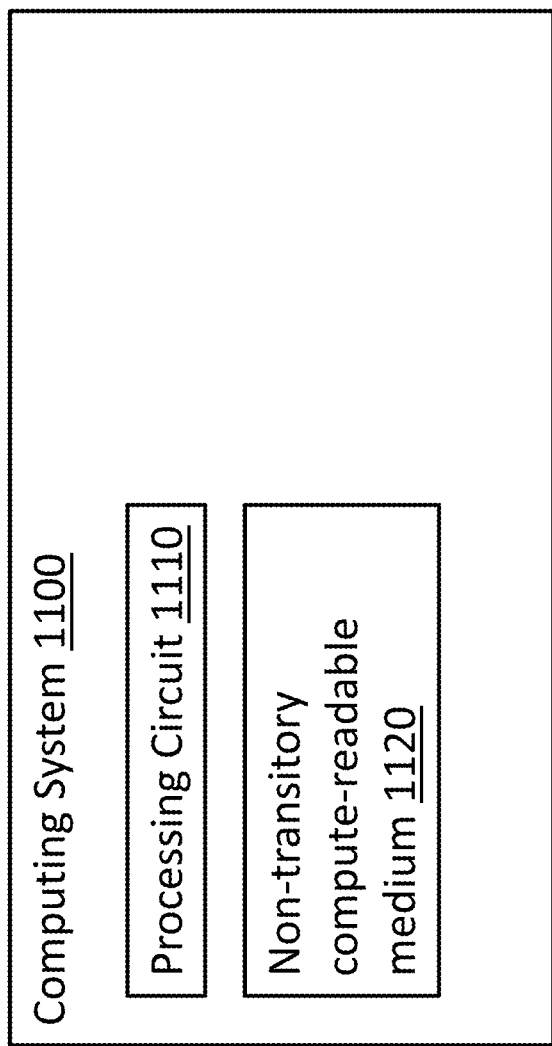
FIGS. 2A-2D provide block diagrams that illustrate a computing system configured to perform object detection, consistent with embodiments hereof.

FIG. 2A provides a block diagram that illustrates an embodiment of the computing system 1100. The computing system 1100 includes at least one processing circuit 1110 and a non-transitory computer-readable medium (or media) 1120. In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit.

In an embodiment, the non-transitory computer-readable medium 1120, which is part of the computing system 1100, may be an alternative or addition to the intermediate non-transitory computer-readable medium 1400 discussed above. The non-transitory computer-readable medium 1120 may be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 1120 may include multiple storage devices. In certain implementations, the non-transitory computer-readable medium 1120 is configured to store image information generated by the camera 1200 and received by the computing system 1100. The non-transitory computer-readable medium 1120 may alternatively or additionally store computer readable program instructions that, when executed by the processing circuit 1110, causes the processing circuit 1110 to perform one or more methodologies described here, such as the operations described with respect to FIG. 4.

Figure 2B:
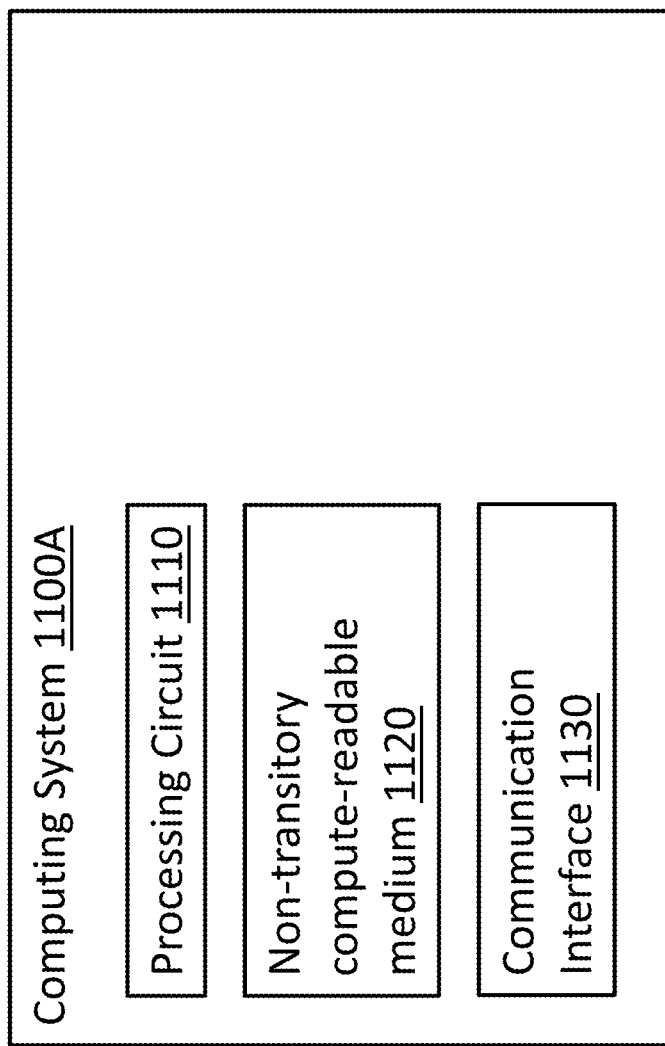

FIG. 2B depicts a computing system 1100A that is an embodiment of the computing system 1100 and includes a communication interface 1130. The communication interface 1130 may be configured to, e.g., receive image information generated by the camera 1200 of FIGS. 1A-1D. The image information may be received via the intermediate non-transitory computer-readable medium 1400 or the network discussed above, or via a more direct connection between the camera 1200 and the computing system 1100/1100A. In an embodiment, the communication interface 1130 may be configured to communicate with the robot 1300 of FIG. 1C. If the computing system 1100 is external to a robot control system, the communication interface 1130 of the computing system 1100 may be configured to communicate with the robot control system. The communication interface 1130 may also be referred to as a communication component or communication circuit, and may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

In an embodiment, the non-transitory computer-readable medium 1120 may store one or more object recognition templates (also referred to as object templates). The one or more object recognition templates may be used to perform object recognition, which may involve determining, e.g., an identity of an object in a camera field of view of a camera (e.g., 1200), and/or an object type of the object. Thus, each of the one or more object recognition templates may represent or be associated with a respective object type. The object type may refer to a type or class of objects, such as a type or class of containers. For example, if the object in the camera field of view is a container, performing the object recognition may involve determining a container type associated with the container, or to which the container belongs. In such an example, an object recognition template may be a container template, and may include information (also referred to as template information) that describes a particular container type, or more generally a particular object type. For instance, the template information in an object recognition template may include visual description information that describes an appearance associated with an object type, such as a visual design for objects belonging to the object type associated with the object recognition template, such as visual patterns or other visual details on outer surfaces of such objects. In some implementations, the visual description information (also referred to as an object appearance description) of an object recognition template may describe a visual pattern or other visual detail (e.g., logo or picture) that is printed or otherwise disposed on objects having an object type associated with the object recognition template. For example, the visual description information may include one or more descriptors (e.g., feature descriptors) which represent or describe the visual detail or visual design. In some implementations, the template information may include structure description information, which may describe a physical design, or more specifically a structure (also referred to as a physical structure), associated with an object type.

Figure 2C:
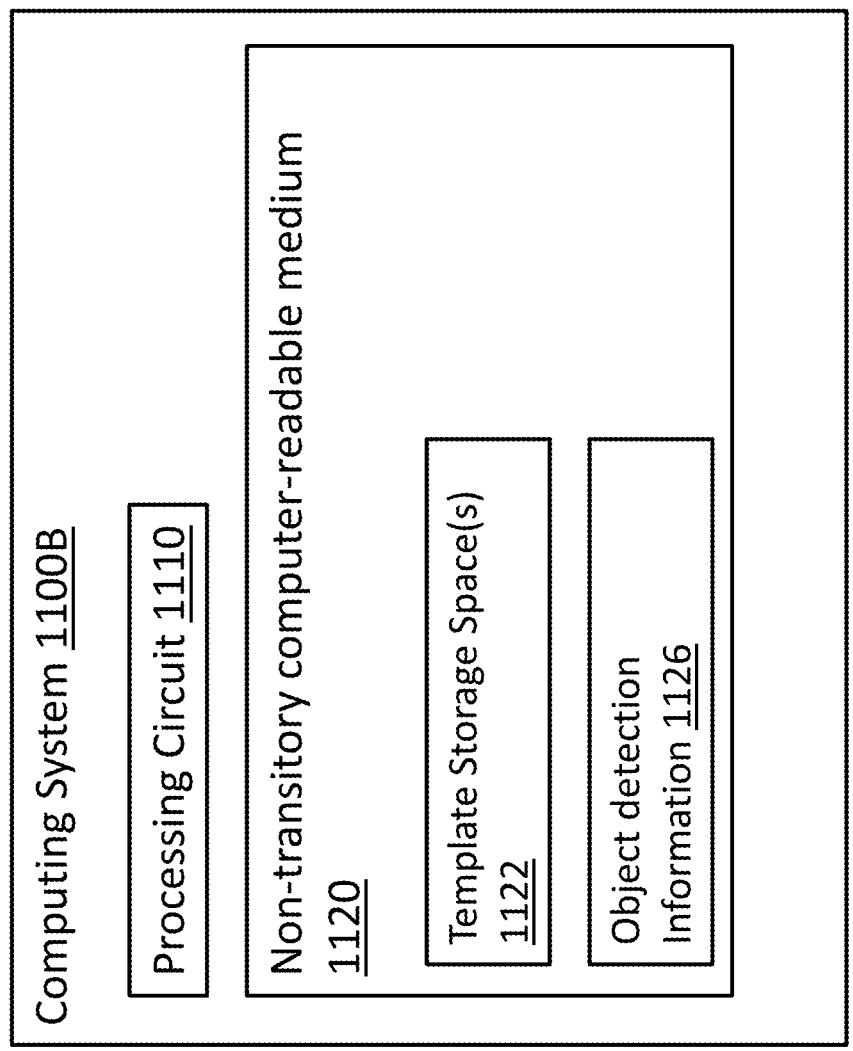

In an embodiment, the one or more object recognition templates discussed above may be stored in a template storage space, which may be a space on a non-transitory computer-readable medium that is allocated to store object recognition templates. For instance, FIG. 2C depicts an example in which a template storage space(s) 1122 is located in the non-transitory computer-readable medium 1120 of a computer system 1100B (which may be an embodiment of the computing system 1100/1100A). In some implementations, the template storage space 1122 or another template storage space may be located in another non-transitory computer-readable medium, such as the non-transitory computer-readable medium 1400 of FIG. 1D. Template storage spaces and object registration are discussed in more detail in and in U.S. patent application Ser. No. 16/991,466, the entire content of which is incorporated by reference herein. In some implementations, the object recognition templates may include at least one textured template and at least one textureless template. Textured template and textureless templates are discussed in more detail in U.S. patent application Ser. No. 16/991,510, the entire content of which is incorporated by reference herein. In some scenarios, the computing system 1100B, or more generally the system 1000/ 1000A/1000B/1000C may include multiple template storage spaces, which may be used to, e.g., store multiple respective types of object recognition templates. For example, the template storage space(s) 1122 may include a first template storage space that is used to store textured templates, and include a second template storage space that is used to store textureless templates. The object recognition templates may have been, e.g., generated as part of an object registration process, and/or may have been received (e.g., downloaded) from a source such as a server.

In an embodiment, the non-transitory computer-readable medium 1120 may store object detection information 1126, which may include, e.g., information about an object (e.g., a container in the camera field of view), wherein the information may be determined based on or as a result of performing object recognition on an object represented by image information generated by a camera. The object detection information 1126 may be used by the computing system 1100/1100A/1100B and/or by another computing system to, e.g., plan robot interaction with an object represented by the object detection information. Planning the robot interaction may involve, e.g., performing motion planning, which may involve planning motion of a robot (e.g., 1300) for interacting with the object. In some instances, the object detection information 1126 may include or describe one or more detection hypotheses. As discussed below in more detail, each detection hypothesis of the one or more detection hypotheses may be a hypothesis of which object or object type is represented by image information generated by a camera (e.g., 1200). More specifically, a detection hypothesis may in some instances be an estimate of which object or object type is in the camera field of view of a camera. In one example, if the image information is compared against one or more object recognition templates, a detection hypothesis may be a hypothesis, or more generally an estimate, that a particular object recognition template corresponds to the image information, or that the image information represents an object or object type associated with the particular object recognition template.

In an embodiment, the object detection information 1126 may indicate, for each detection hypothesis included in or described by the object detection information 1126, a detection hypothesis and a confidence value associated with the detection hypothesis. The confidence value may be calculated by, e.g., the computing system 1100/1100A/1100B, and may indicate a level of confidence in associating the detection hypothesis with an object in the camera field of view, or more specifically a level of confidence in using the detection hypothesis to represent or identify the object. If the detection hypothesis is an estimate that an object or its image information corresponds to a particular object recognition template, the confidence value associated with the detection hypothesis may indicate a degree to which the object recognition template matches the image information. For instance, if the detection hypothesis is associated with an object recognition template that has visual description information or structure description information, the confidence value associated with the detection hypothesis may indicate a degree to which the visual description information in the template matches an object's appearance as described in the image information, and/or a degree to which the structure description information in the template matches an object's structure as described in the image information. As discussed below in more detail, the object detection information may in an embodiment include or describe a primary detection hypothesis and/or a primary candidate region associated with the primary detection hypothesis, as discussed below in more detail. The object detection information may further include or describe a safety volume list. The safety volume list may be a list of one or more additional detection hypotheses, and/or one or more candidate regions associated with the one or more additional detection hypotheses. In some instances, the primary detection hypothesis may be a detection hypothesis associated with a highest confidence value among a set of confidence values. In some instances, the one or more additional detection hypotheses in the safety volume list may be associated with one or more respective confidence values that are sufficiently similar to the highest confidence value. In some instances, the one or more additional detection hypotheses in the safety volume list may have one or more respective confidence values that exceed or are at least equal to a predefined template matching threshold.

In an embodiment, the object detection information 1126 may describe one or more candidate regions associated with an object in a camera field of view, or more specifically for image information representing the object. The one or more candidate regions may each be a respective estimate of object boundary locations for the object or a respective estimate for which locations in the camera field of view are occupied by the object. As discussed below in more detail, the object detection information 1126 may in some instances identify a primary candidate region, which may be a candidate region associated with the primary detection hypothesis. If the object detection information 1126 includes a safety volume list, the safety volume list may in some scenarios identify one or more additional candidate regions, which may also estimate object boundary locations for the object or estimate which locations are occupied by the object. In some instances, the safety volume list in the object detection information 1126 may directly or indirectly identify or describe the one or more additional candidate regions or the one or more additional detection hypotheses. In some implementations, the computing system 1100/1100A/1100B may determine the one or more additional candidate regions based on the one or more additional detection hypotheses. For instance, the one or more additional detection hypotheses may include one or more respective sets of structure description information, such as object size information. The computing system 1100/1100A/1100B may be configured to determine the one or more additional candidate regions based on the one or more respective sets of structure description information.

In an embodiment, the safety volume list in the object detection information 1126 may identify an unmatched region, which may be a region that is represented by a portion of image information that does not match any existing object recognition template in a storage space, such as the template storage space(s) 1122. More specifically, the unmatched region may be a region that is adjacent to the primary candidate region, and which fails to satisfy a predefined template matching condition, as discussed below in more detail. In an embodiment, the object detection information 1126 may describe a bounding region, which may be a region that encompasses the primary candidate region and encompasses the one or more additional candidate regions and/or the unmatched region, as discussed below in more detail.

Figure 2D:
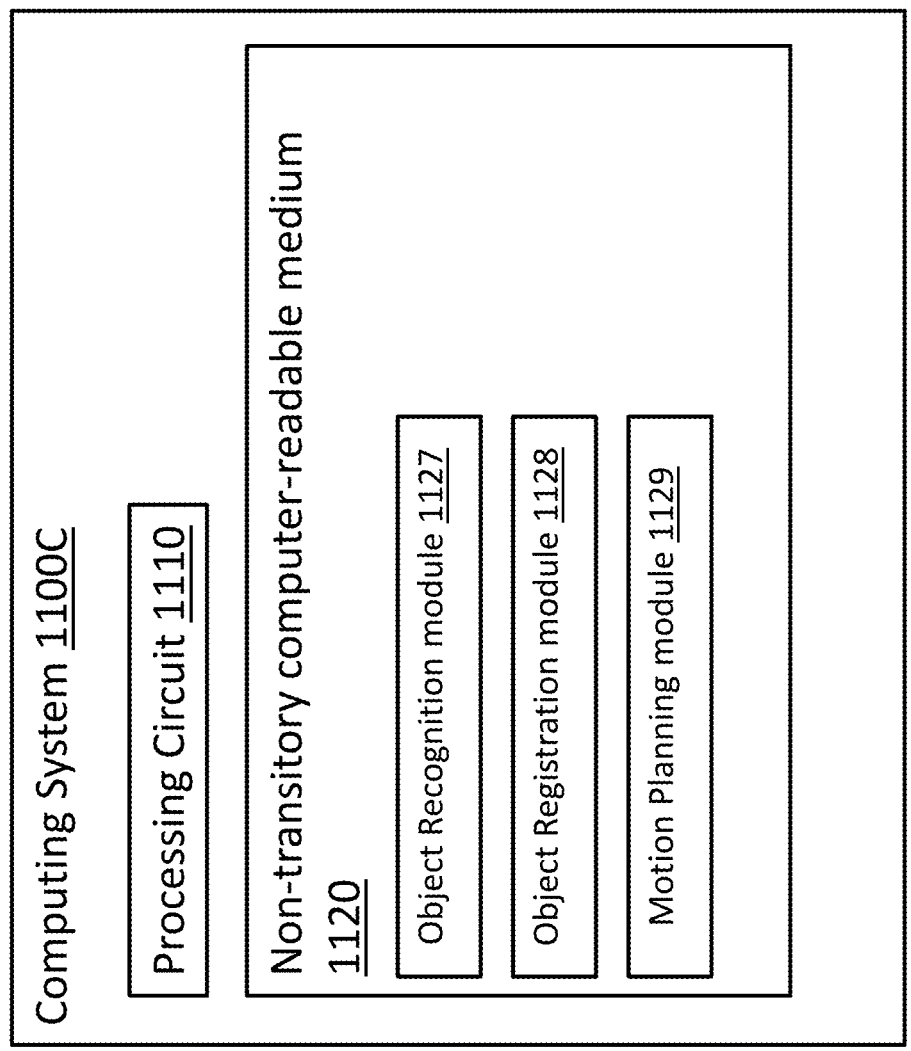

In an embodiment, the processing circuit 1110 may be programmed by one or more computer-readable program instructions stored on the non-transitory computer-readable medium 1120. For example, FIG. 2D illustrates a computing system 1100C, which is an embodiment of the computing system 1100/1100A/1100B, in which the processing circuit 1110 is programmed by one or more modules, including an object recognition module 1127, an object registration module 1128, and/or a motion planning module 1129.

In an embodiment, the object recognition module 1127 may be configured to perform an object recognition operation based on image information generated by a camera (e.g., 1200), to determine what object(s) or object type(s) is represented by the image information. In some implementations, the object recognition module may perform the object recognition operation by comparing the image information with the one or more object recognition templates, such as object recognition templates stored in the template storage space 1122 to determine how closely the one or more object recognition templates matches the image information, or more specifically to determine respective degrees by which the image information matches the one or more object recognition templates. For instance, the module 1127 may calculate one or more respective confidence values associated with comparing the image information to the one or more object recognition templates. The object recognition operation may be used to generate the object detection information 1126, such as information which identifies a primary detection hypothesis and a safety volume list, which is discussed below in more detail.

In an embodiment, the object registration module 1128 may be configured to generate a new object recognition template, and/or to store the new object recognition template in a template storage space (e.g., 1122). The new object registration module 1128 may be generated when, e.g., the image information or a portion thereof represents a region of space, an object, or a portion of an object which does not match any existing object recognition template in a template storage space, or more specifically does not satisfy a predefined template matching condition when compared against the existing object recognition templates.

In an embodiment, the motion planning module 1129 may be configured to perform motion planning based on image information which represents an object in a camera field of view. More particularly, the motion planning may involve determining motion to be performed by a robot (e.g., 1300) or a component thereof, wherein the motion may be determined based on the object detection information 1126. For instance, the motion planning may involve determining how an end effector apparatus (e.g., gripper) of a robot arm of the robot 1300 is to move so as to grip the object, and determining a trajectory for the end effector apparatus to follow after it has gripped the object, wherein the trajectory causes the end effector apparatus to move the object to a destination location while having a low risk of collision with other objects during movement along the trajectory.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

Figure 3A:
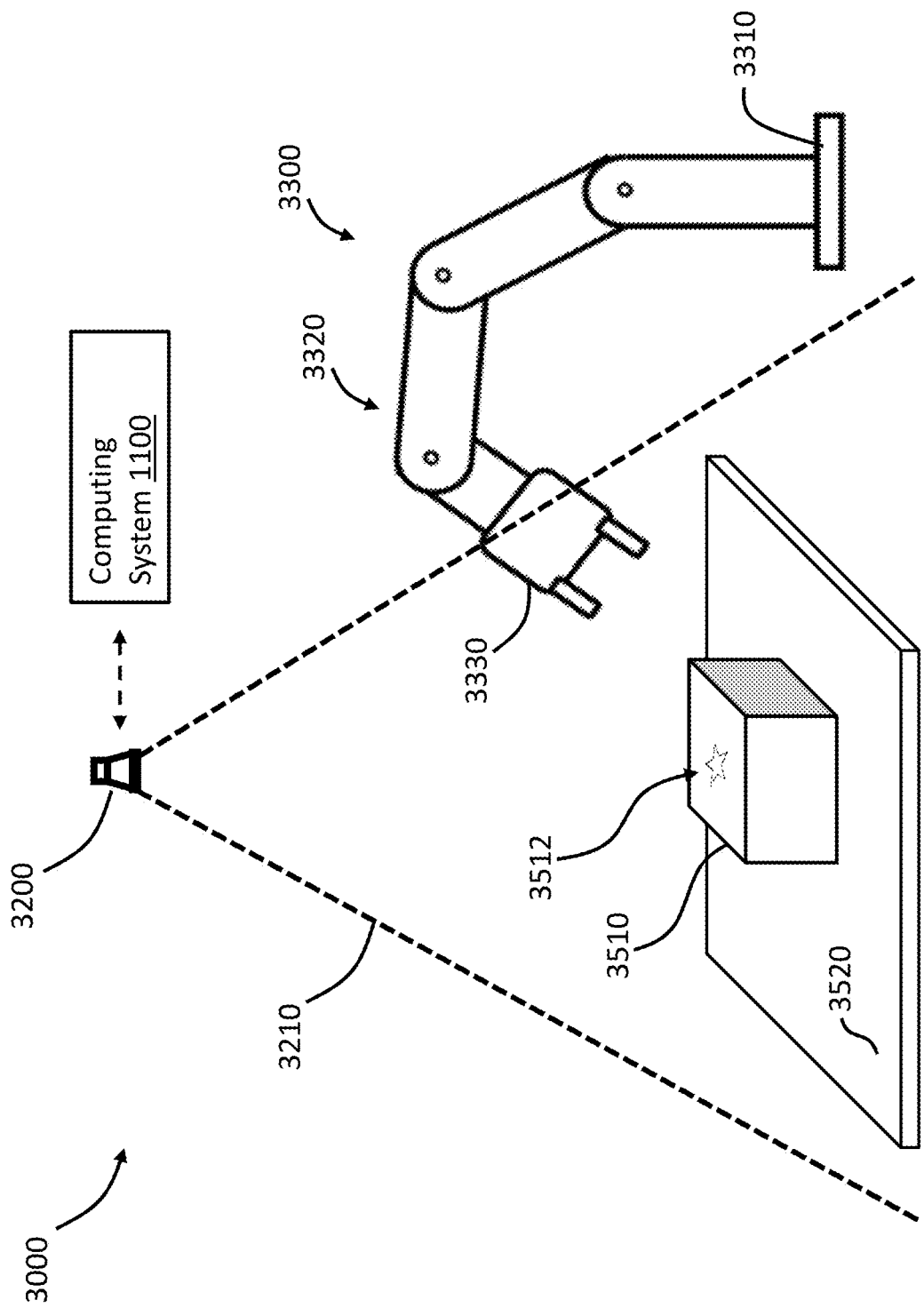
FIGS. 3A-3B illustrate an environment in which object detection may be performed, according to an embodiment hereof.
Figure 3B:
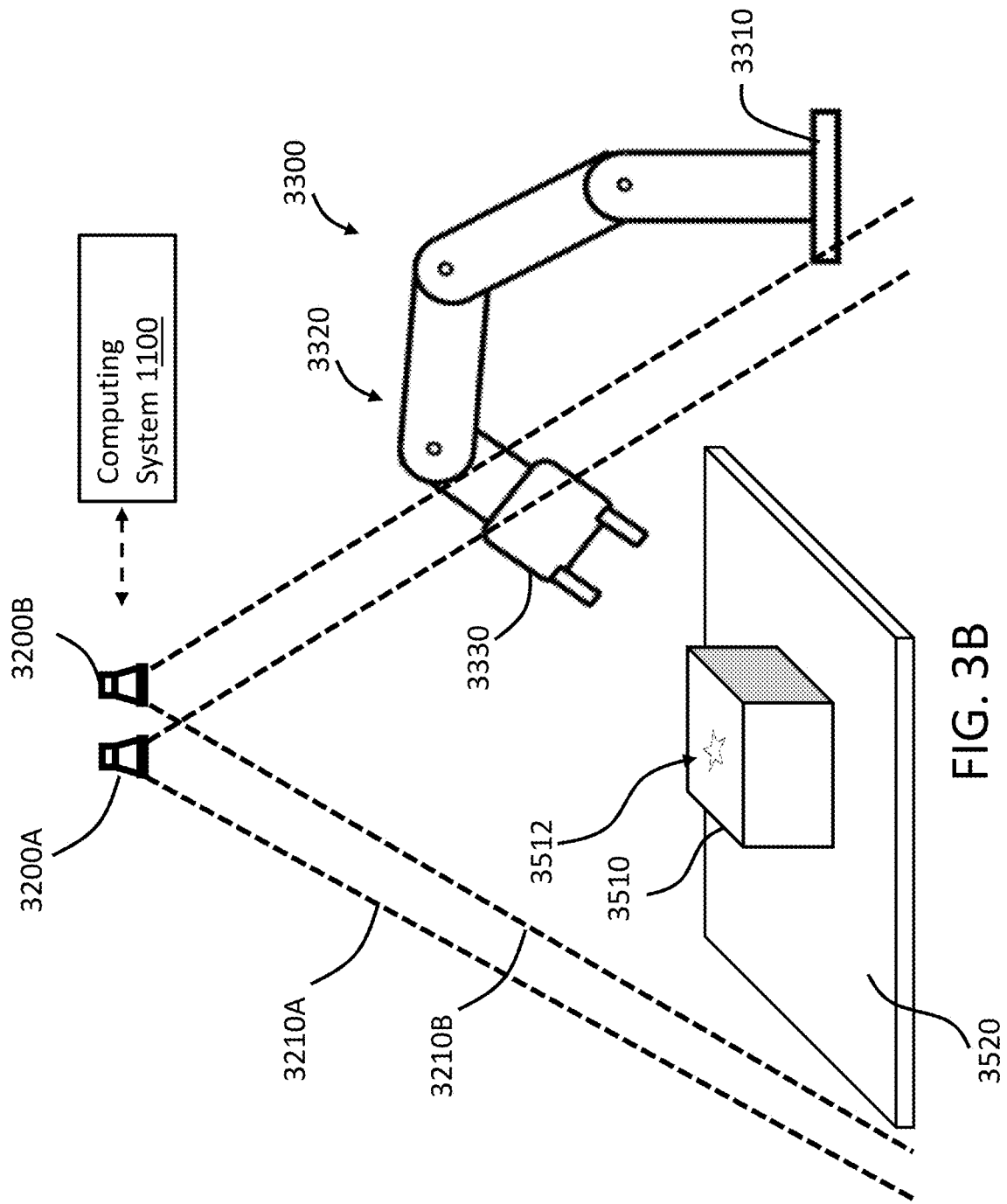

FIGS. 3A and 3B illustrate an example environment in which object detection may be performed. More specifically, FIG. 3A depicts a system 3000 (which may be an embodiment of the system 1000/1000A/1000B/1000C of FIGS. 1A-1D) that includes the computing system 1100, a robot 3300, and a camera 3200. The camera 3200 may be an embodiment of the camera 1200, and may be configured to generate image information which represents a scene in a camera field of view 3210 of the camera 3200, or more specifically represents objects or their structures in the camera field of view 3210, such as the object 3510 and the object 3520. In some scenarios, the object 3510 may be, e.g., a container such as a box or crate, while the object 3520 may be a pallet on which the container is disposed. In an embodiment, as illustrated in FIG. 3B, the system 3000 may include multiple cameras, including a camera 3200A (which may be an embodiment of the camera 1200A) having a camera field of view 3210A, and including a camera 3200B (which may be an embodiment of the camera 1200B) having a camera field of view 3210B. The camera 3200A may be, e.g., a 2D camera that is configured to generate a 2D image or other 2D image information, while the camera 3200B may be, e.g., a 3D camera that is configured to generate 3D image information. The 2D image (e.g., a color image or a grayscale image) may describe an appearance of one or more objects, such as the object 3510, in the camera field of view 3210/3210A. For instance, the 2D image may capture or otherwise represent visual detail, such as visual markings 3512, that are disposed on an outer surface (e.g., top surface) of the object 3510. In an embodiment, the 3D image information may describe a structure of the object 3510 (also referred to as an object structure for the object 3510). For example, the 3D image may include a depth map, or more generally include depth information, which may describe respective depth values of various locations in the camera field of view 3210/3210B relative to the camera 3200B or relative to some other reference point. The locations corresponding to the respective depth values may be locations on various surfaces in the camera field of view 3210/3210B, such as locations on one or more outer surfaces (e.g., the top surface) of the objects 3510, 3520. In some instances, the 3D image information may include a point cloud, which may include a plurality of 3D coordinates that describe various locations on the one or more outer surfaces of the object 3510, 3520 or of some other objects in the camera field of view 3210/3210B.

In the example of FIGS. 3A and 3B, the robot 3300 (which may be an embodiment of the robot 1300) may include a robot arm 3320 having one end attached to a robot base 3310, and having another end that is attached to or is formed by an end effector apparatus 3330, such as a robot gripper. The robot base 3310 may be used for mounting the robot arm 3320, while the robot arm 3320, or more specifically the end effector apparatus 3330, may be used to interact with one or more objects (e.g., 3510) in an environment of the robot 3300. The interaction may include, e.g., gripping or otherwise picking up the one or more objects, and/or moving the one or more objects from a current location to a destination location.

Figure 4:
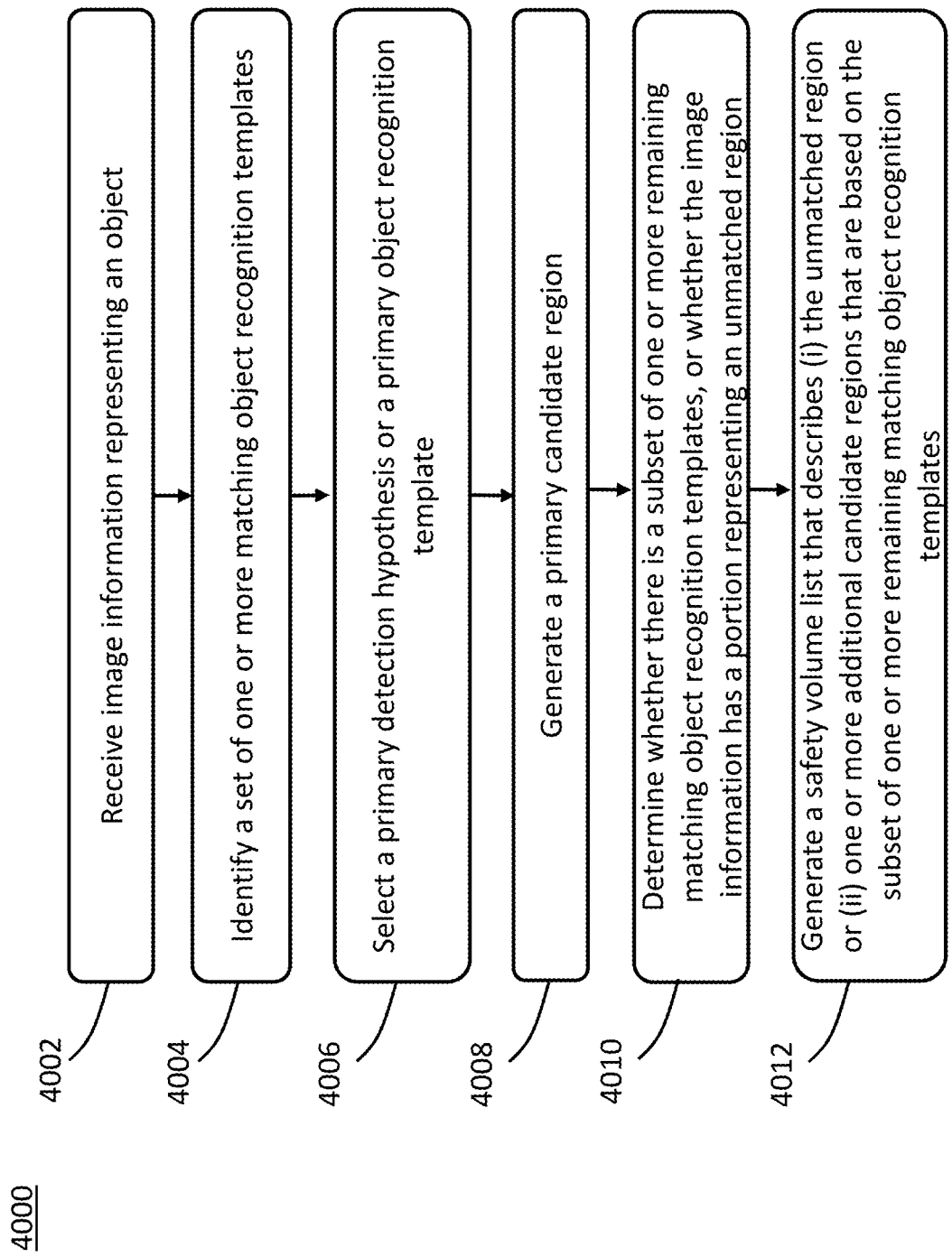
FIG. 4 provides a flow diagram that illustrates a method of generating a safety volume list, according to an embodiment hereof.

FIG. 4 depicts a flow diagram for an example method 4000 for performing object detection. The method 4000 may be performed by, e.g., the computing system 1100 of FIGS. 2A-2D or of FIG. 3A, or more specifically by the at least one processing circuit 1110 of the computing system 1100. In some scenarios, the at least one processing circuit 1110 may perform the method 4000 by executing instructions stored on a non-transitory computer-readable medium (e.g., 1120). For instance, the instructions may cause the processing circuit 1110 to execute one or more of the modules illustrated in FIG. 2D, which may perform method 4000. As an example, steps 4002-4012 discussed below may be performed by the object recognition module 1127. If the method 4000 involves generating a new object recognition template, as discussed below, such an operation may be performed by the object registration module 1128. If the method 4000 involves performing motion planning based on a safety volume list, as also discussed below, such an operation may be performed by the motion planning module 1129. In an embodiment, the method 4000 may be performed in an environment in which the computing system 1100 is in communication with a robot and a camera, such as the robot 3300 and the camera 3200/3200A/3200B in FIGS. 3A and 3B, or with any other camera or robot discussed in this disclosure. In some scenarios, such as that illustrated in FIGS. 3A and 3B, the camera (e.g., 3200) may be mounted to a stationary structure (e.g., a ceiling of a room). In other scenarios, the camera may be mounted on the robot arm (e.g., 3320), or more specifically on an end effector apparatus (e.g., 3330) of the robot (e.g., 3300).

In an embodiment, one or more steps of the method 4000 may be performed when an object (e.g., 3510) is currently in a camera field of view (e.g., 3210/3210A/3210B) of the camera (e.g., 3200/3200A/3200B). For instance, one or more steps of the method 4000 may be performed immediately after the object is in the camera field of view (e.g., 3210/3210A/3210B) or, more generally, while the object is in the camera field of view. In some scenarios, the one or more steps of the method 4000 may be performed when the object is or has been in the camera field of view. For example, when the object is in the camera field of view (e.g., 3210/3210A/3210B), the camera (e.g., 3200/3200A/3200B) may generate image information representing the object, and may communicate the image information to the computing system (e.g., 1100). The computing system may perform one or more steps of the method 4000 based on the image information, while the object is still in the camera field of view, or even when the object is no longer in the camera field of view.

Figure 5A:
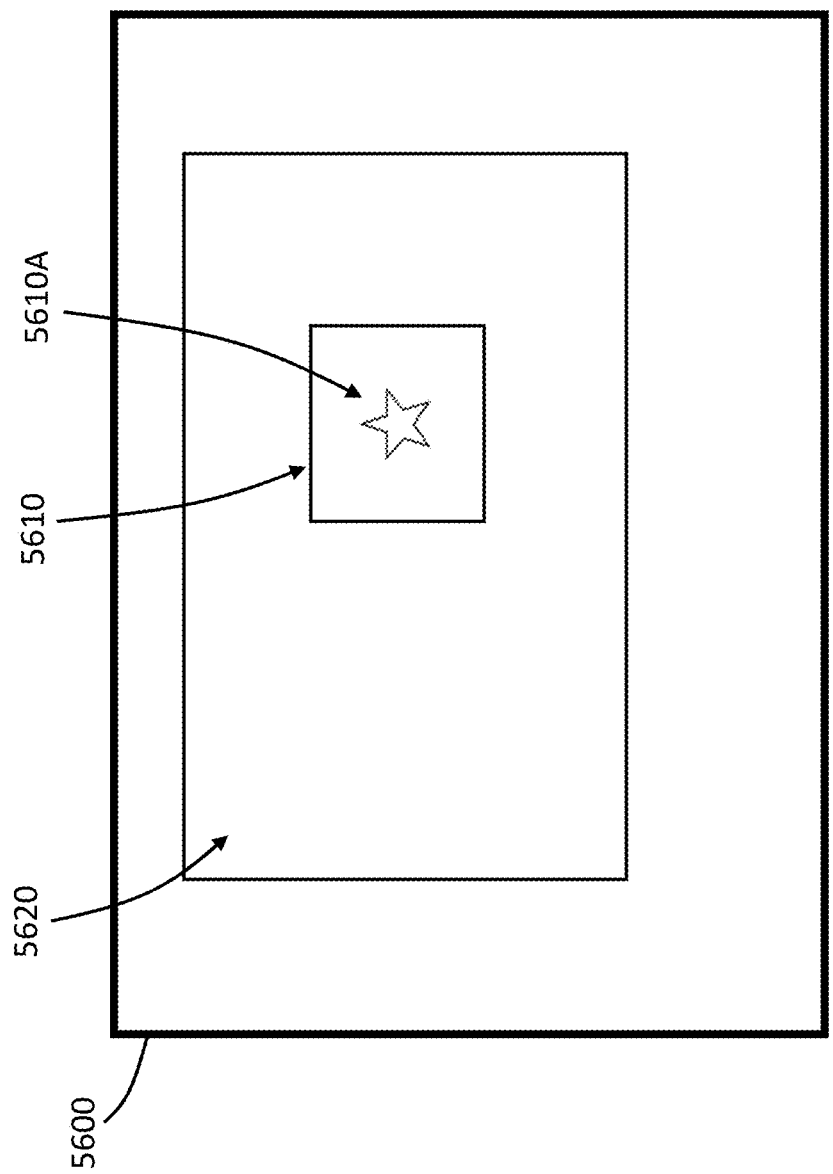
FIGS. 5A and 5B illustrate example image information from which a safety volume list may be generated, according to an embodiment hereof.

In an embodiment, the method 4000 may begin with or otherwise include a step 4002, in which the computing system 1100 receives image information representing an object in a camera field of view (e.g., 3210/3210A/3210B) of a camera (e.g., 3200/3200A/3200B). The image information may be generated by the camera when the object is (or has been) in the camera field of view, and may include, e.g., 2D image information and/or 3D image information. For instance, FIG. 5A depicts 2D image information, or more specifically a 2D image 5600, which is generated by the camera 3200/3200A and which represents the objects 3510, 3520 of FIGS. 3A and 3B. More specifically, the 2D image 5600 may describe an appearance of the objects 3510, 3520 from a viewpoint of the camera 3200/3200A. The 2D image 5600 may include a first portion 5610 (e.g., a first region of pixels, also referred to as a pixel region) that represents one or more surfaces (e.g., a top surface) of the object 3510, and include a second portion 5620 that represents one or more surfaces (e.g., top surface) of the object 3520. In the example of FIG. 5A, the first portion 5610 may include a set of pixels 5610A which capture or otherwise represent visual markings or other visual detail disposed (e.g., printed) on the top surface of the object 3510.

Figure 5B:
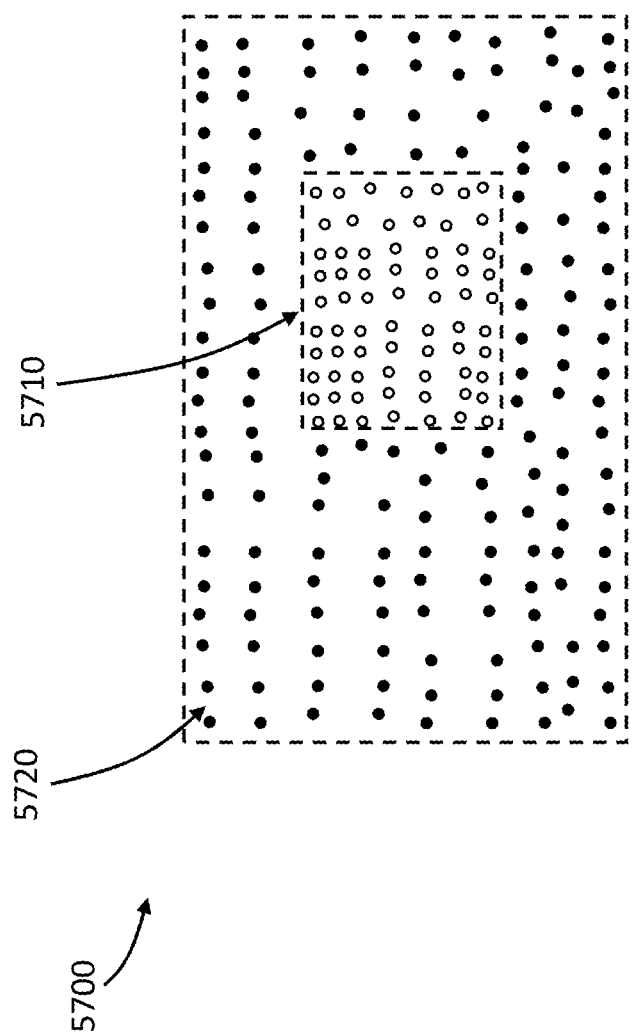

FIG. 5B depicts an example in which the image information in step 4002 includes 3D image information 5700. More particularly, the 3D image information 5700 may include, e.g., a depth map or a point cloud that indicates respective depth values of various locations on one or more surfaces (e.g., top surface) of the objects 3510/3520. For instance, the 3D image information 5700 may include a first portion 5710 that indicate respective depth values for a set of locations on a surface of the object 3510, and include a second portion 5720 that indicates respective depth values for a set of locations on a surface of the object 3520. The respective depth values may be relative to the camera (e.g., 3200/3200B) which generated the 3D image information, or may be relative to some other reference point. In some implementations, the 3D image information may include a point cloud which includes respective coordinates for various locations on structures of objects in the camera field of view (e.g., 3210/3210B). In the example of FIG. 5B, the point cloud may include a first set of respective coordinates that describe the set of locations on the object 3510, and a second set of respective coordinates to describe the set of locations on the object 3520. The coordinates may be 3D coordinates, such as [X Y Z] coordinates, and may have values that are relative to a camera coordinate system, or some other coordinate system.

Returning to FIG. 4, the method 4000 may in an embodiment include a step 4004, in which the computing system 1100 may identify a set of one or more matching object recognition templates. In an embodiment, a matching object recognition template for an object (e.g., 3510) or its image information may be an object recognition template that satisfies a predefined template matching condition when compared against the image information. The predefined template matching condition may be a condition that indicates when template information in an object recognition template sufficiently matches (e.g., is sufficiently similar to) the image information. The computing system 1100 may be configured to compare the image information to each object recognition template of one or more object recognition templates in a template storage space to determine which object recognition template (if any) of the one or more object recognition templates satisfies the predefined template matching condition. The object recognition template(s) that satisfies the predefined template matching condition may be referred to as a matching object recognition template(s).

Figure 6A:
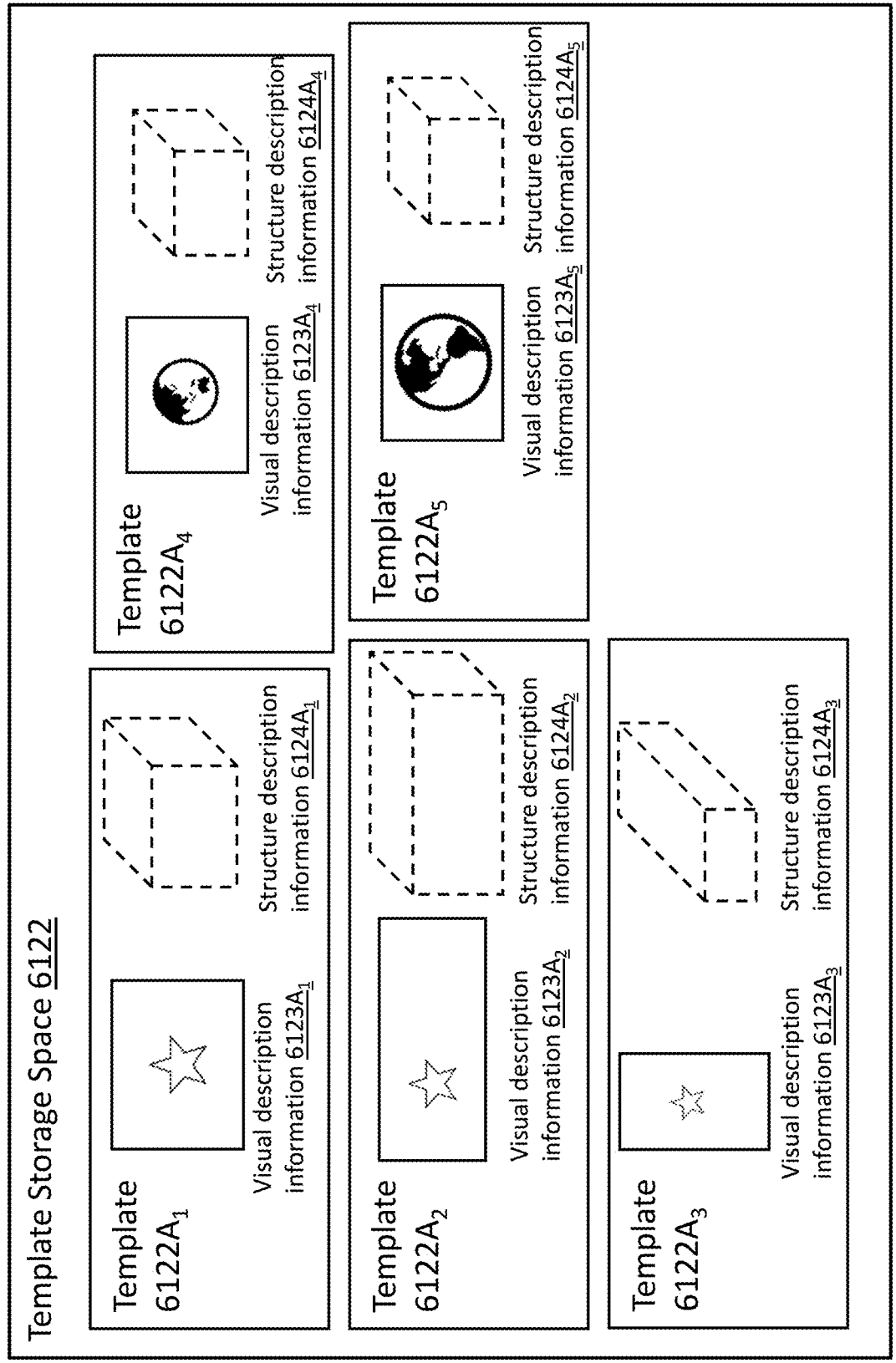

For example, the computing system 1100 in step 4004 may compare the image information (e.g., 5610/5710) that represents the object (e.g., 3510) in the camera field of view (e.g., 3210/3210A/3210B) with a set of object recognition templates, such as a set of object recognition templates $6122A_1$ through $6122A_5$ illustrated in FIG. 6A. The object recognition templates $6122A_1$ through $6122A_5$ may be stored in a template storage space 6122, which may be an embodiment of the template storage space 1122 of FIG. 2C. The template storage space 6122 may be located in, e.g., the non-transitory computer-readable medium 1120, or may be located in another device (e.g., 1400).

In some instances, the set of object recognition templates $6122A_1$ through $6122A_5$ may be textured templates, and the template storage space 6122 may be dedicated to storing textured templates. A textured template may be a template that describes an object or object type which has at least a threshold level of visual detail in its appearance. The level of visual detail described by a template may be indicated by, e.g., how many feature descriptors are identified in the template's visual description information (e.g., $6123A_1$, $6123A_2$, $6123A_3$, $6123A_4$, or $6123A_5$), an amount of edges detected in image information from which the template is generated, and/or a level of contrast or variance among pixel values in the image information from which the template is generated. The image information may represent a particular object or object type, and may have been used to generate template information (e.g., visual description information) for the template during an object registration operation. In some implementations, the template may be considered to meet or exceed the threshold level of visual detail if, e.g., the image information from which the template is generated satisfies one or more predefined conditions that involve an amount of feature descriptors, edges, and/or variance or contrast in the image information. Textured templates are discussed in more detail in U.S. application Ser. No. 16/991, 510, the entire content of which is incorporated by reference herein. In some instances, as discussed in more detail with respect to FIG. 7A, an object recognition template may be a textureless template.

In an embodiment, the object recognition templates $6122A_1$ through $6122A_5$ may represent different objects or types of objects (also referred to as object types), and may describe respective object designs (e.g., visual design and/or physical design) associated with the different objects or object types. As stated above, the object recognition templates $6122A_1$ through $6122A_5$ may have been generated as part of an object registration process, in which different objects associated with different object types were in the camera field of view (e.g., 3210/3210A/3210B), and the object recognition templates $6122A_1$ through $6122A_5$ were generated based on respective sets of image information representing the different objects or object types. In some instances, the object recognition templates $6122A_1$ through $6122A_5$ may have been generated in some other manner (e.g., manually generated), and may have then been communicated to the template storage space 6122 for storage therein.

In an embodiment, the set of object recognition templates $6122A_1$ through $6122A_5$ may be associated with a set of respective detection hypotheses, or more specifically may represent the respective detection hypotheses. In this example, a detection hypothesis may be a hypothesis regarding what object or object type is represented by the image information received in step 4002, or more specifically an estimate regarding what object or object type is represented by the image information. For instance, the object recognition template $6122A_1$ may represent an object type that has or is associated with a particular object design (e.g., visual design and/or physical design) described by template information in the object recognition template $6122A_1$. The template information which describes the object design may include visual description information $6123A_1$ and/or structure description information $6124A_1$ (also referred to as object structure information or object structure description), which are discussed below in more detail. In this example, the object recognition template $6122A_1$ may represent, or is otherwise associated with, a respective detection hypothesis which estimates that the object (e.g., 3510) represented by the image information (e.g., 5600) or by the portion 5610 thereof belongs to or has an object type represented by the object recognition template $6122A_1$. In other words, the detection hypothesis associated with the object recognition template $6122A_1$ may be a hypothesis or guess that the image information represents an object which has an object type represented by or otherwise associated with the object recognition template $6122A_1$. Similarly, a detection hypothesis associated with the object recognition template $6122A_2$/$6122A_3$/$6122A_4$/$6122A_5$ may be a hypothesis or guess that the image information represents an object having an object type associated with the object recognition template $6122A_2$/$6122A_3$/$6122A_4$/$6122A_5$. In some implementations, a detection hypothesis may include or may be represented by a template identifier (e.g., template ID) associated with a particular object recognition template. For example, the detection hypothesis associated with the object recognition template $6122A_1$ may, in some implementations, include a template ID that identifies the object recognition template $6122A_1$. In some implementations, a detection hypothesis may include or may be represented by an object type identifier, which may identify a particular object type. For instance, the object recognition template $6122A_1$ may be associated with or represent an object type having a particular object type ID, and the detection hypothesis associated with the object recognition template $6122A_1$ may include or may be represented by the object type ID.

As stated above, the object recognition templates $6122A_1$ through $6122A_5$ may be associated with respective detection hypotheses, which are respective estimates on which object or object type is represented by the image information received in step 4002. In an embodiment, the computing system 1100 may be configured to calculate or otherwise determine respective confidence values associated with the object recognition templates $6122A_1$ through $6122A_5$, or associated with the respective detection hypotheses. More specifically, the respective confidence values may be associated with comparing the image information to the object recognition templates $6122A_1$ through $6122A_5$, and may indicate respective levels of confidence in the detection hypotheses, or more specifically respective degrees by which the object recognition templates $6122A_1$ through $6122A_5$ matches the image information or a portion thereof. The confidence values may be calculated before step 4004 is performed, while step 4004 is being performed or as part of step 4004, or at some other time.

In the example of FIG. 6A, each of the object recognition templates $6122A_1$ through $6122A_5$ may include respective visual description information and respective structure description information. As discussed above, the visual description information (e.g., $6123A_1$) of an object recognition template may describe or otherwise represent an appearance of an object or object type associated with the object recognition template, or more specifically may describe a visual design associated with the object or object type. In one example, the visual description information in an object recognition template may include one or more descriptors (e.g., feature descriptors) which are generated based on, or more specifically encode, visual markings or other visual detail that appear on an object or object type associated with the object recognition template. In an embodiment, the structure description information (e.g., $6124A_1$) in an object recognition template may describe a structure (also referred to as physical structure) of an object or object type associated with the object recognition template. For example, the structure description information in the object recognition template may describe an object size or object shape associated with the object type, or more specifically of objects that belong to or have the object type. In some implementations, the structure description information may include a point cloud (e.g., a simulated point cloud) or a computer-aided design (CAD) file that describes object structure associated with an object type.

Figure 6B:
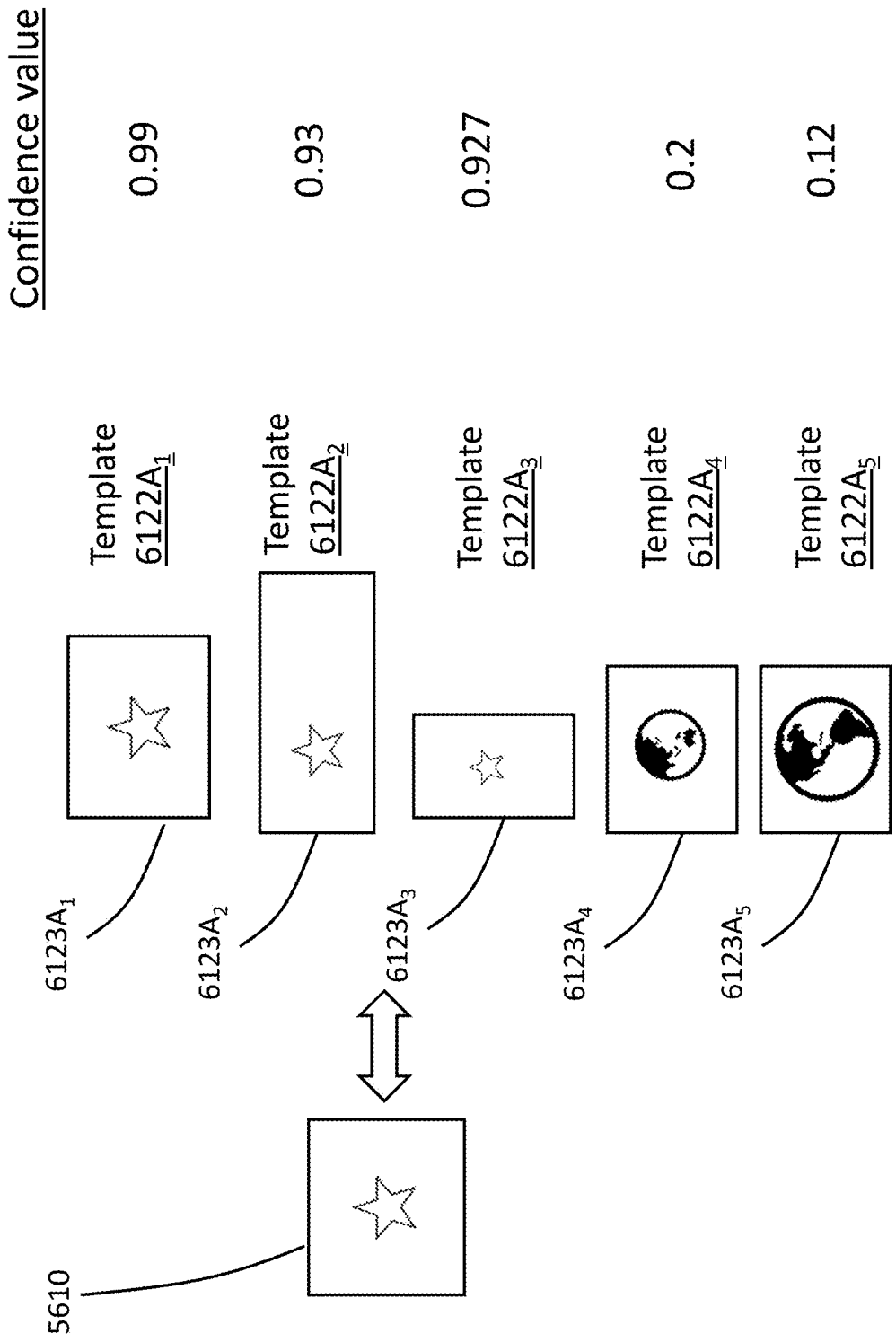

As stated above, computing system 1100 may compare the image information received in step 4002 with a set of object recognition templates. FIG. 6B is a depiction of the image information in FIG. 5A, or more specifically a portion 5610 of the 2D image 5600 (which represents the object 3510) being compared with the set of object recognition templates $6122A_1$ through $6122A_5$, or more specifically with respective sets of visual description information $6123A_1$ through $6123A_5$ in the set of object recognition templates. For example, if the respective sets of visual description information $6123A_1$ through $6123A_5$ include descriptors, the computing system 1100 may determine descriptors from the image information (e.g., 5610). The computing system 1100 may then compare the descriptors from the image information with the descriptors in the respective sets of visual description information $6123A_1$ through $6123A_5$. The computing system 1100 may generate the descriptors (e.g., feature descriptors) based on a technique such as the scale-invariant feature transform (SIFT) algorithm, the speeded up robust features (SURF) algorithm, the feature from accelerated segment test (FAST) detection algorithm, and/or the oriented FAST and rotated binary robust interdependent elementary features (ORB) algorithm, or some other technique.

In an embodiment, the computing system 1100 in step 4002 may determine how closely the image information (e.g., 5610) matches each of the set of object recognition templates ($6122A_1$ through $6122A_5$). For instance, as illustrated in FIG. 6B, the computing system 1100 may calculate respective confidence values associated with the object recognition templates $6122A_1$ through $6122A_5$, by comparing the image information or portion 5610 thereof against the object recognition templates $6122A_1$ through $6122A_5$. As discussed above, the object recognition templates $6122A_1$ through $6122A_5$ may be associated with a set of respective detection hypotheses. Thus, the calculated confidence values may be further associated with the set of respective detection hypotheses. In some implementations, the confidence values may be stored as part of object detection information. For example, FIG. 6C illustrates a set of confidence values associated with the object recognition templates $6122A_1$ through $6122A_5$, and associated with the corresponding detection hypotheses $A_1$ through $A_5$. The confidence values may be stored as part of object detection information 6126 (which may be an embodiment of object detection information 1126). The confidence values may indicate respective levels of confidence in the set of respective detection hypotheses. More particularly, the confidence values may indicate respective degrees by which the image information (e.g., 5600), or a portion thereof (e.g., 5610), matches the object recognition templates $6122A_1$ through $6122A_5$ associated with the set of respective detection hypotheses $A_1$ through $A_5$. For example, if the image information includes 2D image information that represents an appearance of an object (e.g., 3510) in the camera field of view (e.g., 3210/3210A), the confidence values may indicate respective degrees by which the 2D image information matches the respective sets of visual description information $6123A_1$ through $6123A_5$ in the object recognition templates $6122A_1$ through $6122A_5$. In some implementations, the confidence values may indicate respective degrees of similarity between the 2D image information and the respective sets of visual description information $6123A_1$ through $6123A_5$.

In an embodiment, if the image information includes 3D image information, the confidence values may indicate respective degrees by which the 3D image information matches the respective sets of structure description information $6124A_1$ through $6124A_5$. For instance, the confidence values may indicate respective degrees of similarity between the 3D image information and the respective sets of structure description information $6124A_1$ through $6124A_5$.

As stated above, a matching object recognition template may be an object recognition template that satisfies a predefined template matching condition when compared against the image information (e.g., 5600), or a portion (e.g., 5610) of the image information. Thus, the set of one or more matching object recognition templates discussed above, and a set of respective one or more detection hypotheses associated with the set of one or more matching object recognition templates, may each satisfy the predefined template matching condition. In an embodiment, the predefined template matching condition may involve an object recognition template having or being associated with a confidence value which indicates that the object recognition template has a sufficiently high level of similarity with the image information received in step 4002, and/or indicating that a level of difference between the object recognition template and the image information is sufficiently low. For example, the predefined template matching condition may be or may include a condition in which a confidence value assigned to or otherwise associated with an object recognition template exceeds a predefined template matching threshold. This predefined threshold may be, e.g., a value that was defined manually, or that was previously calculated or otherwise defined by the computing system 1100, and may be stored in, e.g., the non-transitory computer-readable medium 1120/1400 or stored elsewhere.

In one example, possible confidence values may be in a range from a minimum possible confidence value of 0 to a maximum possible confidence value of 1.00, and the predefined template matching threshold in the example may be, e.g., 0.90 or 0.80. In such an example, the predefined template matching condition may involve a confidence value being equal to or exceeding the predefined template matching threshold. Based on this example template matching condition, the computing system 1100 may identify one or more matching object recognition templates, and/or may identify one or more detection hypotheses associated with the one or more matching object recognition templates, respectively. For instance, the computing system 1100 may identify the object recognition templates $6122A_1$ through $6122A_3$ as matching object recognition templates, because their respective confidence values exceed 0.90 or exceed 0.80, and may determine that object recognition templates $6122A_4$ and $6122A_5$ are not matching object recognition templates, because their respective confidence values are below 0.90 or are below 0.80. Thus, in the example of FIGS. 6B and 6C, the computing system 1100 may identify multiple matching object recognition templates ($6122A_1$ through $6122A_3$) from among a plurality of object recognition templates ($6122A_1$ through $6122A_5$). The multiple matching object recognition templates $6122A_1$ through $6122A_3$ may be associated with detection hypothesis $A_1$, detection hypothesis $A_2$, and detection hypothesis $A_3$ in FIG. 6C.

Returning to FIG. 4, the method 4000 may in an embodiment include a step 4006 in which the computing system 1100 selects, as a primary detection hypothesis, a detection hypothesis from among a set of one or more detection hypotheses that are associated with the one or more matching object recognition templates, respectively. As discussed above, the one or more matching object recognition templates may be object recognition templates that, e.g., satisfy a predefined template matching condition when compared against the image information of step 4002. If the image information includes 2D image information, as depicted in FIG. 5A, the one or more matching object recognition templates (e.g., $6122A_1$, $6122A_2$, $6122A_3$) may each include a respective set of visual description information (e.g., $6123A_1$, $6123A_2$, $6123A_3$) which is determined by the computing system 1100 (e.g., by the processing circuit 1110) to satisfy the predefined template matching condition when compared against the received 2D image information. If the image information includes 3D image information, as depicted in FIG. 5B, the one or more matching object recognition templates may each include a respective set of structure description information that is determined by the computing system 1100 to satisfy the predefined template matching condition when compared against the received 3D image information.

In an embodiment, the computing system 1100 may perform step 4006 by selecting, as a primary object recognition template, a matching object recognition template from among the set of one or more matching object recognition templates identified in step 4004. The primary detection hypothesis that is identified in step 4006 may be a detection hypothesis that is associated with the primary object recognition template. In the example of FIGS. 6B and 6C, the one or more matching object recognition templates may include the object recognition templates $6122A_1$ through $6122A_3$. In such an example, the primary object recognition template may be selected from among the matching object recognition templates $6122A_1$ through $6122A_3$. Thus, the primary object recognition template may be a matching object recognition template, which may include, e.g., visual description information and/or structure description information that is determined by the computing system 1100 to match the predefined template matching condition when compared against the image information (e.g., 2D image information or 3D image information). In an embodiment, the computing system 1100 may select the primary detection hypothesis from among one or more detection hypothesis that are associated with the one or more matching object recognition templates. For instance, if the matching object recognition templates are templates $6122A_1$ through $6122A_3$, which are associated with detection hypotheses $A_1$ through $A_3$, then the primary detection hypothesis may be a detection hypothesis selected from among detection hypotheses $A_1$ through $A_3$.

In an embodiment, the primary detection hypothesis or the primary object recognition template may be a detection hypothesis or a matching object recognition template which has a confidence value that is highest among a set of one or more respective confidence values. The set of one or more confidence values may be associated with the set of one or more matching object recognition templates (e.g., $6122A_1$ through $6122A_3$), and/or with one or more corresponding detection hypotheses (e.g., detection hypotheses $A_1$ through $A_3$). For instance, FIG. 6D depicts an example in which the computing system 1100 identifies detection hypothesis $A_1$ as the primary detection hypothesis, and/or identifies the object recognition template $6122A_1$ as the primary object recognition template. The primary detection hypothesis may be described or identified by, e.g., the object detection information 6126. In this example, the object recognition template $6122A_1$ may be identified as the primary object recognition template because it is a matching object recognition template that has a highest confidence value (e.g., 0.99) among respective confidence values (e.g., 0.99, 0.93, 0.927) of the matching object recognition templates (e.g., $6122A_1$, $6122A_2$, $6122A_3$). In some implementations, the computing system 1100 may identify the detection hypothesis $A_1$ as the primary detection hypothesis because the detection hypothesis $A_1$ has a highest confidence value among the respective confidence values discussed above.

In an embodiment, the computing system 1100 may randomly select the primary object recognition template from among the set of one or more matching object recognition templates, and/or may randomly select the primary detection hypothesis from among a set of one or more detection hypotheses associated with the set of one or more matching object recognition templates. Such a random selection may occur when, e.g., the matching object recognition templates or their detection hypotheses have respective confidence values which are very similar or substantially equal. For example, if the matching object recognition templates $6122A_1$ through $6122A_3$ and their corresponding detection hypotheses $A_1$ through $A_3$ have respective confidence values which are the same or extremely similar, the computing system 1100 may be configured to randomly select one of the matching object recognition templates $6122A_1$ through $6122A_3$ as the primary object recognition template, and/or randomly select one of the corresponding detection hypotheses $A_1$ through $A_3$ as the primary detection hypotheses. In some implementations, if the computing system 1100 is randomly selecting the primary object recognition template from among the set of one or more matching object recognition templates, rather than using confidence values to perform such a selection, the computing system 1100 may omit the calculation of confidence values.

Figure 6E:
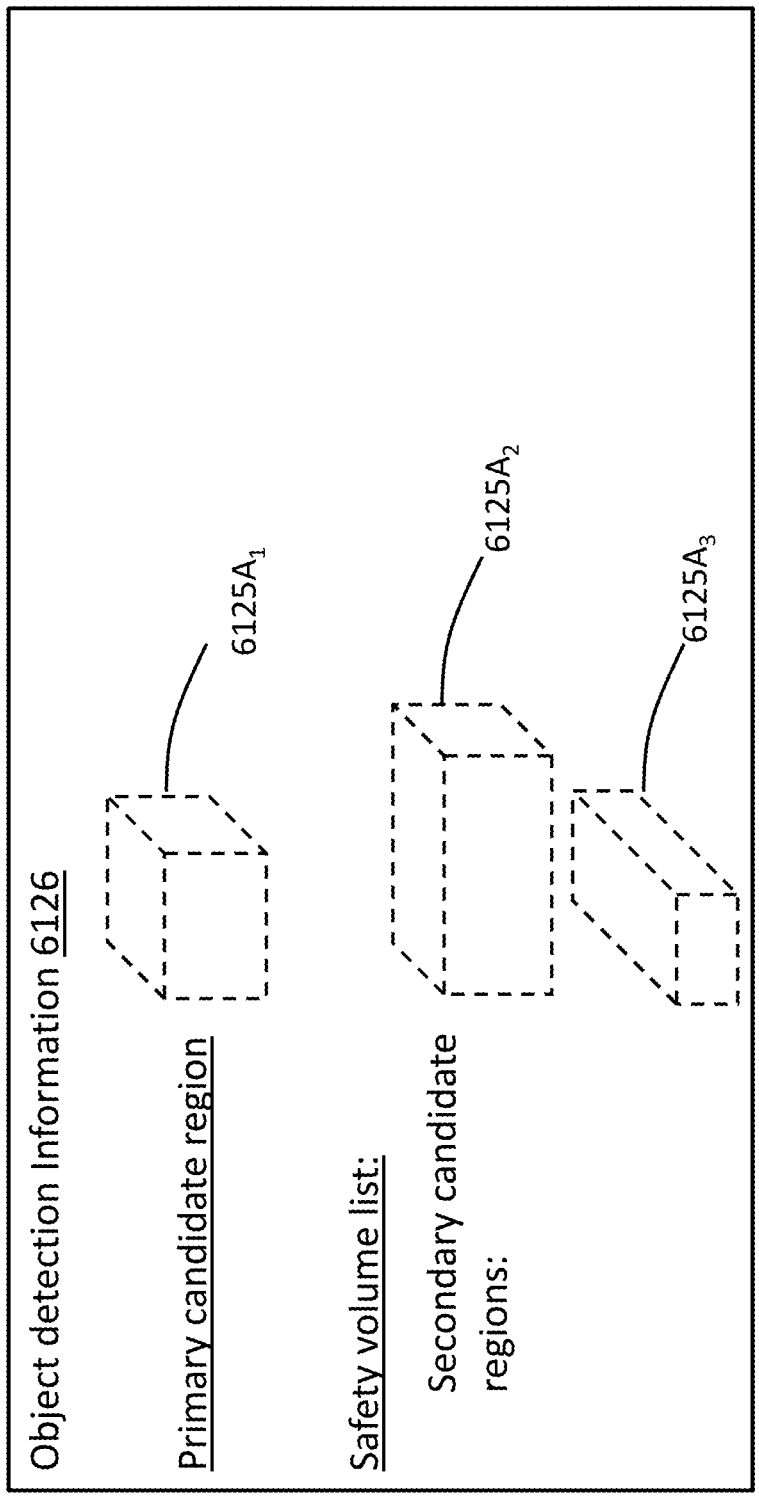

Returning to FIG. 4, the method 4000 may in an embodiment include a step 4008, in which the computing system 1100 may generate a primary candidate region, which may be a candidate region that is based on the primary detection hypothesis, or more specifically based on a matching object recognition template associated with the primary detection hypothesis. Such a matching object recognition template may be the primary object recognition template discussed above. As an example, FIG. 6E illustrates the object detection information 6126 describing a primary candidate region $6125A_1$, which may be generated based on the primary object recognition template, which in this example is the object recognition template $6122A_1$. In an embodiment, a candidate region may be an estimate of object boundary locations for an object (e.g., 3510) or an estimate of which locations in a camera field of view (e.g., 3210) are occupied by the object. The object boundary locations or the locations occupied by the object may correspond to or represent a region of space occupied by the object. In this embodiment, the estimated object boundary locations may refer to, e.g., estimated locations for one or more boundaries which define a physical structure of an object. For instance, a candidate region for an object (e.g., 3510) represented by the received image information of step 4002 may define an estimated physical region in a camera field of view (e.g., 3210) that is occupied by the object. In some implementations, the candidate region may define the physical region by defining or identifying corners or edges which surround the physical region, by defining or identifying a size (e.g., a length value, width value, and/or height value) of the physical region, and/or by defining or identifying a shape of the physical region. In such an example, the object boundary locations may be estimated by the one or more edges or corners of the candidate region.

In some instances, the primary candidate region (e.g., $6125A_1$) may be generated based further on the image information of step 4002. For example, the computing system 1100 may use the image information of step 4002 to determine a location of a feature of the object (e.g., 3510) represented by the image information, such as a location of an object corner or object edge. In this example, if the primary candidate region (e.g., $6125A_1$) has a corner or edge, the computing system 1100 may determine a location of the corner or edge of the primary candidate region to be equal to or based on the location of the object corner or object edge.

As stated above, the computing system 1100 may generate the primary candidate region based on the primary object recognition template, which may be the matching object recognition template that is associated with the primary detection hypothesis. More generally, a candidate region may be generated based on an object recognition template associated with the candidate region. For instance, an object recognition template may include structure description information that identifies an object size and/or an object shape associated with an object type, and a candidate region may be generated based on the structure description information in the object recognition template. As an example, the computing system 1100 may generate the primary detection region $6125A_1$ based on the structure description information $6124A_1$ of the object recognition template $6122A_1$. In certain instances, the computing system 1100 may determine or generate the candidate region (e.g., $6125A_1$) to have a size and/or shape that is the same or substantially the same as the object size and/or object shape described by the structure description information (e.g., $6124A_1$) in the corresponding object recognition template (e.g., $6122A_1$).

Returning to FIG. 4, the method 4000 may in an embodiment include a step 4010, in which the computing system 1100 determines at least one of: (i) whether the set of one or more matching object recognition templates has, in addition to the primary matching object recognition template (e.g., $6122A_1$, which is a matching object recognition template associated with a primary detection hypothesis $A_1$), a subset of one or more remaining matching object recognition templates (e.g., $6122A_2$, $6122A_3$), or (ii) whether the image information has a portion representing an unmatched region.

More particularly, one aspect of the present disclosure relates to improving a robustness of object detection, by not only identifying a primary object recognition template or a primary detection hypothesis which may be useful for planning robot interaction with an object, but also identifying other object recognition templates or detection hypotheses which may also be useful for planning robot interaction. For instance, some scenarios may involve more than one object recognition template matching image information representing an object (e.g., satisfying a predefined template matching condition when compared against the image information). In other words, one aspect of the present disclosure relates to a situation in which, in addition to the primary object recognition template (e.g., $6122A_1$, which is a matching object recognition template with respect to the image information 5600/5610), there are one or more additional matching object recognition templates (e.g., $6122A_2$, $6122A_3$), which also satisfy the predefined template matching condition when compared against the image information. For instance, the one or more additional object recognition templates may be associated with respective confidence values that are all above the predefined template matching threshold. In certain situations, if imaging noise or other sources of error create a risk that the primary detection hypothesis, primary object recognition template, or primary candidate region is not completely accurate in representing the object or being used to plan the robot interaction, then the one or more additional detection hypotheses or one or more additional object recognition templates may be used to compensate against that risk. For instance, they may be used to generate a safety volume list, which is discussed below in more detail, that may provide additional information which may be taken into account when planning the robot interaction. By taking this additional information into account when performing the object detection and/or planning the robot interaction, these processes may become more robust and less susceptible to various sources of error.

In one example, the computing system 1100 may perform step 4010 by determining whether the set of one or more matching object recognition templates discussed above includes multiple matching object recognition templates. Such a set of multiple matching object recognition templates may include the primary object recognition template ($6122A_1$) and further include a subset of one or more remaining matching object recognition templates (e.g., $6122A_2$, $6122A_3$). As stated above, the subset of one or more remaining matching object recognition templates may be one or more object recognition templates that also satisfy the predefined template matching condition when compared against the image information (e.g., 5600/5610). For instance, if the image information includes 2D image information, at least one matching object recognition template (e.g., $6122A_2$, $6122A_3$) in the subset may include a respective set of visual description information (e.g., $6123A_2$, $6123A_3$) that satisfies the predefined template matching condition when compared against the image information, which may indicate that the visual description information (e.g., $6123A_2$, $6123A_3$) is sufficiently similar to the image information. In other words, at least one matching object recognition template (e.g., $6122A_2$, $6122A_3$) in the subset of one or more matching object recognition templates may satisfy the predefined matching condition by matching a visual appearance of an object represented by the image information (e.g., 5600/5610). The computing system 1100 may be configured to generate a safety volume list, which is discussed below, based on the at least one object recognition template. As further stated above, the primary object recognition template ($6122A_1$) may in some instances satisfy the predefined template matching condition also by matching the visual appearance of the object.

In some situations, one or more matching object recognition templates may satisfy the predefined template matching condition by matching a structure of the object represented by the image information (e.g., 5700/5710). These matching object recognition templates may include a primary object recognition template, and/or may include another matching object recognition template. For instance, if the image information received in step 4002 includes a combination of the 2D image 5600 and the 3D image information 5700, the object recognition template $6122A_1$ may have visual description information $6123A_1$ which satisfies the predefined template matching condition when compared against 2D image 5600, and may further have structure description information $6124A_1$ which also satisfies the predefined template matching condition when compared against 3D image information 5700. As another example, FIG. 7A, discussed below in more detail, depicts an object recognition template $7122B_1$ having structure description information $7124B_1$ that satisfies the predefined template matching condition when compared against the 3D image information 5700 (e.g., point cloud). The computing system 1100 may be configured to generate a safety volume list, which is discussed below, based on the object recognition template.

In the example of FIG. 6A-6C, the primary object recognition template $6122A_1$ may be a matching object recognition template associated with detection hypothesis $A_1$, while the subset of remaining matching object recognition templates $6122A_2$ and $6122A_3$ may be associated with detection hypotheses $A_2$ and $A_3$, respectively. The detection hypothesis $A_1$ may be a primary detection hypothesis used to plan robot interaction with the object 3510 represented by the image information 5600/5610, while detection hypotheses $A_2$ and $A_3$ may be secondary detection hypotheses also used to plan the robot interaction.

As also stated above, one aspect of the present disclosure relates to a situation in which the primary object recognition template may match or otherwise correspond to a first portion of the image information, but a second portion of the image information does not sufficiently match any existing object recognition template that are available from one or more template storage spaces (e.g., 1122). In other words, a first physical region that is captured or otherwise represented by image information may be matched by or explained by, e.g., the primary object recognition template, while a second physical region represented by the image information does not sufficiently match any existing object recognition template in one or more template storage spaces. The first physical region may correspond to, e.g., the primary candidate region discussed above, while the second physical region may be referred to as an unmatched region or unexplained region. More specifically, the unmatched region or unexplained region may be a region which is represented by a portion of the image information that fails to satisfy the predefined template matching condition when compared against existing object recognition templates. Thus, in some scenarios, the computing system in step 4010 may determine whether the image information has a portion (e.g., second portion, also referred to as an unmatched image portion) representing an unmatched region. In some implementations, the computing system 1100 may specifically determine whether there is an unmatched region which is adjacent to the primary candidate region. Scenarios involving an unmatched region is discussed below in more detail with respect to, e.g., FIGS. 11A-11E and 12A-12H.

Returning to FIG. 4, the method 4000 may in an embodiment include a step 4012, in which the computing system 1100 generates a safety volume list. In an embodiment, the safety volume list may be generated in response to a determination that the set of one or more matching object recognition templates does have, in addition to the primary object recognition template, the subset of one or more remaining matching object recognition templates, and/or in response to the image information having an image portion representing an unmatched region. The safety volume list may be a list of one or more candidate regions, a list of one or more detection hypotheses, and/or a list of one or more unmatched regions.

In some implementations, if the safety volume list is a list of one or more detection hypotheses, the one or more detection hypotheses may be associated with the subset of one or more remaining matching object recognition templates discussed above. For example, FIGS. 6A-6C depict an example in which there is a set of multiple matching object recognition templates, including the primary object recognition template $6122A_1$ and a subset of remaining matching object recognition templates $6122A_2$, $6122A_3$. As discussed above with respect to FIG. 6D, the computing system may identify or describe, as part of the object detection information 6126, a primary detection hypotheses $A_1$ associated with the primary object recognition template $6122A_1$. In this example, the computing system 1100 may further include, in the object detection information 6126, a safety volume list which identifies one or more secondary detection hypotheses that are associated with the subset of remaining matching object recognition templates $6122A_2$, $6122A_3$. More specifically, the secondary detection hypotheses may include detection hypothesis $A_2$ and detection hypothesis $A_3$, which are associated with the matching object recognition template $6122A_2$ and the matching object recognition template $6122A_3$. Thus, the object detection information 6126 may identify or describe a set of multiple detection hypotheses, which may include the primary detection hypothesis (e.g., $A_1$) associated with one of the matching object recognition template (e.g., $6122A_1$), and include a subset of one or more remaining detection hypotheses (e.g., $A_2$ and $A_3$), which are associated with the subset of one or more remaining matching object recognition templates (e.g., $6122A_2$, $6122A_3$). In some instances, the subset of remaining detection hypotheses $A_2$ and $A_3$ may be considered secondary detection hypotheses because, e.g., they are associated with confidence values (e.g., 0.93 and 0.927) that are less than a confidence value (e.g., 0.99) associated with the primary detection hypothesis $A_1$. More generally, a detection hypothesis which is not selected as a primary detection hypothesis may be considered a secondary detection hypothesis.

In an embodiment, the computing system 1100 may be configured to determine whether the safety volume list is to include a particular detection hypothesis based on whether a confidence value associated with the detection hypothesis is sufficiently similar to a confidence value associated with the primary detection hypothesis. The particular detection hypothesis may be one of the subset of one or more remaining detection hypotheses (e.g., $A_2$, $A_3$) associated with the subset of one or more remaining matching object recognition templates (e.g., $6122A_2$, $6122A_3$) discussed above. As an example, the computing system 1100 may, for each detection hypothesis in the subset of one or more remaining detection hypotheses (e.g., $A_2$, $A_3$) determine whether a respective confidence value (e.g., 0.93, 0.927) associated with the detection hypothesis is within a predefined confidence similarity threshold relative to a confidence value (e.g., 0.99) associated with the primary detection hypothesis. The predefined confidence similarity threshold may be a value that is, e.g., stored in the non-transitory computer-readable medium 1120 or elsewhere. As an example, the predefined confidence similarity threshold may be, e.g., 0.1, 0.2, or some other value. If the computing system 1100 determines that a respective confidence value associated with a particular detection hypothesis (e.g., $A_2$, $A_3$) in the subset is within the predefined confidence similarity threshold, the computing system 1100 may add the detection hypothesis to the safety volume list, more generally decide to include the detection hypothesis in the safety volume list, such that the safety volume list is generated based on the detection hypothesis. In some instances, adding a detection hypothesis (e.g., $A_2$, $A_3$) to the safety volume list may result in the safety volume list also including a candidate region (e.g., $6125A_2$, $6125A_3$ in FIG. 6E) associated with the detection hypothesis. Such a candidate region may be a secondary candidate region that is described by the object detection information 6126, along with the primary candidate region (e.g., $6125A_1$), as discussed below in more detail.

In an embodiment, the computing system 1100 may be configured to determine whether a safety volume list is to include a particular detection hypothesis based on whether a confidence value associated with the detection hypothesis is equal to or greater than the predefined template matching threshold. Such a condition may represent the detection hypothesis being associated with a matching object recognition template, and may result in the safety volume list excluding any detection hypothesis which is associated with an object recognition template that fails to satisfy the predefined template matching condition. In some implementations, each detection hypothesis in the safety volume list may be associated with a candidate region, as discussed below in more detail.

In an embodiment, the object detection information 6126 may be used by the computing system 1100 or by another computing system to plan robot interaction between a robot (e.g., 3300) and an object (e.g., 3510) represented by the received image information (e.g., 5600/5700). By including the safety volume list in the object detection information, the computing system 1100 may have access to not only the primary detection hypothesis (e.g., $A_1$) regarding what object or object type is represented by the image information, but also to one or more secondary detection hypotheses (e.g., $A_2$, $A_3$) regarding what object type or object type is represented by the image information. The safety volume list may thus make available additional information for planning a robot interaction, which may improve a robustness of the planned robot interaction, as discussed above.

In an embodiment, the safety volume list may be a list of one or more candidate regions, or more specifically a list of one or more secondary candidate regions, as also stated above. More particularly, the computing system 1100 may identify a primary candidate region (e.g., 6125$A_1$) associated with the primary object recognition template (e.g., 6122$A_1$) and/or with the primary detection hypothesis (e.g., $A_1$), as discussed above with respect to step 4008. In an embodiment of step 4012, the computing system 1100 may further generate a safety volume list which includes one or more additional candidate regions, such as candidate region 6125$A_2$ and 6125$A_3$ in FIG. 6E. Thus, the object detection information 6126 in such an embodiment may describe multiple candidate regions based on the multiple matching object recognition templates. The multiple candidate regions (e.g., 6125$A_1$ through 6125$A_3$) may include the primary candidate region (e.g., 6125$A_1$), which is generated based on the primary object recognition template, and include one or more additional candidate regions (e.g., 6125$A_2$ and 6125$A_3$), which are associated with and generated based on the subset of one or more remaining matching object recognition templates (e.g., 6122$A_2$ and 6122$A_3$). In an embodiment, each candidate region that is part of the one or more additional candidate regions may be associated with a detection hypothesis that has a respective confidence value which is within the predefined confidence similarity threshold to the confidence value of the primary detection hypothesis, as discussed above. In an embodiment, each candidate region of the one or more additional candidate regions may be associated with a respective detection hypothesis that has a confidence value greater than or equal to the predefined template matching threshold, as also discussed above.

In some instances, the one or more additional candidate regions (e.g., 6125$A_2$ and 6125$A_3$) may be considered one or more secondary candidate regions, because they may be associated with one or more secondary detection hypotheses (e.g., $A_2$ and $A_3$), respectively. Similar to the discussion with respect to the primary candidate region, each of the secondary candidate regions (e.g., 6125$A_2$ and 6125$A_3$) may also estimate object boundary locations for an object (e.g., 3510) represented by the received image information (e.g., 5600/5610), and/or estimate which locations are occupied by the object. For instance, each of the additional candidate regions (e.g., 6125$A_2$ and 6125$A_3$) may define a respective estimated physical region in a camera field of view (e.g., 3210) that is occupied by the object (e.g., 3510). In some implementations, the computing system 1100 may determine each of the one or more additional candidate regions (e.g., 6125$A_2$, 6125$A_3$) to have a size and/or shape that is the same or substantially the same as the object size and/or object shape described by respective structure description information (e.g., 6124$A_2$, 6124$A_3$) in the associated matching object recognition template (e.g., 6122$A_2$, 6122$A_3$).

In some instances, the primary candidate region (e.g., 6125$A_1$) may have a different size relative to the one or more secondary candidate regions (e.g., 6125$A_2$ or 6125$A_3$) in the safety volume list. Such a situation may be a result of the primary object recognition template (e.g., 6122$A_1$), which is associated with the primary candidate region (e.g., 6125$A_1$), describing a different object size than an object size described by an object recognition template associated with a secondary candidate region (e.g., 6125$A_2$ or 6125$A_3$) in the safety volume list. For instance, the primary object recognition template, which is associated with the primary detection hypothesis $A_1$, may have structure description information (e.g., 6124$A_1$) that indicate a first object size (e.g., a first combination of object length and object width), while the object recognition template (e.g., 6122$A_2$) associated with one of the secondary candidate regions may have structure description information (e.g., 6124$A_2$) that indicates a second object size different than the first object size.

Figure 6F:
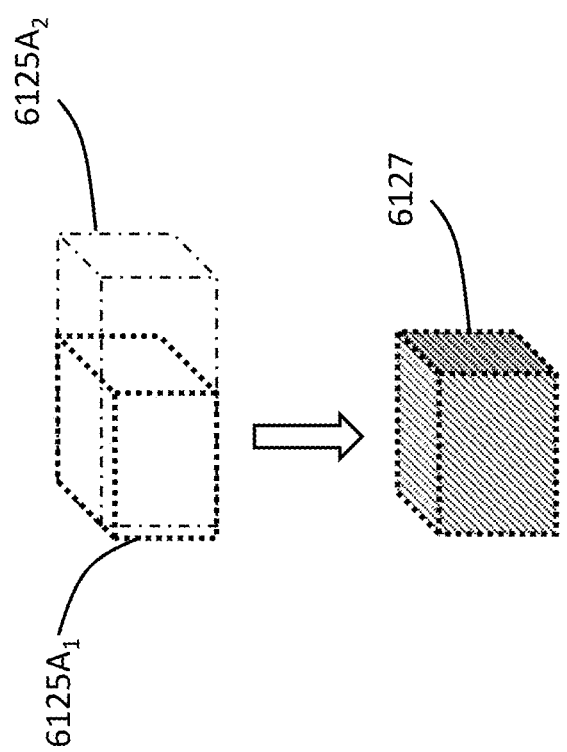

In an embodiment, the computing system 1100 may be configured to determine whether a safety volume list is to include a secondary candidate region based on an amount of overlap between the secondary candidate region and the primary candidate region. For instance, the computing system 1100 may determine whether to add the candidate region 6125$A_2$ to the safety volume list and whether to add the candidate region 6125$A_3$ to the safety volume list. As stated above, the candidate regions 6125$A_2$, 6125$A_3$ may be associated with the subset of one or more remaining matching object recognition templates 6122$A_2$, 6122$A_3$ discussed above. In this example, the computing system 1100 may be configured, for each of the candidate regions 6125$A_2$, 6125$A_3$, determine a respective amount of overlap between the candidate region and the primary candidate region 6125$A_1$. For example, FIG. 6F illustrates the computing system 1100 determining an overlapping region 6127 which is an intersection of the candidate region 6125$A_2$ and the primary candidate region 6125$A_1$. In this example, the computing system may determine an amount of overlap between the candidate region 6125$A_2$ and the primary candidate region 6125$A_1$ to be equal to or based on a volume of the overlapping region 6127. The computing system 1100 may determine whether the amount of overlap between the two regions 6125$A_1$, 6125$A_2$ exceeds a predefined overlap threshold, and include the candidate region 6125$A_2$ in the safety volume list (such that it becomes part of the one or more additional candidate regions discussed above) if the amount of overlap exceeds the predefined overlap threshold.

In an embodiment, the computing system 1100 may determine whether the safety volume list is to include a particular secondary detection hypothesis or secondary candidate region based on whether an object recognition template associated with the secondary detection hypothesis or secondary candidate region is similar to the primary object recognition template associated with the primary detection hypothesis. In some instances, the similarity may refer to the two object recognition templates having respective confidence values that are similar (e.g., having a difference that is equal to or less than the predefined confidence similarity threshold). In some instances, the similarity may refer to the two object recognition templates having similar template information, such as similar visual description information or similar structure description information.

More particularly, as discussed above, the computing system 1100 may be configured to compare image information with multiple object recognition templates, one of which may become a primary object recognition template (e.g., 6122A$_1$). The computing system 1100 may be configured to determine whether the primary object recognition template (e.g., 6122A$_1$) is similar to at least one other object recognition template (e.g., 6122A$_2$) by comparing a confidence value associated with the primary object recognition template against a confidence value associated with the at least one other object recognition template. In some instances, the computing system 1100 may be configured to compare at least one other object recognition template (e.g., 6122A$_2$) directly against the primary object recognition template (6122A$_1$), instead of or in addition to comparing that object recognition template (e.g., 6122A$_2$) against the image information. In some situations, this direct comparison of object recognition templates may be performed because a lighting condition in an environment of a camera (e.g., 3300) may affect the image information that is generated and may limit an ability to accurately compare the image information against one or more of the object recognition templates (e.g., 6122A$_2$). For instance, comparing a particular object recognition template (e.g., 6122A$_2$) to the image information in such a situation may yield a low confidence value. However, the computing system 1100 in such a situation may still decide to add the object recognition template (e.g., 6122A$_2$) or its associated detection hypothesis or candidate region to the safety volume list based on a comparison between the object recognition template and the primary object recognition template.

As an example of comparing object recognition templates, the computing system 1100 may be configured, for the plurality of object recognition templates 6122A$_1$ through 6122A$_5$ stored in the template storage space 6122, to determine whether the plurality of object recognition templates 6122A$_1$ through 6122A$_5$ has at least one object recognition template (other than the primary object recognition template 6122A$_1$ itself) that satisfies a predefined template similarity condition when compared against the primary object recognition template 6122A$_1$. As stated above, the primary object recognition template may be a matching object recognition template associated with the primary detection hypothesis A$_1$, and may be referred to in this example as a first object recognition template. In other words, the computing system 1100 may determine whether the plurality of object recognition templates 6122A$_1$ through 6122A$_5$ has, other than the primary object recognition template 6122A$_1$ or the first object recognition template, at least one object recognition template that satisfies the predefined template similarity condition when compared against the primary object recognition template 6122A$_1$. If there is at least one such object recognition template, the computing system 1100 may add the at least one object recognition template to the safety volume list, such that the safety volume list is generated based on the at least one object recognition template. As stated above, the predefined template similarity condition may involve two object recognition templates having similar visual description information (e.g., similar descriptors) and/or similar structure description information.

In an embodiment, the method 4000 of FIG. 4 may include a step in which the computing system 1100 performs motion planning based on the object detection information (e.g., 6126) discussed above, or more specifically based on a primary candidate region (e.g., 6125A$_1$) in the object detection information and based on the safety volume list in the object detection information. More particularly, the motion planning may be performed based on the primary candidate region and one or more secondary candidate regions (e.g., 6125A$_2$, 6125A$_3$), if any, in the safety volume list. The motion planning may be used for robot interaction between a robot (e.g., 3300) and the object (e.g., 3510) represented by the received image information. For example, the motion planning may involve determining motion of an end effector apparatus (e.g., 3330) of the robot to cause the end effector apparatus to grip, pick up, or otherwise engage the object, and/or may involve determining a trajectory for the end effector apparatus to follow once it has engaged the object, so as to move the object to a destination location.

Figure 6J:
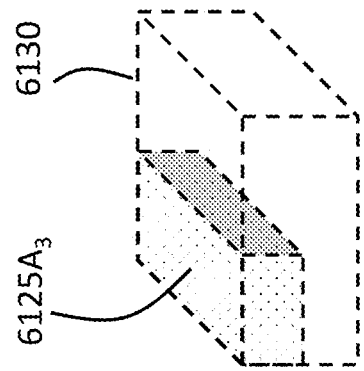
Figure 6G:
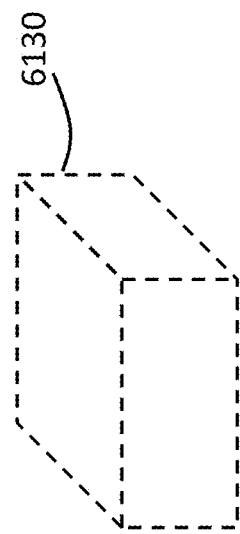
Figure 6I:
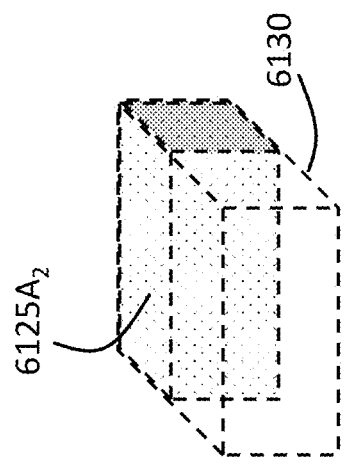
Figure 6H:
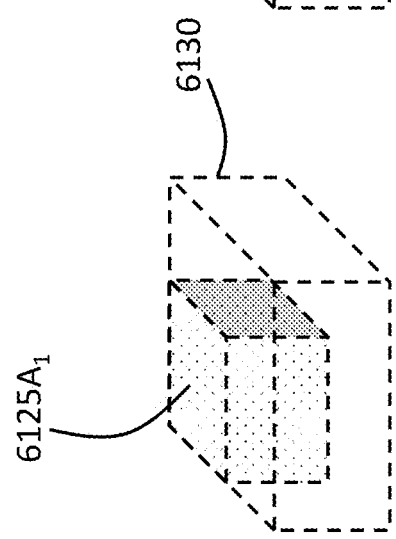

In an embodiment, the computing system 1100 may perform the motion planning by determining a bounding region (e.g., a bounding volume or a bounding box, such as a ABB bounding box), which encompasses the primary candidate region (e.g., 6125A$_1$) associated with the primary object recognition template (e.g., 6122A$_1$) and encompasses one or more additional regions. In some instances, the one or more additional regions may be the one or more secondary candidate regions (e.g., 6125A$_2$, 6125A$_3$) that are associated with the one or more secondary detection hypotheses discussed above, or more specifically associated with the subset of one or more remaining matching object recognition templates (e.g., 6122A$_2$, 6122A$_3$) discussed above. For example, FIG. 6D illustrates a bounding region 6130 which encompasses a primary candidate region 6125A$_1$, as illustrated in FIG. 6H. As illustrated in FIGS. 6I and 6J, the bounding region 6130 may further encompass additional candidate regions 6125A$_2$, 6125A$_3$, which may be secondary candidate regions in this example. In some instances, the bounding region may encompass an unmatched region, which is discussed below in more detail.

In an embodiment, the bounding region may be used by the computing system 1100 or by another computing system to determine a trajectory for an end effector apparatus (e.g., 3300) to follow after the end effector apparatus has picked up the object (e.g., 3510) represented by the received image information, so as to move the object to a destination location. For example, the computing system 1100 may use the bounding region (e.g., 6130) to determine a risk of collision if the end effector apparatus (e.g., 3330) follows the trajectory. The collision may be between the object (e.g., 3510) and structures of other objects in an environment of the robot (e.g., electrical wiring) or a structure of a room or building (e.g., a wall or beam) in which the robot is located. More particularly, the bounding region may represent a region that surrounds the object (e.g., 3510) as it is moved by the end effector apparatus (e.g., 3330). In some implementations, the computing system 1100 may determine whether the bounding region (e.g., 6130) would intersect with a structure of an object, room, or building in the environment of the robot if the bounding region (e.g., 6130) follows or substantially follows the trajectory of the end effector apparatus (e.g., 3330). The computing system 1100 may adjust the trajectory so as to avoid a situation in which the bounding region intersects such a structure in the environment of the robot. Because the bounding region (e.g., 6130) is based not only on a primary object recognition template or primary detection hypothesis, but may be also based on a safety volume list that includes, e.g., one or more secondary detection hypotheses, using the bounding region for collision avoidance may make the collision avoidance more robust. For instance, the bounding region may account for a size and shape of the object (e.g., 3310) and further include an amount of clearance around the object, so as to increase a margin of error for the collision avoidance.

In an embodiment, the computing system 1100 may perform the motion planning by using the bounding region (e.g., 6130) to determine the trajectory of the end effector apparatus (e.g., 3330) so as to reduce a risk of collision, as discussed above, and may further use the primary candidate region (e.g., 6125A$_1$) to determine robot gripping motion. The robot gripping motion may include, e.g., motion of one or more components of the end effector apparatus (e.g., 3330) to grip, pick up, or otherwise engage the object (e.g., 3510). For instance, if the object (e.g., 3510) is a container, the primary candidate region (e.g., 6125A$_1$) may provide an estimate of an external shape of the container. The computing system 1100 may be configured to determine, based on the external shape of the container, one or more locations on the container to be gripped by the end effector apparatus, and/or how the end effector apparatus is to move so as to pick up the container.

Figure 7A:
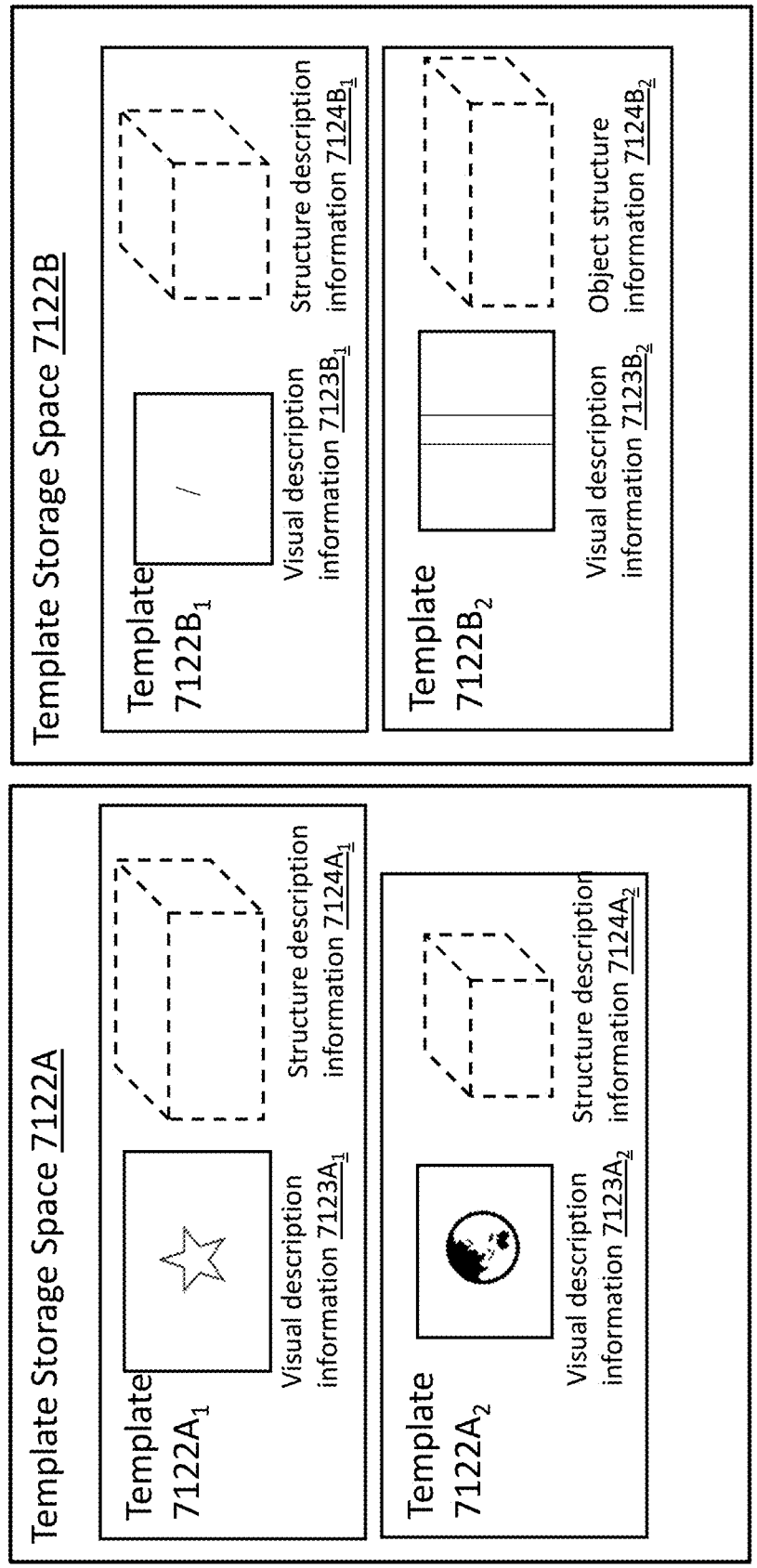

As discussed above, a matching object recognition template may have visual description information that matches 2D image information, and/or may have structure description information that matches 3D image information. For instance, FIG. 7A depicts an example in which an object recognition template 7122A$_1$ has a set of visual description information 7123A$_1$ that matches the 2D image information of FIG. 5A, or more specifically the 2D image 5600 or the portion 5610 thereof, and in which an object recognition template 7122B$_1$ has a set of structure description information 7124B$_1$ that matches the 3D image information 5700 (e.g., point cloud) of FIG. 5B, or more specifically the portion 5710 thereof. In this example, the object recognition template 7122A$_1$ may be part of a set of object recognition templates 7122A$_1$, 7122A$_2$ stored in a first template storage space 7122A, while the object recognition template 7122B$_1$ may be part of a set of object recognition templates 7122B$_1$, 7122B$_2$ in a second template storage space 7122B. The object recognition templates in FIG. 7A may each have a respective set of visual description information (e.g., 7123A$_1$, 7123A$_2$, 7123B$_1$, 7123B$_2$), and a respective set of structure description information (e.g., 7124A$_1$, 7124A$_2$, 7124B$_1$, 7124B$_2$). In an embodiment, the template storage space 7122A may be dedicated to storing textured templates, while the template storage space 7122B may be dedicated to storing textureless templates. Thus, in this example, the object recognition templates 7122A$_1$, 7122A$_2$ may be textured templates, and the object recognition templates 7122B$_1$, 7122B$_2$ may be textureless templates. A textureless template may be a template that describes an object or object type which does not have a threshold level of visual detail in its appearance. Textureless templates are discussed in more detail in U.S. application Ser. No. 16/991,510, while template storage spaces are discussed in more detail in U.S. application Ser. No. 16/991,466, the entire contents of which are incorporated by reference herein.

Figure 7C:
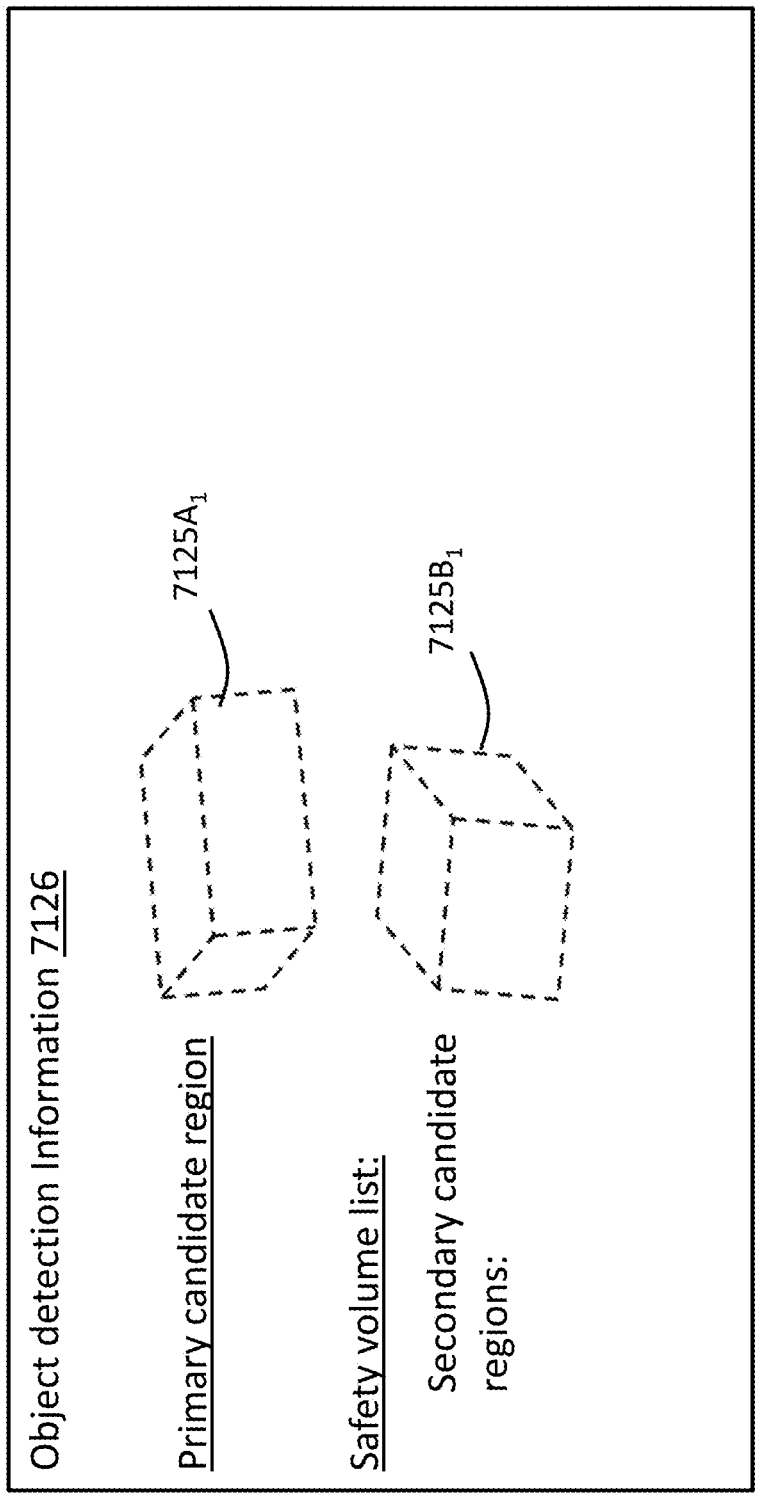

As stated above, FIG. 7A depicts a situation in which the object recognition template 7122A$_1$ and the object recognition template 7122B$_1$ may form a set of matching object recognition templates. More specifically, the object recognition template 7122A$_1$ may have visual description information 7123A$_1$ that satisfies a predefined template matching condition when compared against the 2D image 5600/5610. In one example, the object recognition template 7122A$_1$ may be a primary object recognition template, and may be associated with a primary detection hypothesis 7A$_1$, which is identified in object detection information 7126 (which may be an embodiment of the object detection information 1126) in FIG. 7B. In this example, while the object recognition template 7122A$_1$ is one matching object recognition template, the object recognition template 7122B$_1$ may form a subset of a remaining matching object recognition template. More particularly, the object recognition template 7122B$_1$ may include structure description information 7124B$_1$ which satisfies the predefined template matching condition when compared against the 3D image information 5700/5710 (e.g., point cloud). In this example, the object recognition template 7122B$_1$ may be used to generate a secondary detection hypothesis 7B$_1$ to be included in a safety volume list that is described by the object detection information 7126, as illustrated in FIG. 7B. In an embodiment, the object detection information 7126 may include a primary candidate region 7125A$_1$ that is generated based on the primary object recognition template 7122A$_1$, or more specifically based on the structure description information 7124A$_1$, as illustrated in FIG. 7C. The primary candidate region 7125A$_1$ may further be associated with the primary detection hypothesis. In this embodiment, the object detection information 7126 may include a safety volume list that describes a secondary candidate region 7125B$_1$ which is generated based on the object recognition template 7122B$_1$, or more specifically based on the structure description information 7124B$_1$, and/or is associated with the secondary detection hypothesis.

Figure 7D:
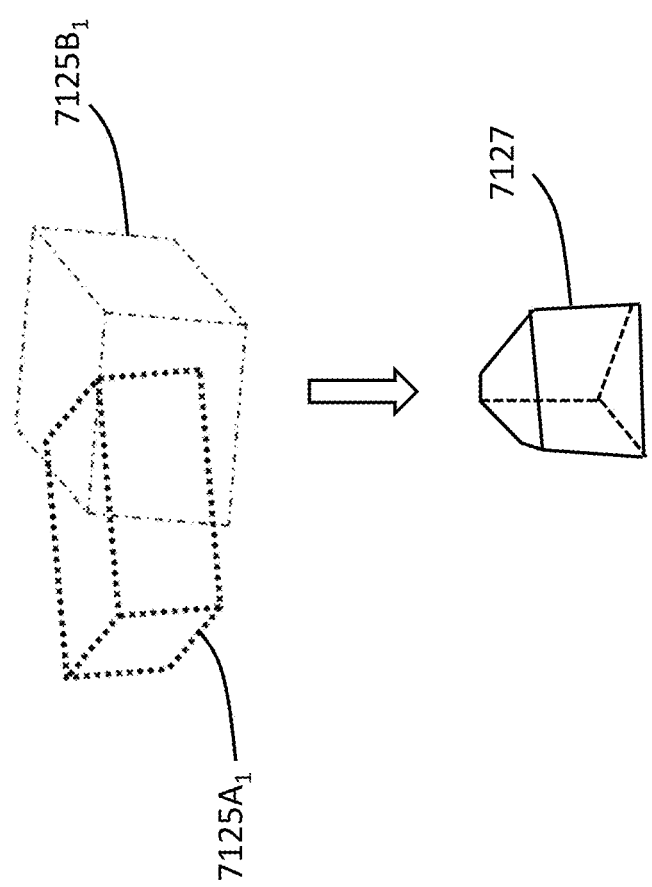

In an embodiment, the computing system 1100 may determine whether to include the secondary candidate region 7125B$_1$ in the safety volume list based on an amount of overlap between the secondary candidate region 7125B$_1$ and the primary candidate region 7125A$_1$. For example, FIG. 7D depicts an overlapping region 7127 which encloses space that is in both the secondary candidate region 7125B$_1$ and the primary candidate region 7125A$_1$. The amount of overlap may be represented by, e.g., a volume of the overlapping region 7127, or a ratio between the volume of the overlapping region 7127 and a volume of the primary candidate region 7125A$_1$. The computing system 1100 may add the secondary candidate region 7125B$_1$ to the safety volume list if the amount of overlap is equal to or greater than a predefined overlap threshold, and may otherwise exclude the secondary candidate region 7125B$_1$ from the safety volume list.

In an embodiment, as depicted in FIGS. 7E-7G, the computing system 1100 may perform motion planning for the above example by determining a bounding region 7130 which encompasses the primary candidate region 7125A$_1$ and encompasses the secondary candidate region 7125B$_1$ in the safety volume list. As stated above, the bounding region 7130 may be used to generate a trajectory for performing robot interaction.

Figure 8B:
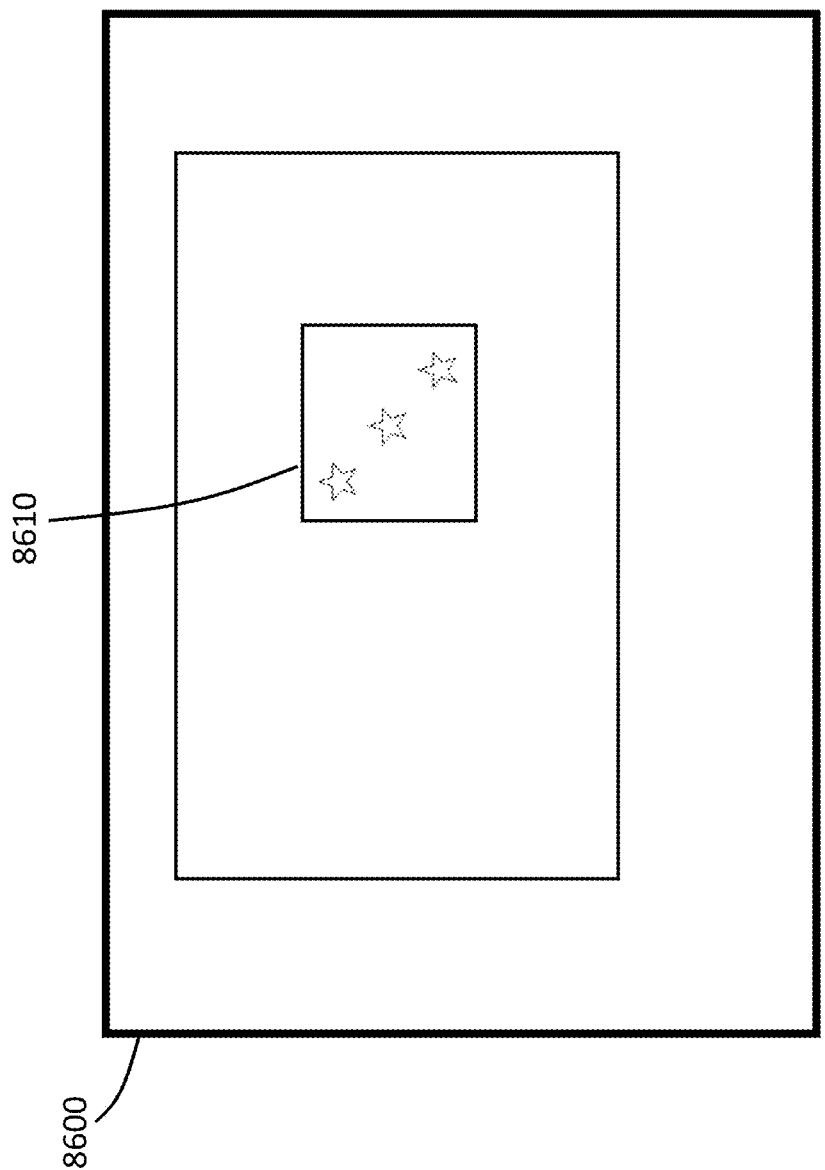
Figure 8C:
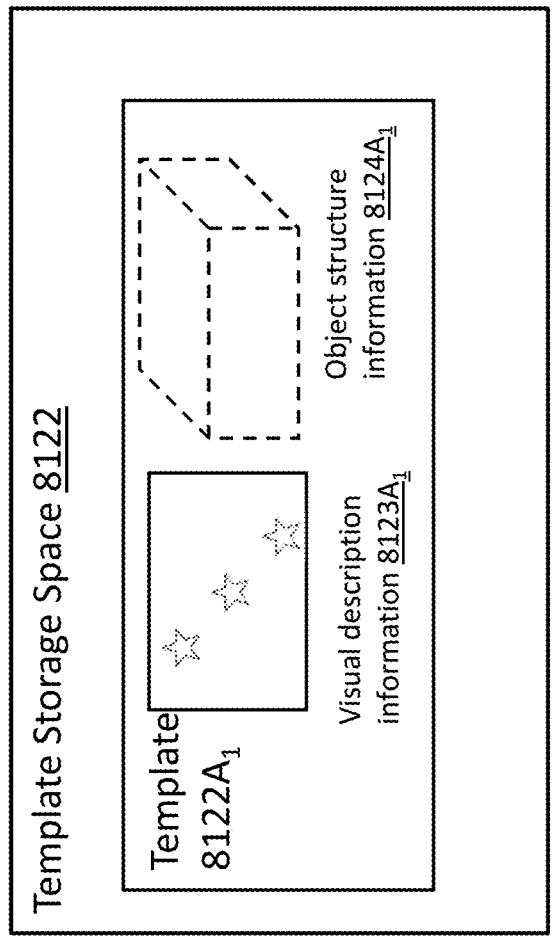

In an embodiment, the computing system 1100 may be configured to generate multiple candidate regions which represent different manners of aligning image information with an object recognition template, or more specifically different manners of aligning visual description information in an object recognition template with a visual pattern in the image information. For instance, FIG. 8A depicts a scenario in which an object 8510 (e.g., box) having a visual pattern 8512 disposed on a surface of the object 8510 is in a camera field of view 3210A/3210B. In this example, the computing system 1100 may receive image information which includes a 2D image 8600 depicted in FIG. 8B. The 2D image 8600 may be generated by a camera (e.g., 3210A), and may include a portion (e.g., a pixel region) 8610 that represents the object 8510. The computing system 1100 may be configured to compare the 2D image 8600/8610 with an object recognition template 8122A$_1$ stored in a template storage space 8122 (which may be an embodiment of the template storage space 1122), which is illustrated in FIG. 8C. The object recognition template 8122A$_1$ may be a matching object recognition template, because its visual description information 8123A$_1$ may satisfy the predefined template matching condition when compared against the 2D image 8600.

Figure 8G:
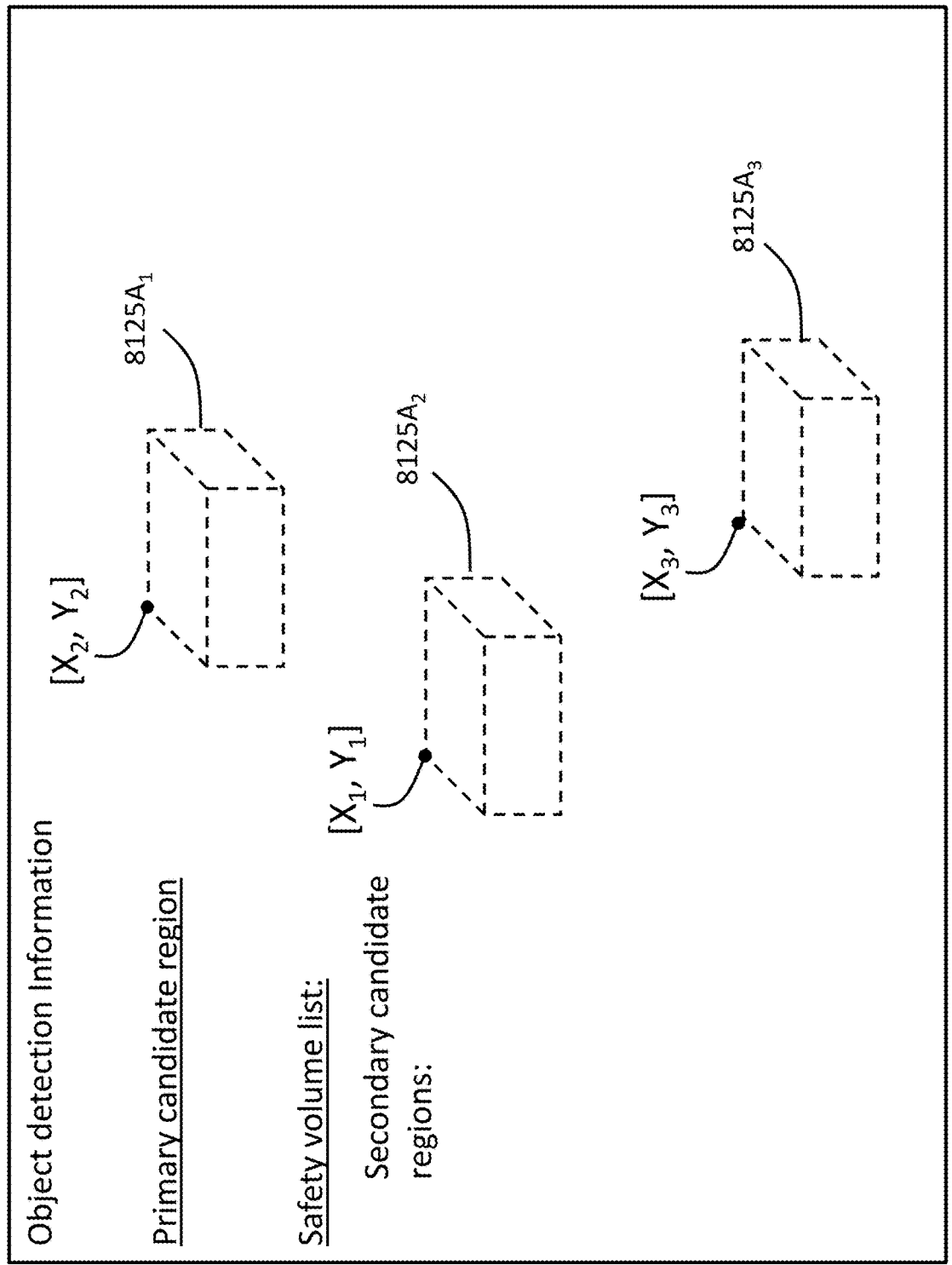

In an embodiment, the computing system 1100 may, during the comparison between the object recognition template 8122A$_1$ and the 2D image 8600/8610, determine multiple ways in which to align the visual description information 8123A$_1$ of the template with the visual pattern 8210 represented by the 2D image 8600/8610. For example, FIGS. 8D-8F illustrate three different manners determined by the computing system 1100 for at least partially aligning the visual description information 8123A$_1$ and the visual pattern 8210. In one example, the computing system 1100 may generate a primary candidate region 8125A$_1$, as depicted in FIG. 8G, which represents a first manner of aligning the visual pattern 8210 in the 2D image 8600/8610 with the visual description information 8123A$_1$ in the object recognition template 8122A$_1$. For instance, this first manner of alignment may be the alignment illustrated in FIG. 8E, in which a corner described by the visual description information 8123A$_1$ represents a coordinate of [X$_2$ Y$_2$] in a camera coordinate system or some other coordinate system. The computing system 1100 may generate the primary candidate region 8125A$_1$ based on, e.g., the coordinate [X$_2$ Y$_2$] and the structure description information 8124A$_1$. For instance, the computing system 1100 may determine that the primary candidate region 8125A$_1$ has one corner at the coordinate [X$_2$ Y$_2$], and has a size and/or shape that is the same as or based on the structure description information 8124A$_1$. This first manner of alignment may represent or be associated with a primary detection hypothesis.

In the above example, the computing system 1100 may generate one or more secondary candidate regions, such as the candidate regions 8125A$_2$ and 8125A$_3$, and include these candidate regions in the safety volume list. The second manner of alignment may be the alignment illustrated in FIG. 8D, in which a corner described by the visual description information 8123A$_1$ of the template represents a coordinate [X$_1$ Y$_1$], while the second manner of alignment may be the alignment illustrated in FIG. 8F, in which the corner represents a coordinate [X$_3$ Y$_3$].

Figure 9A:
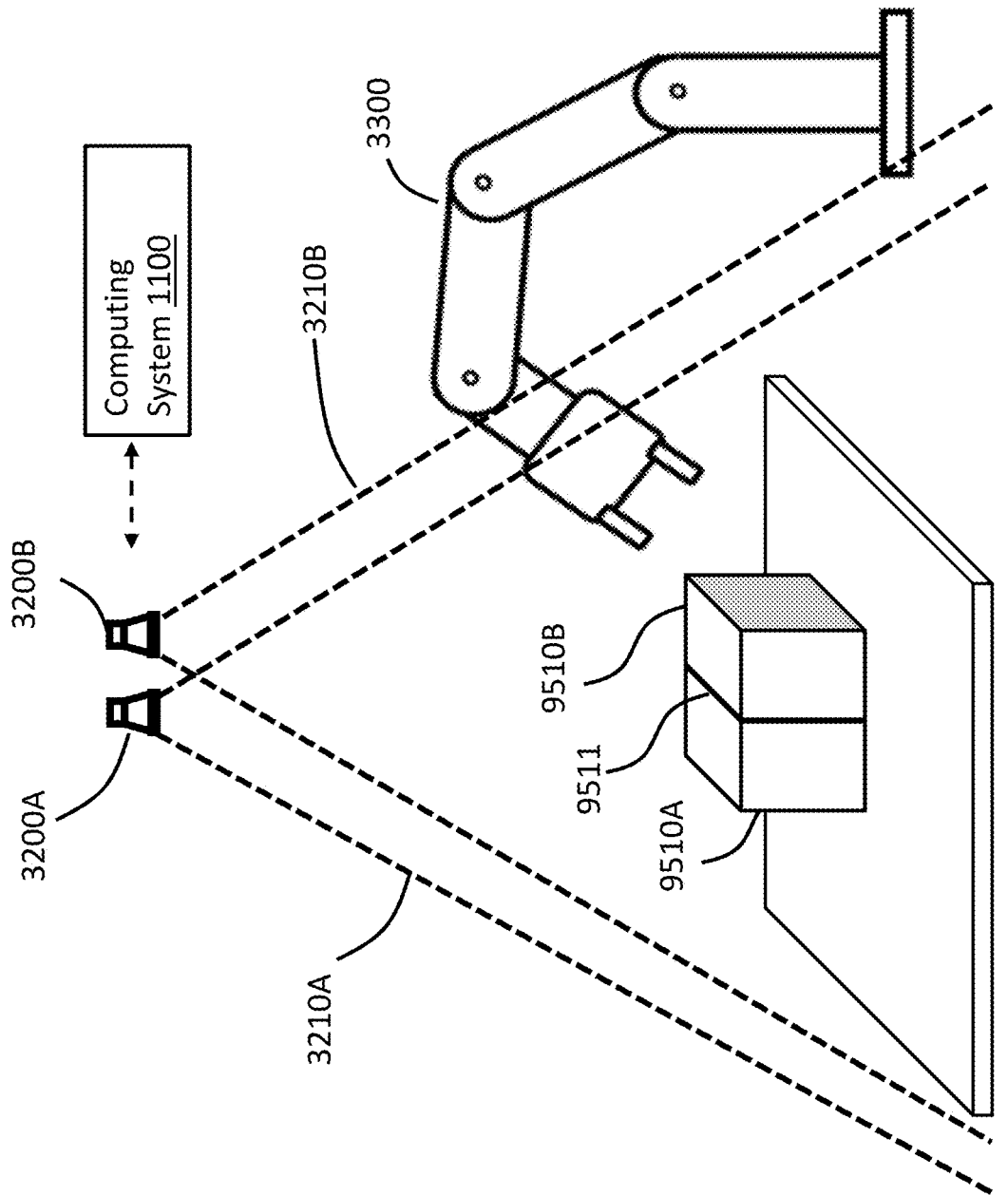
Figure 9B:
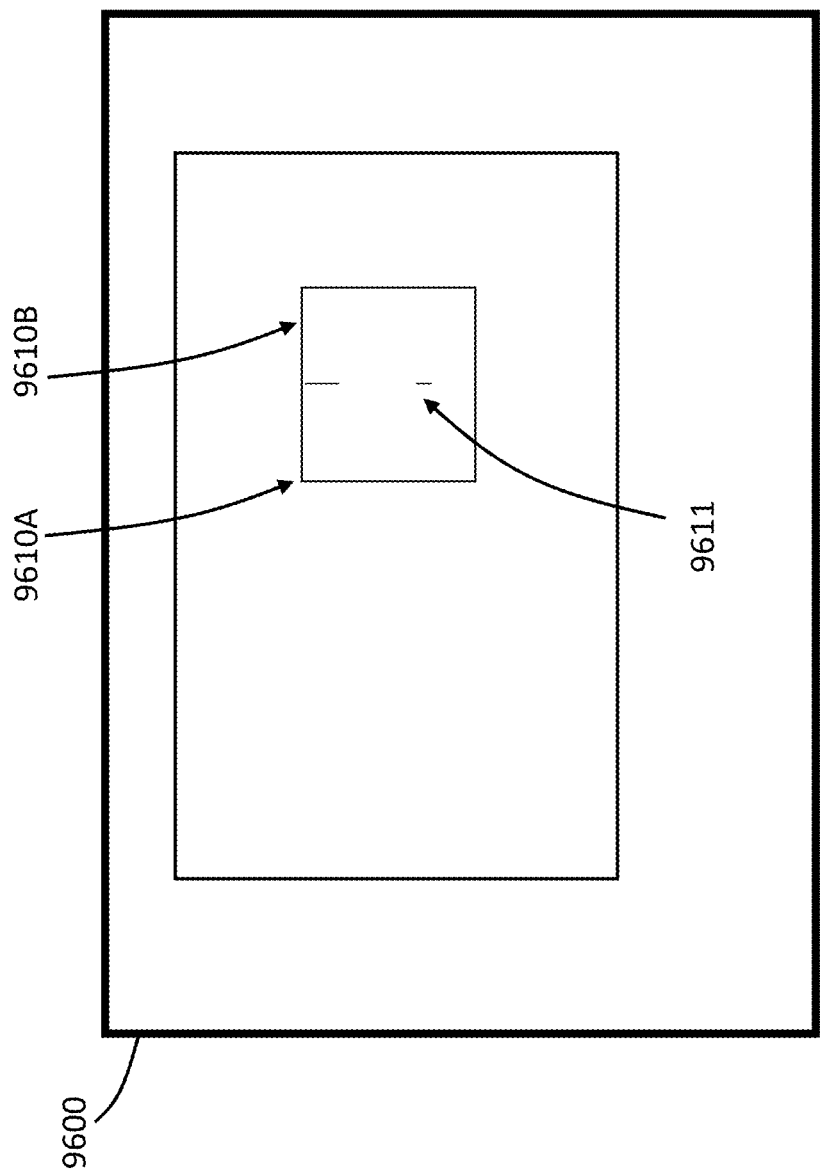
Figure 9C:
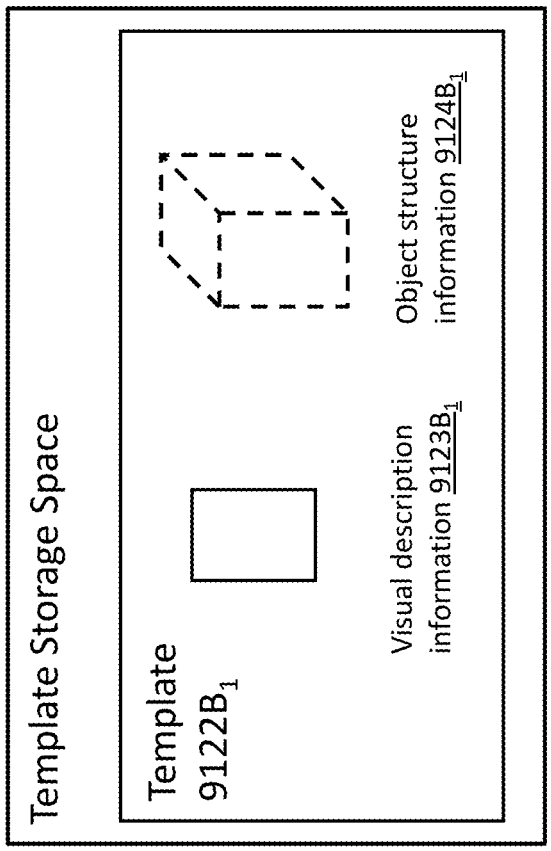

In an embodiment, different candidate regions may represent different orientations of an object shape described by a set of structure description information. As an example, FIG. 9A illustrates objects 9510A and 9510B (e.g., boxes) in a camera field of view 3210A/3210B. The two objects 9510A and 9510B may be separated by a border 9511, which may be formed by, e.g., two respective edges or surfaces of the 9510A, 9510B that are adjacent to each other. In this example, the camera 3200A may generate 2D image 9600 that represents the objects 9510A and 9510B, as illustrated in FIG. 9B, while the camera 3200B may generate a point cloud 9710 or other 3D image information that represents the objects 9510A and 9510B, as illustrated in FIGS. 9D and 9E. The computing system 1100 may be configured to compare the 2D image 9600 and the point cloud 9710 against an object recognition template 9122B$_1$ (e.g., a textureless template) in FIG. 9C, or more specifically against a set of visual description information 9123B$_1$ and a set of structure description information 9124B$_1$, respectively.

Figure 9F:
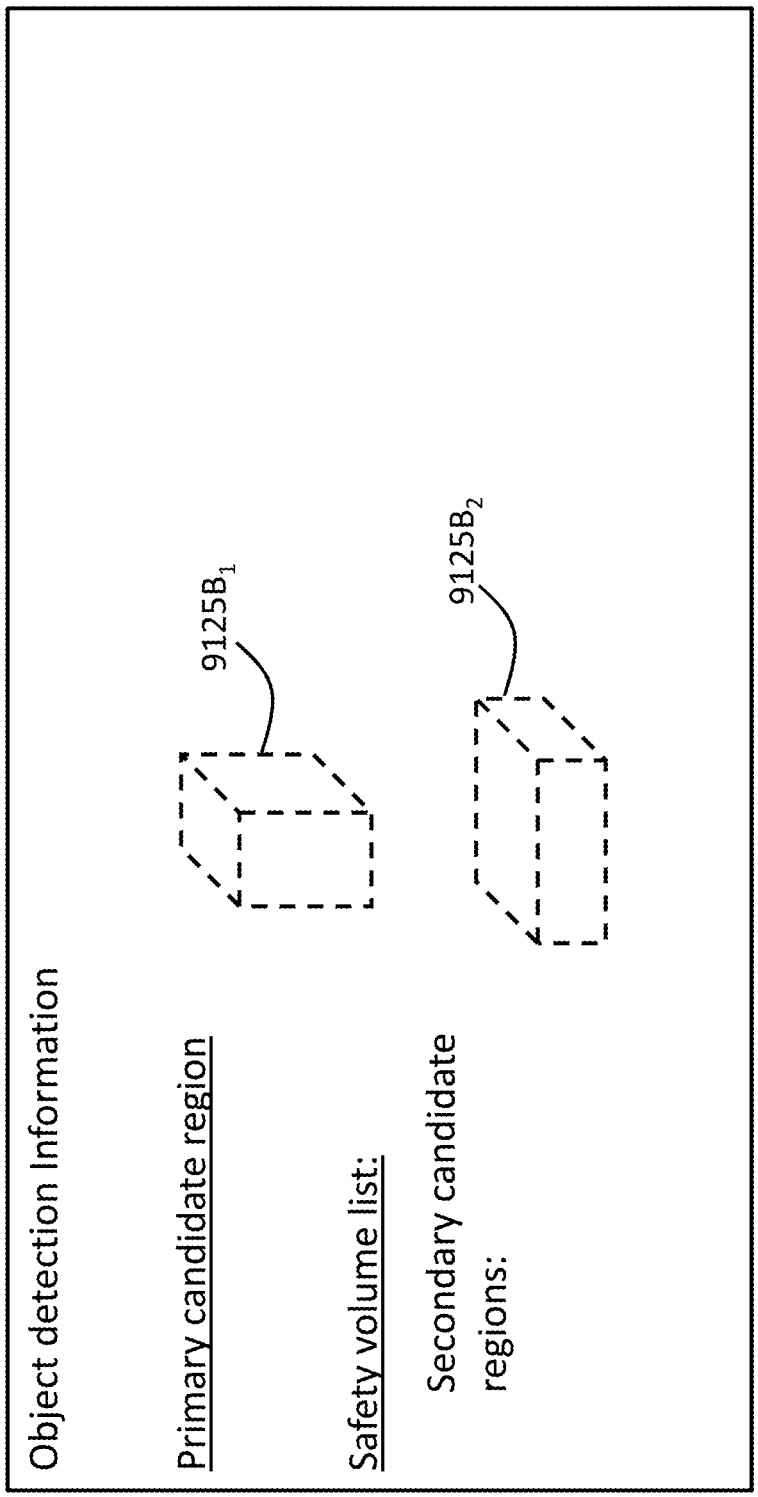

In this example, the computing system 1100 may determine that the structure description information 9124A$_1$ defines a candidate region having a first orientation, as illustrated in FIG. 9D, and may define another candidate region that has a second orientation, as illustrated in FIG. 9E. The first orientation (e.g., vertical orientation) may be, e.g., perpendicular to the second orientation (e.g., horizontal orientation). Both orientations may allow the structure description information 9124A$_1$ to match at least a portion of the point cloud 9710. Although the orientation in FIG. 9E may cause the corresponding candidate region to extend past the border 9511 between the objects 9510A and 9510B, the example of FIG. 9E may occur in a situation in which the computing system 1100 is unable to detect the border 9511 with a high degree of confidence. For instance, the border 9511 may be at least partially obscured in the 2D image 9600 (e.g., due to a lighting condition). For instance, FIG. 9B depicts image pixels 9611 which only partially represents the border 9511. In this example, the computing system 1100 may be unable to determine, with high confidence, whether the image pixels 9611 represent a border between two objects 9610A and 9610B, or whether the image pixels are an image artifact. Further, in some instances, such a border may be unrepresented in the point cloud 5710. Thus, the computing system 1100 may determine that the orientation illustrated in FIG. 9E for a candidate region may have a sufficiently high confidence value such that the candidate region of FIG. 9E may be helpful for planning interaction with an object or objects in the camera field of view 3210A/3210B. Thus, as illustrated in FIG. 9F, the computing system 1100 may generate a primary candidate region 9125B$_1$ that represents the orientation in FIG. 9D, and generate a secondary candidate region 9125B$_2$ that represents the orientation in FIG. 9E, wherein the secondary candidate region 9125B$_2$ may be included in a safety volume list. In this scenario, the structure description information 9124B$_1$ of the template 9122B$_1$ may describe an object shape, such that the primary candidate region 9125B$_1$ may correspond to one orientation for the object shape, and the secondary candidate region 9125B$_2$ may correspond to another orientation for the object shape.

Figure 10B:
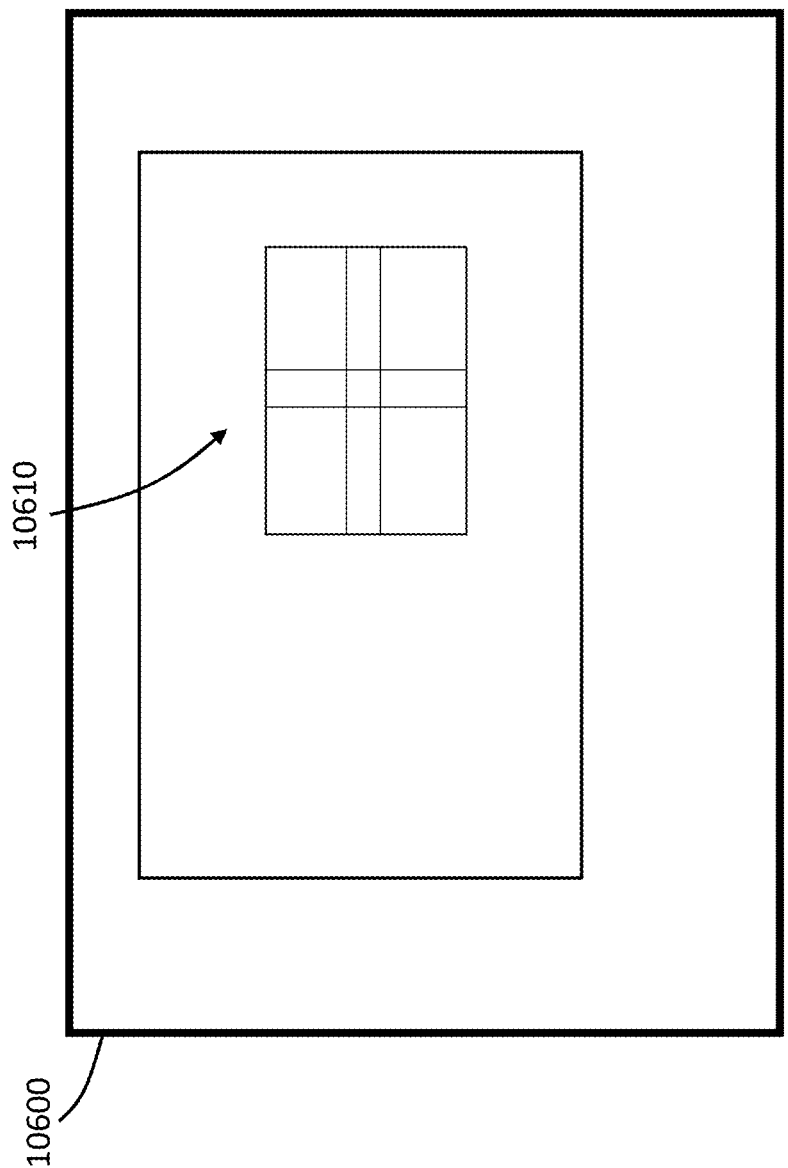
Figure 10C:
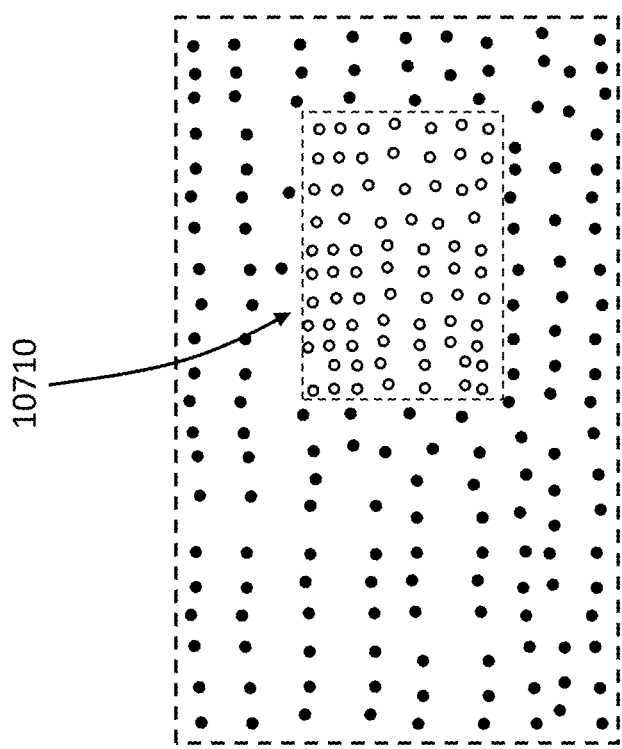

In an embodiment, the computing system 1100 may be configured to search within image information for a first region bound by a set of edges or corners appearing in or otherwise represented by the image information, wherein the first region may correspond to a first object recognition template or a first candidate region. The computing system 1100 may further expand its search to identify additional regions bound by other sets of edges or corners represented by the image information, wherein the additional regions may correspond to other object recognition templates or candidate regions. In some instances, the computing system 1100 may perform such a search in response to a determination that the image information corresponds to a textureless image. As an example of searching for regions within the image information, FIG. 10A depicts an example in which the image information is generated based on one or more objects 10510 in a camera field of view 3210A/3210B. The one or more objects 10510 may be, e.g., a single object, such as a single box with pieces of tape disposed across an outer surface of the box, or may be multiple objects, such as multiple boxes that are adjacent to each other. In this example, the camera 3200A and/or camera 3200B may be configured to generate image information for representing the one or more objects 10510. As depicted in FIGS. 10B and 10C, the image information may include 2D image information, such as a 2D image 10600 having at least an image portion 10610 thereof for representing the one or more objects 10510, and/or 3D image information 10700

Figure 10D:
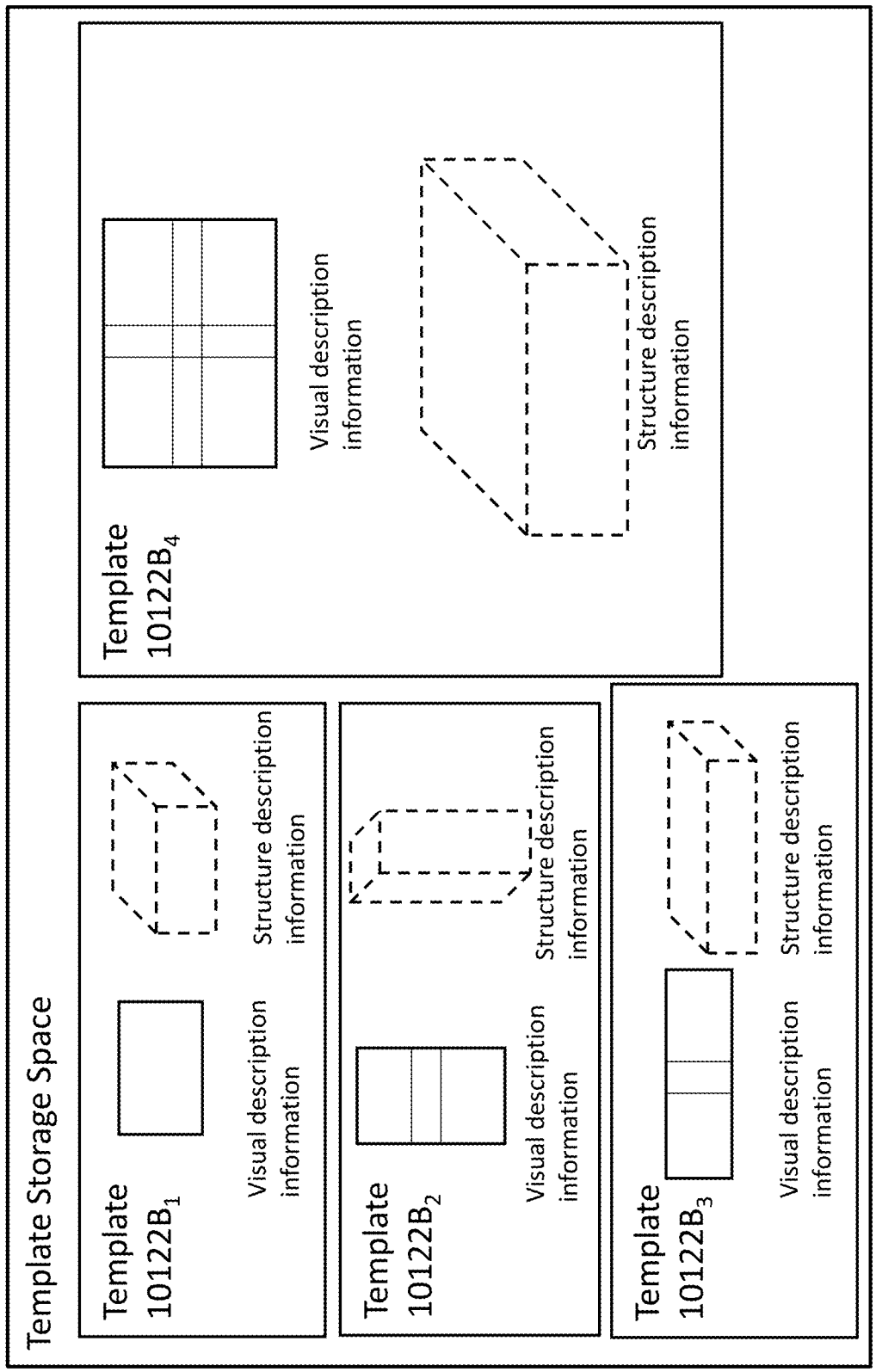

(e.g., a point cloud) having at least a portion 10710 thereof representing the one or more objects 10510. When the computing system 1100 receives the image information, it may compare the image information against a set of object recognition templates 10122B$_1$ through 10122B$_4$, which are depicted in FIG. 10D.

Figure 10E:
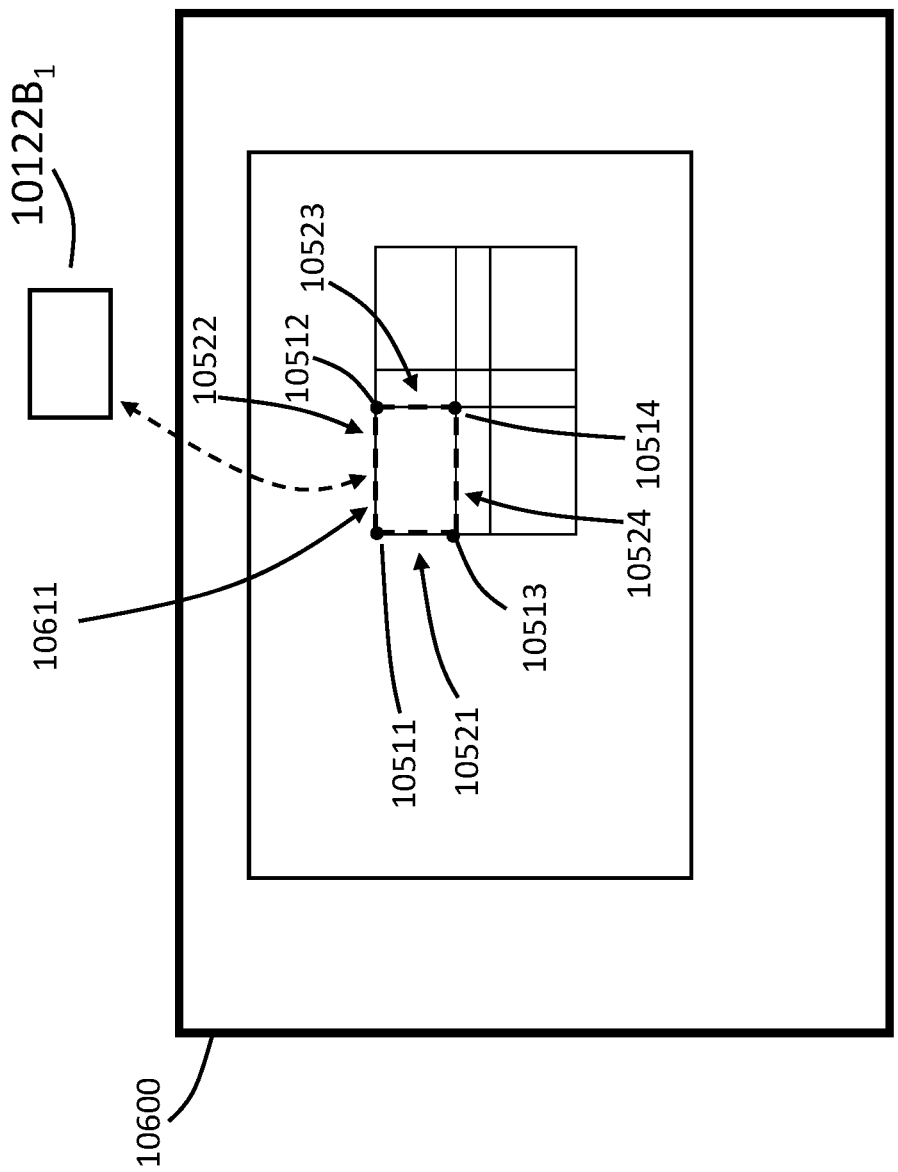

More particularly, to facilitate the comparison, the computing system 1100 may identify a first image region, such as image region 10611 in FIG. 10E, and determine whether any of the object recognition templates 10122B$_1$ through 10122B$_4$ matches the first image region (e.g., satisfy the predefined template matching condition). The first image region (e.g., 10611) may be, e.g., a first pixel region in the 2D image 10600, or a first region of coordinates or locations in the point cloud or other 3D image information. In some implementations, the computing system 1100 may identify the first image region by identifying or detecting a first set of image corners, such as 10511, 10512, 10513, 10514, and/or a first set of image edges, such as 10521, 10522, 10523, 10524 based on the image information. Each of the image corners may be, e.g., a pixel or cluster of pixels of the 2D image 10600 that represents an object corner, or a coordinate of the point cloud which represents the object corner. In some instances, at least one of the image corners, such as image corner 10511, may correspond to or represent a convex corner of the one or more objects 10510. In some implementations, if image edges are identified by the computing system, at least some of the image edges may extend from the at least one image corner. The computing system 1100 may determine the first image region 10611 as an image region which is bound by, located between, or otherwise defined by the first set of image corners 10511-10514 and/or by the first set of image edges 10521-10524. In this example, the computing system 1100 may determine whether any object recognition template (e.g., 10122B$_1$) satisfies the predefined template matching condition when compared against the first image region 10611, or more specifically a portion of the image information corresponding to the first image region 10611. In some instances, the computing system may use the matching object recognition template (e.g., 10122B$_1$) to generate a primary detection hypothesis and/or a primary candidate region.

Figure 10F:
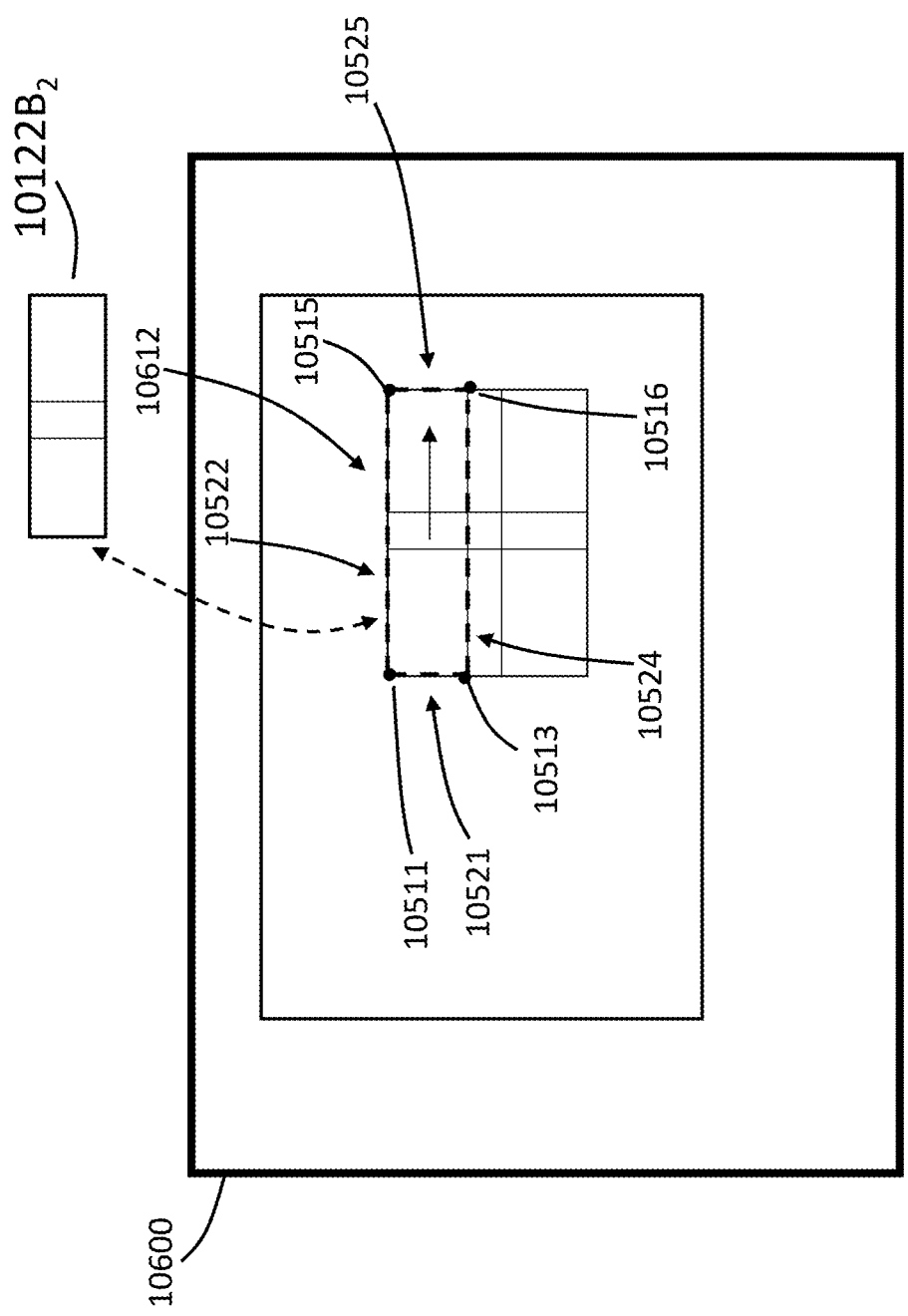
Figure 10G:
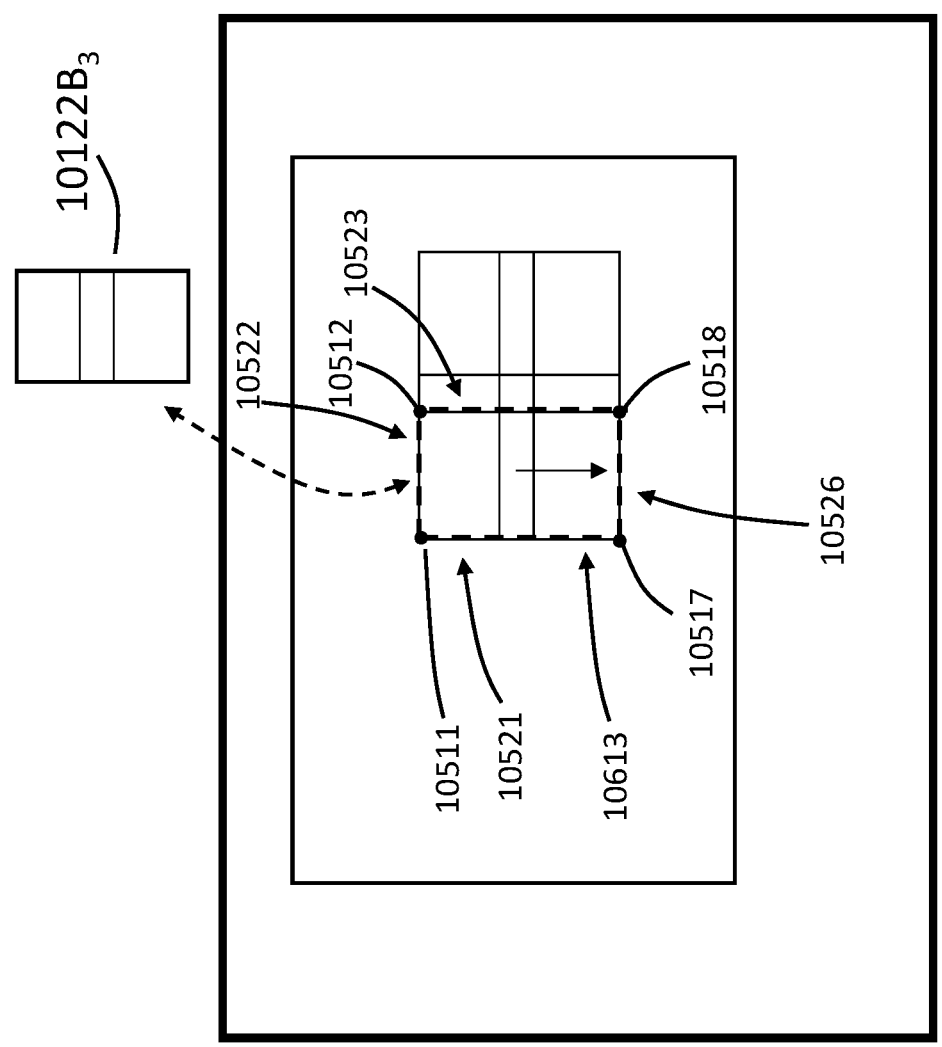
Figure 10H:
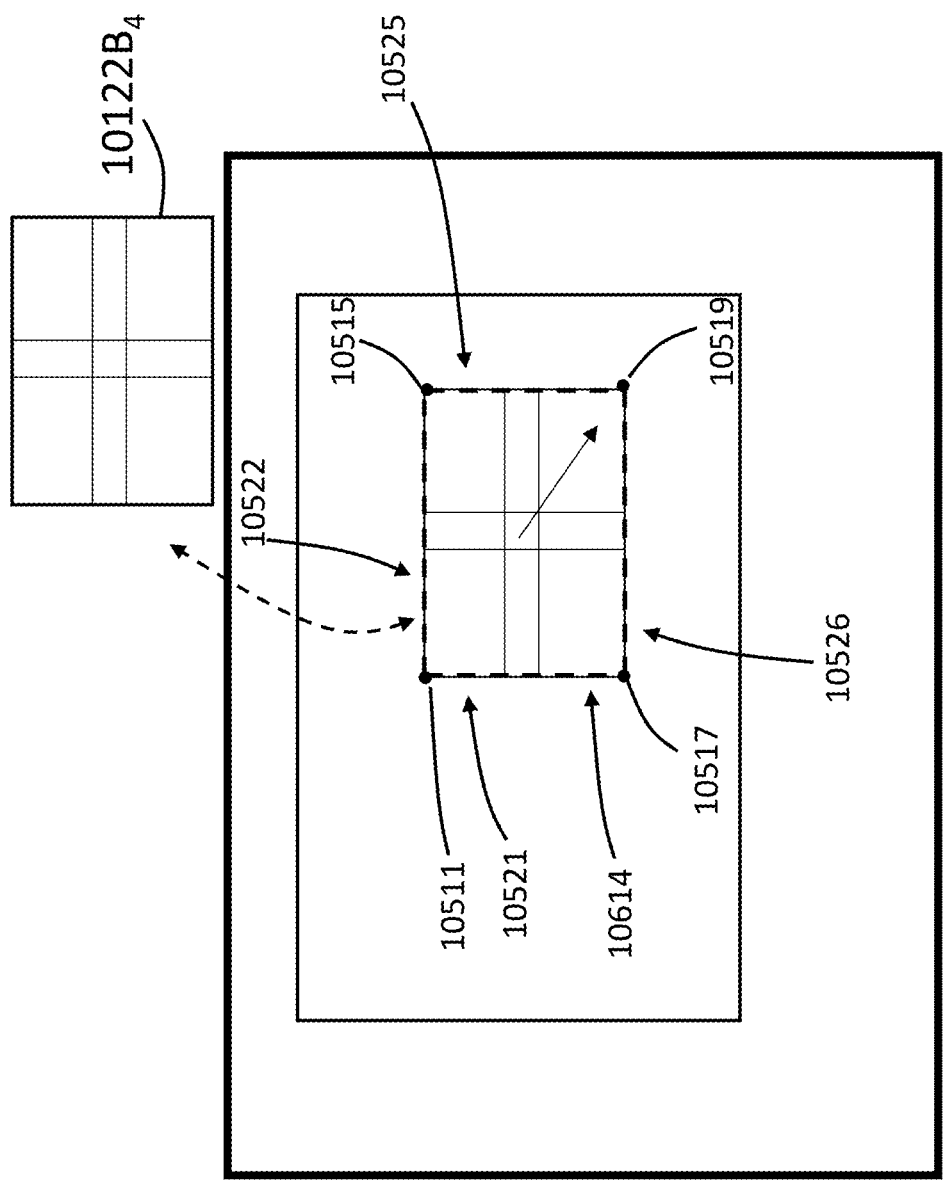

As stated above, the computing system 1100 may be configured to expand its search for image regions within the image information, such as by determining whether image edges of the first image region (e.g., 10611) can be extended to other image corners in the image information that are outside of the first image region. For example, FIGS. 10F-10H depict the computing system identifying a second image region 10612, a third image region 10613, and a fourth image region 10614 in the image information (e.g., 10600). In the example of FIG. 10F, the computing system 1100 may identify the second image region 10612 may identifying a second set of image corners (10511, 10513, 10515, 10516) and/or a second set of image edges (10521, 10522, 10524, 10525). The second set of image corners may include at least one image corner in the first set of image corners, such as image corner 10511 (which may represent a convex corner), and may include at least one image corner (e.g., 10515, 10516) that is outside the first image region 10611. The computing system 1100 may determine the second image region 10612 as a region located between or otherwise defined by the second set of image edges and/or second set of image corners. In some instances, the computing system 1100 may define the second image region 10612 by extending image edges 10522, 10524 of the first image region so that they extend past the first image region 10611 toward some of the second set of image corners, such as 10515, 10516. As a result, the second image region 10612 may extend beyond the first image region 10611. The computing system 1100 may be configured to determine whether any object recognition template (e.g., 10122B$_2$) matches the second image region, and may generate a secondary detection hypothesis and/or a secondary candidate region based on the object recognition template. The secondary candidate region and/or secondary detection hypothesis may be added to a safety volume list.

As depicted in FIG. 10G, the computing system 1100 may identify a third set of image corners (10511, 10512, 10517, 10518) and/or a third set of image edges (10521, 10522, 10523, 10526) in the image information, and determine a third image region 10613 which is located between the third set of image corners and/or the third set of image edges. Similarly, as depicted in FIG. 10H, the computing system 1100 may identify a fourth set of image corners (10511, 10515, 10517, 10519) and/or a fourth set of image edges (10521, 10522, 10525, 10526), and determine a fourth image region 10614 which is located between the fourth set of image corners and/or the fourth set of image edges. The computing system 1100 may be configured to determine whether the third image region 10613 matches any existing object recognition template (e.g., 10122B$_3$) currently stored in a template storage space, and whether the fourth image region 10614 matches any existing object recognition template (e.g., 10122B$_4$). If there is a matching object recognition template(s), the computing system 1100 may be configured to generate an additional candidate region(s) or detection hypothesis based on the matching object recognition template. In some instances, the additional candidate region or detection hypothesis may be added to the safety volume list.

Figure 11A:
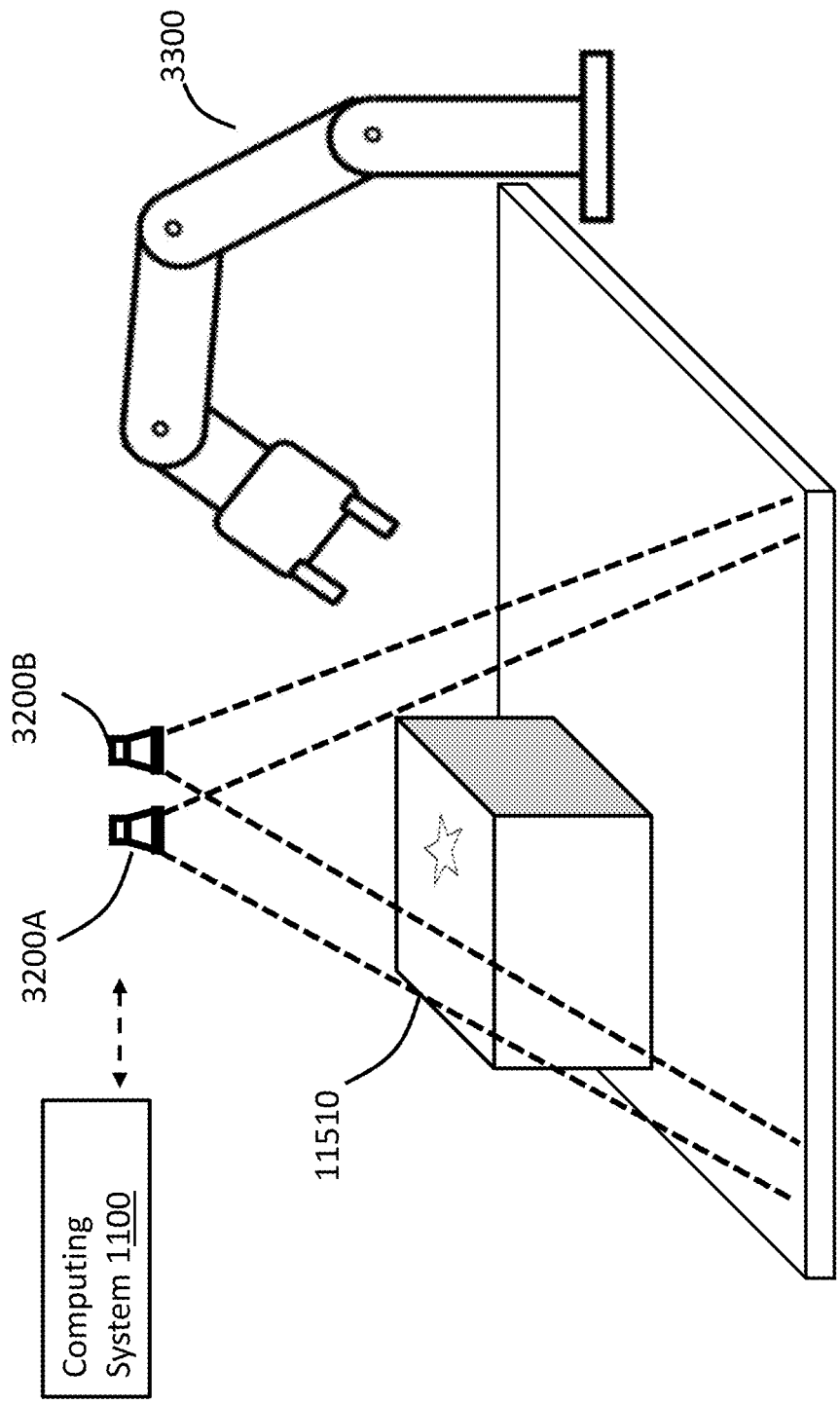
FIGS. 11A-11E illustrate various aspects of performing object detection when image information has an unmatched image portion, according to an embodiment hereof.
Figure 11B:
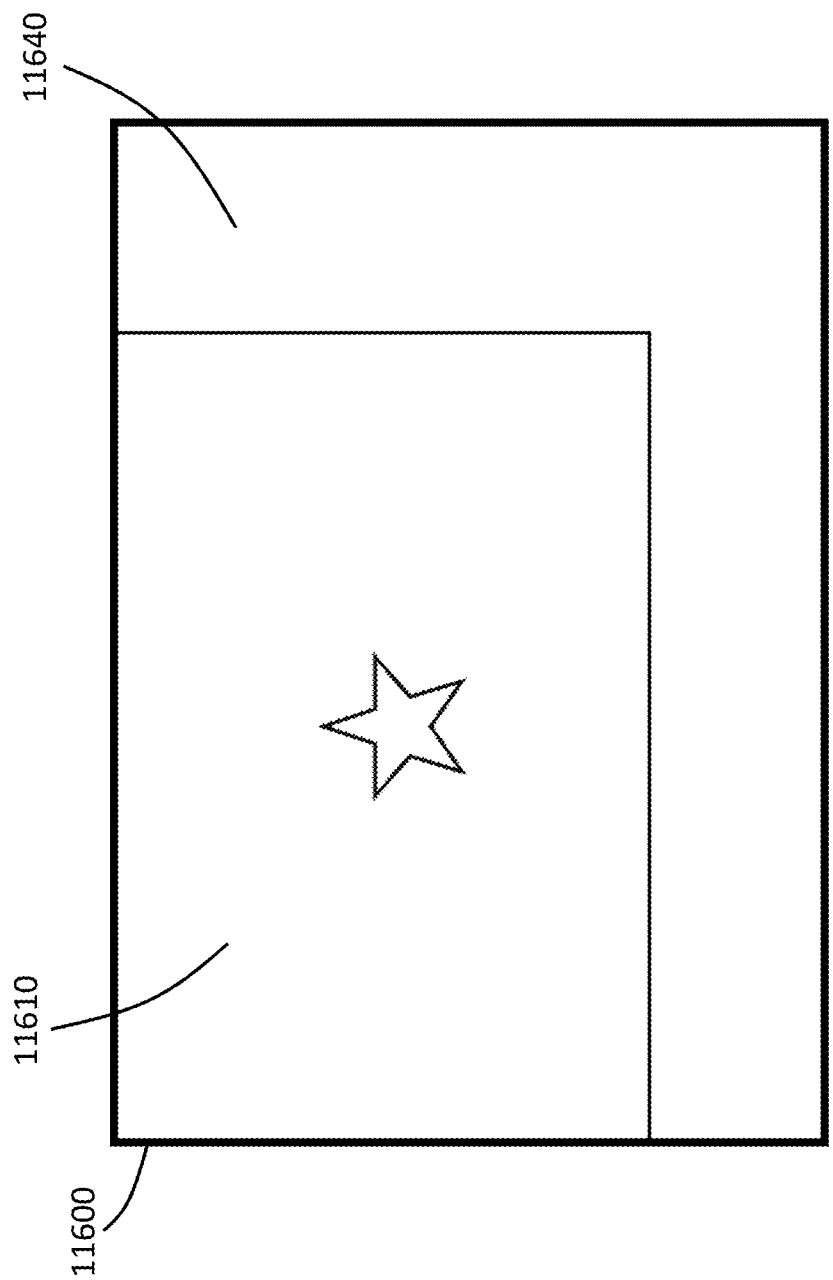
Figure 11C:
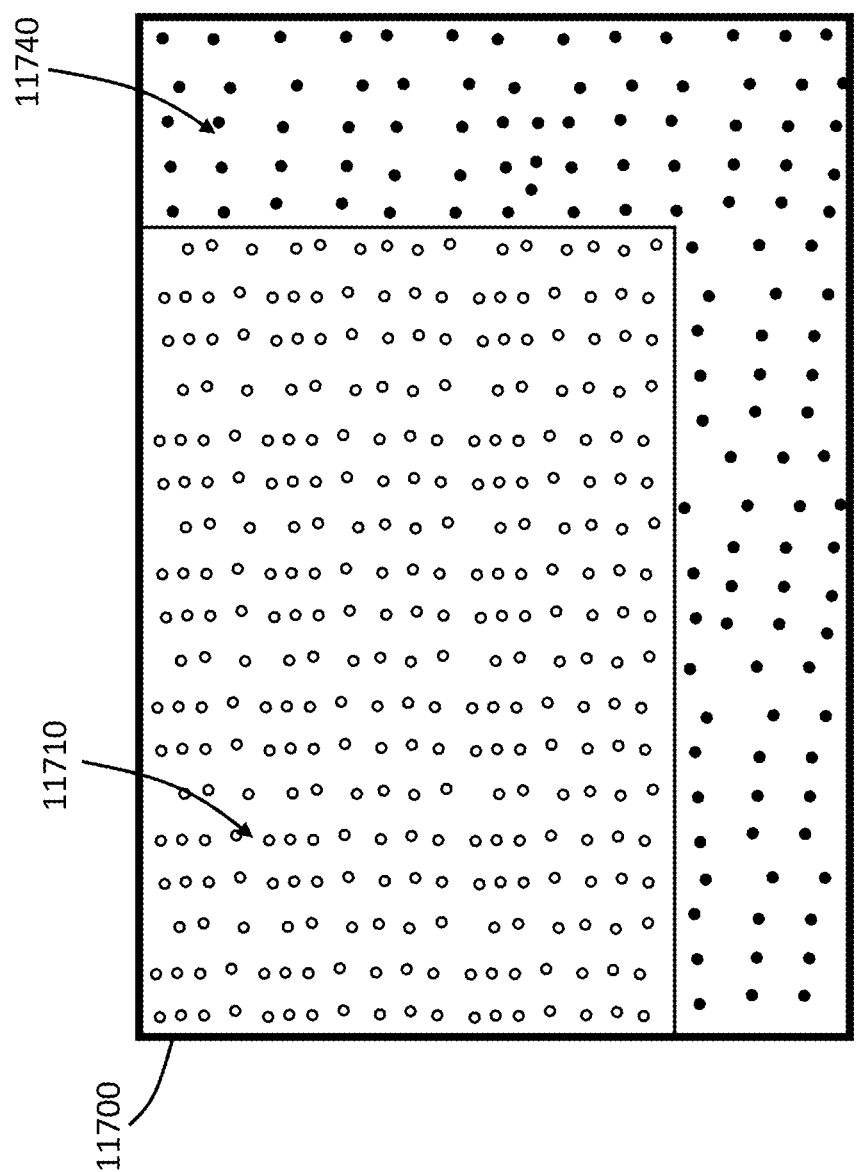
Figure 11D:
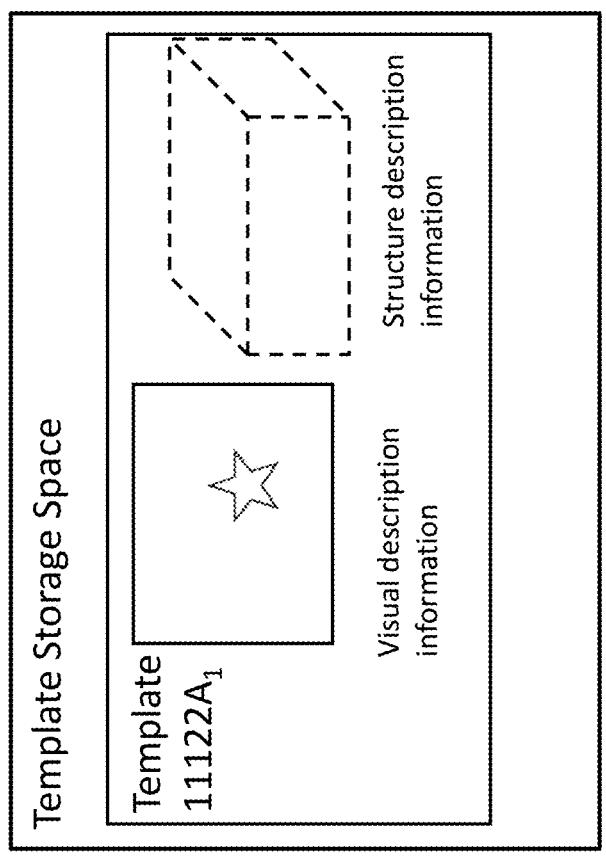

As stated above, a safety volume may in some instances include or describe an unmatched region. As an example, FIG. 11A illustrates an object 11510 in a camera field of view, while FIGS. 11B and 11C illustrate a 2D image 11600 that is generated by camera 3200A for representing the object 11510, and 3D image information 11700 (e.g., point cloud) that is generated by the camera 3200B for representing the object 11510. In this example, the object 11510 may be partially within the camera field of view 3210A/3210B. The 2D image 11600 may more specifically include a portion 11610 that represents the object 11510, and a portion 11640 that represents a physical region (e.g., region of space) adjacent to the object 11510 (e.g., immediately adjacent to the object). Similarly, the 3D image information 11700 may include a first portion 11710 that represents the object 11510, and a portion 11740 that represents the physical region adjacent to the object 11510. After receiving the 2D image 11600 and/or 3D image information 11700, the computing system 1100 may compare the image information with one or more object recognition templates, such as object recognition template 11122A$_1$ in FIG. 11D.

In an embodiment, the computing system 1100 may determine that the object recognition template 11122A$_1$ matches a portion of the received image information, such as the portion 11610 (also referred to as image portion) of the 2D image 11600, and/or the portion 11710 of the 3D image information 11700. More particularly, the computing system 1100 may determine, for instance, that the visual description information of the template 11122A$_1$, when compared against the image portion 11610 of the 2D image 11600, satisfies the predefined template matching condition. In such an embodiment, another portion of the 2D image 11600 and/or of the 3D image information 11700, such as the image portion 11640 and/or image portion 11740, may remain unexplained by the object recognition template 11122A₁, or more generally unmatched with respect to the object recognition template 11122A₁. In some scenarios, the computing system 1100 may further determine that no other object recognition template in one or more template storage spaces accessible by the computing system 1100 satisfy the predefined template matching condition when compared with the image portion 11640 and/or 11740. In such a scenario, the image portion 11640 of the 2D image 11600 and the image portion 11740 of the 3D image information may be an unmatched image portion, and may represent an unmatched region that is adjacent to an object (e.g., 11510), wherein the object is represented by a matched portion (e.g., 11610, 11710) of the image information.

Figure 11E:
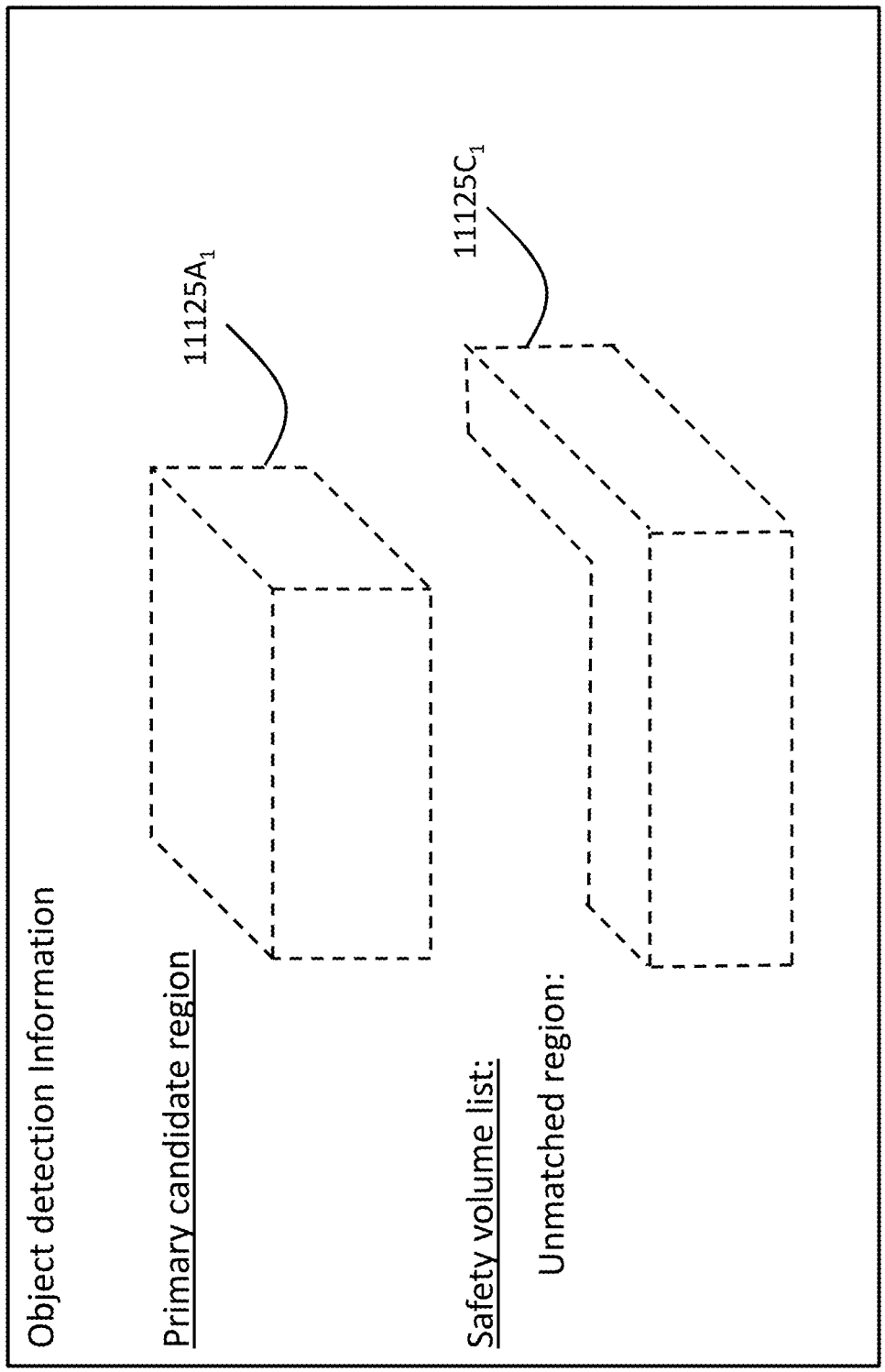

In an embodiment, the computing system 1100 may describe or identify the unmatched region in the safety volume list. For instance, as illustrated in FIG. 11E, the computing system 1100 may generate a primary candidate region 11125A₁ based on the matching object recognition template 11122A₁, and may further generate a safety volume list that describes an unmatched region 11125C₁, wherein the unmatched region 11125C₁ is generated or determined based on the unmatched image portion 11640/11740 discussed above. For example, the unmatched region 11125C₁ may have a size that is the same as or based on a size of the unmatched image portion 11740 of the 3D image information 11700 (e.g., point cloud). If the computing system 1100 performs motion planning by generating a bounding region, the bounding region may encompass the primary candidate region (e.g., 11125A₁) and an unmatched region (e.g., 11125C₁), if any, in the safety volume list.

Figure 12A:
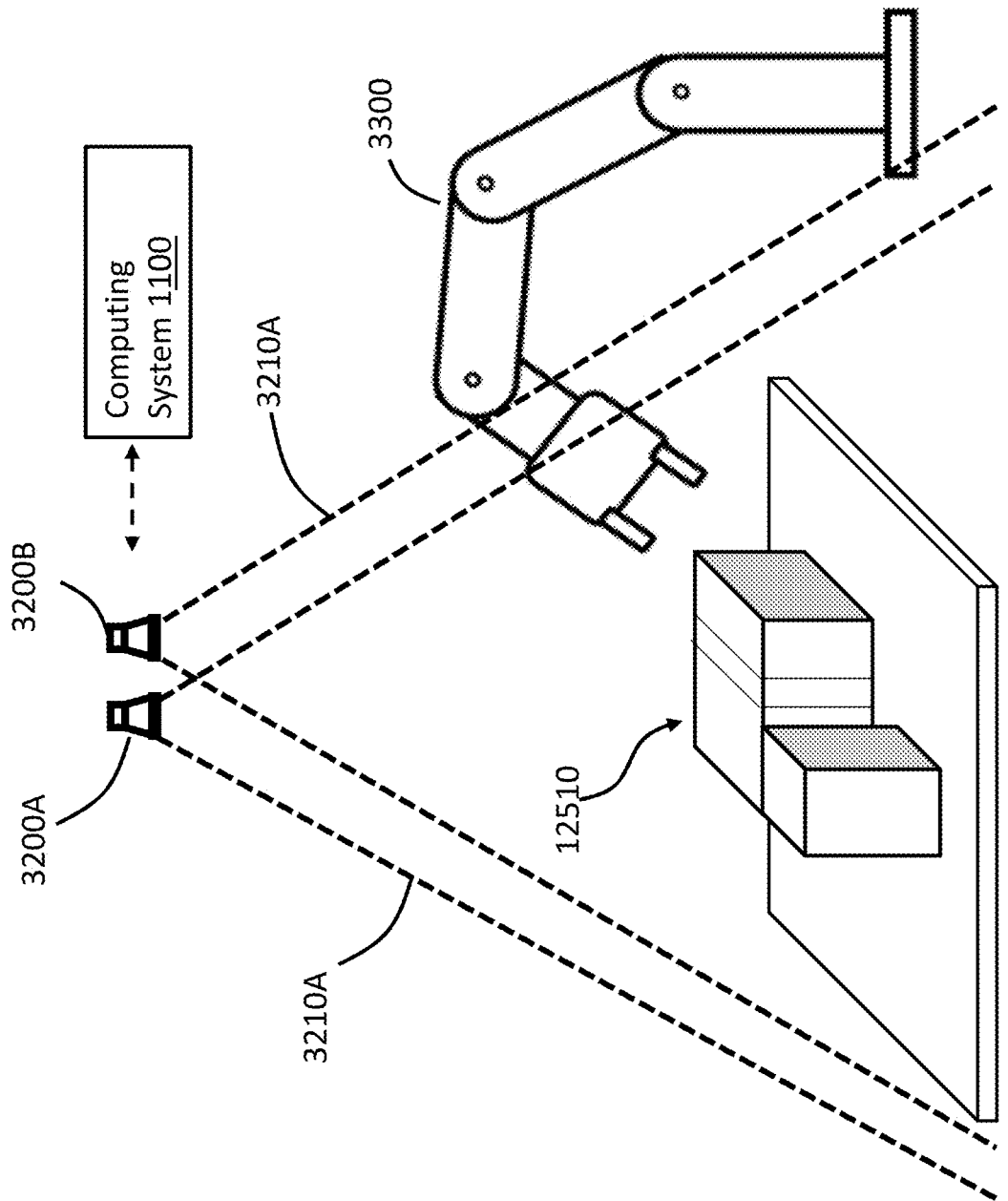
FIGS. 12A-12H illustrate various aspects of performing object recognition when image information has an unmatched image portion, according to an embodiment hereof.
Figure 12B:
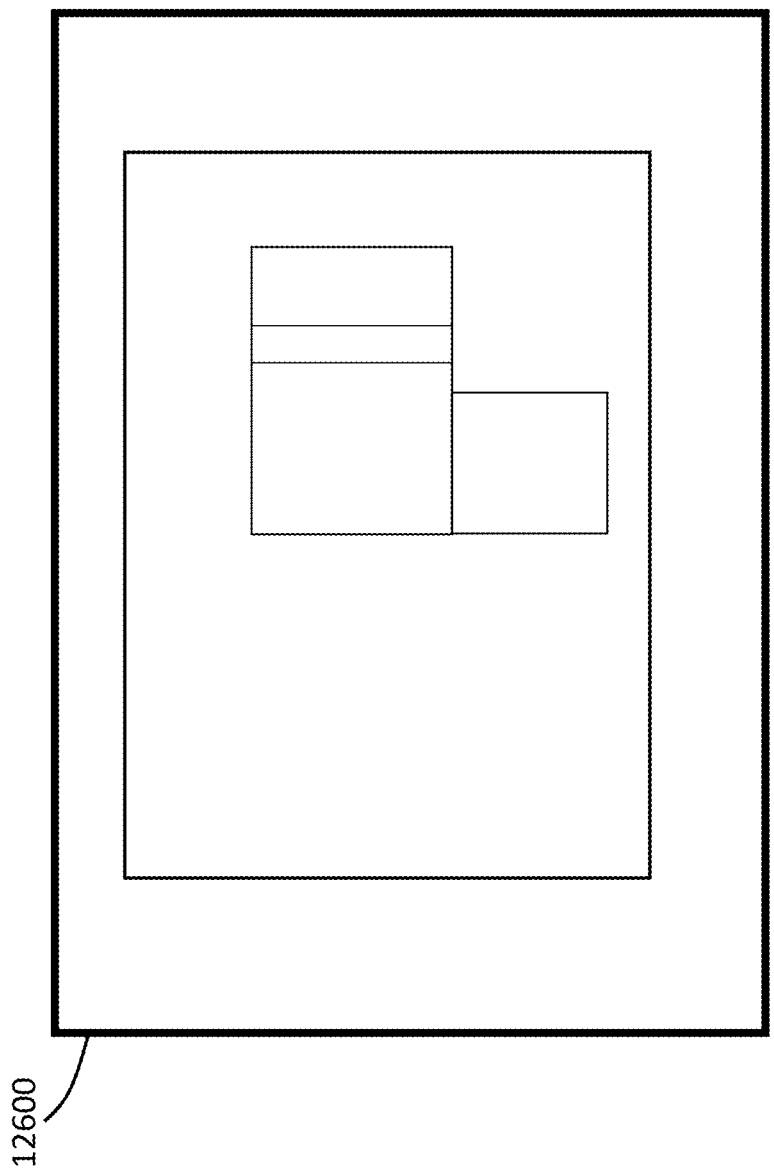
Figure 12C:
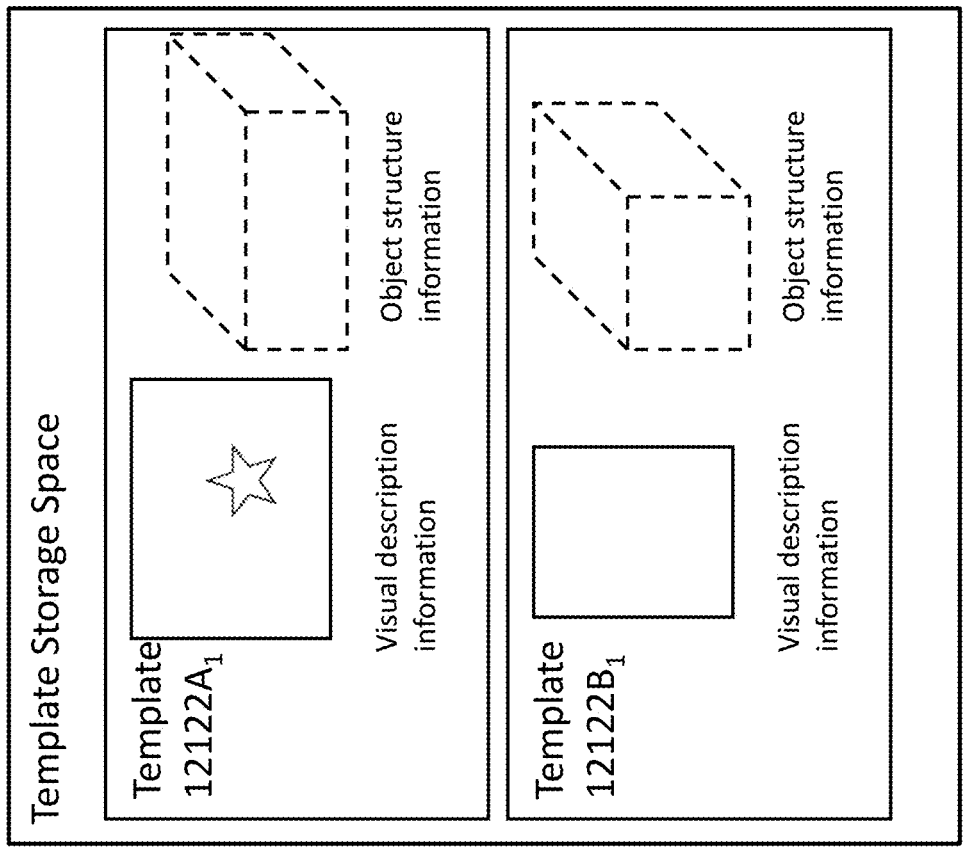

FIGS. 12A-12G provide another example involving an unmatched region, and more particularly a secondary candidate region that includes an unmatched region. More particularly, as illustrated in FIGS. 12A and 12B, a camera 3200A/3200B may generate image information, such as a 2D image 12600, representing one or more objects 12510. The one or more objects 12510 may be a single object, such as a box with a piece of tape disposed across the box, or multiple objects disposed next to each other. When the computing system 1100 receives the image information (e.g., 12600), the computing system 1100 may compare the image information against one or more object recognition templates, such as templates 12122A₁ and 12122B₁ in FIG. 12C.

Figure 12D:
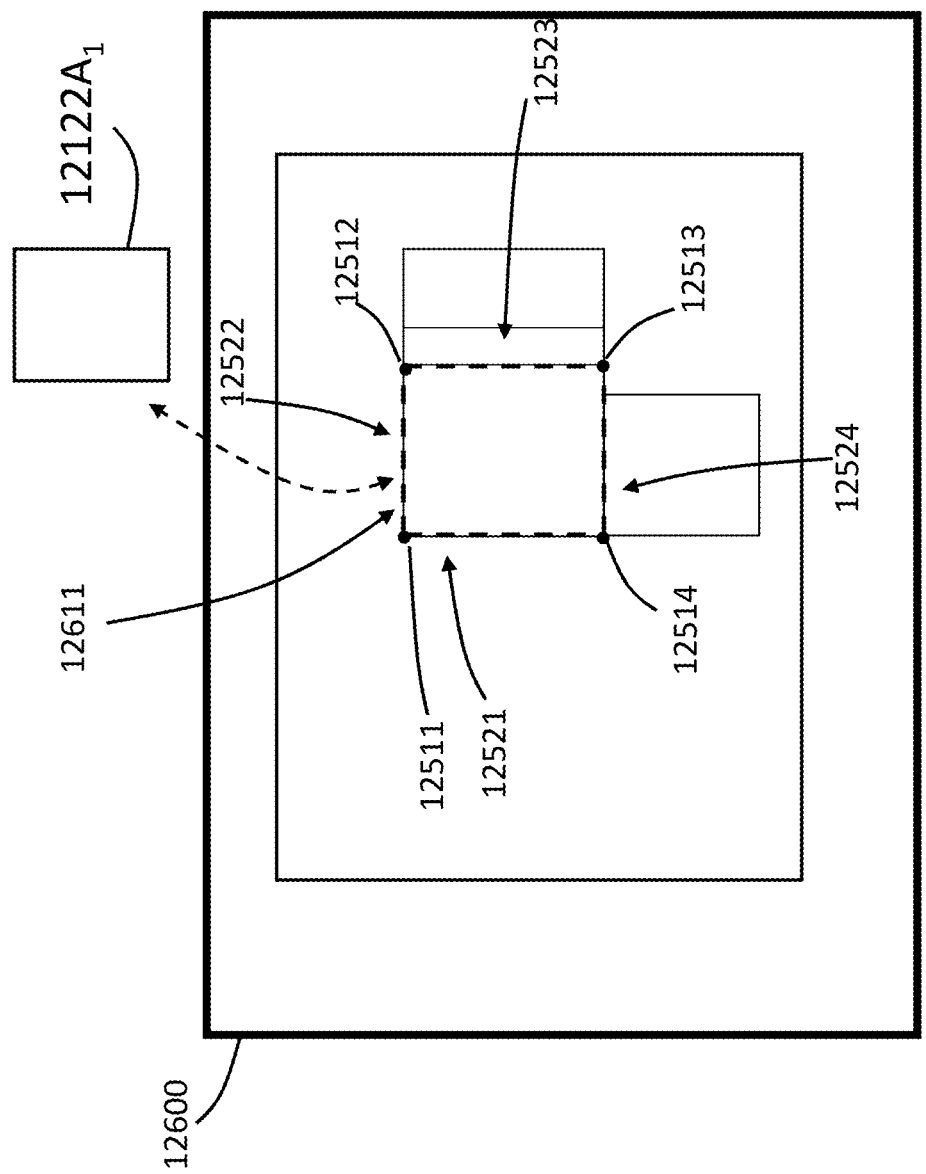

More particularly, the computing system 1100 may facilitate the comparison by searching for one or more image regions in the image information of FIG. 12B. In some implementations, such a search may be performed in response to a determination that the image information is textureless. Like in the discussion of FIGS. 10E-10H, the computing system 1100 may identify an image region by identifying image corners and/or image edges. For example, as depicted in FIG. 12D, the computing system 1100 may identify a first image region 12611 by identifying a first set of image corners (12511, 12512, 12513, 12514) and/or a first set of image edges (12521, 12522, 12523, 12524). The computing system 1100 may identify the first image region 12611 as an image region located between the image corners and/or image edges. In this example, the computing system 1100 may determine, e.g., that the first image region 12611 satisfies a predefined template matching condition when compared against the object recognition template 12122B₁. The computing system 1100 may be configured to generate a primary candidate region 12125B₁, as depicted in FIG. 12G, based on the matching object recognition template 12122B₁.

Figure 12E:
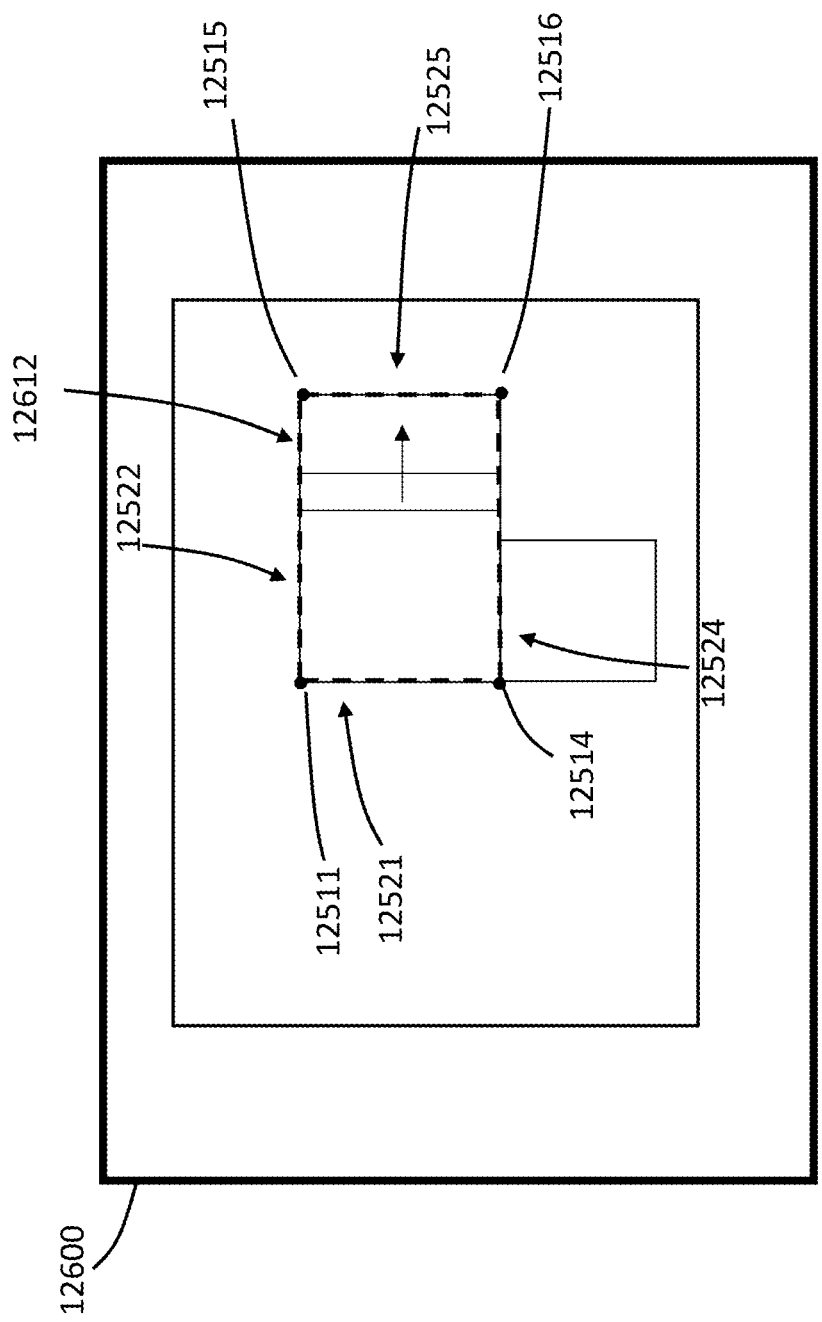

As depicted in FIG. 12E, the computing system 1100 may further identify a second image region 12612, but the second image region 12612 may include an image portion that fails to match any existing object recognition template stored in a template storage space. More particularly, the computing system 1100 may be configured to identify additional image corners 12515, 12516 which extends past or are outside the first image region 12611. The computing system 1100 may attempt to identify a second image region 12612 that extends beyond the first image region 12611, by extending image edges 12522, 12524 of the first image region 12611 in a first direction past the first image region 12611 and toward the additional image corners 12515, 12516 that are outside the first image region 12611. That is, similar to the discussion with respect to FIGS. 10E-10F, the additional image corners 12515, 12516 may form part of a second set of image corners (12511, 12514, 12515, 12516), and the extended image edges may form a second set of image edges (12521, 12522, 12524, 12525). The second image region 12612 may be an image region located between the second set of image corners and/or between the second set of image edges.

Figure 12F:
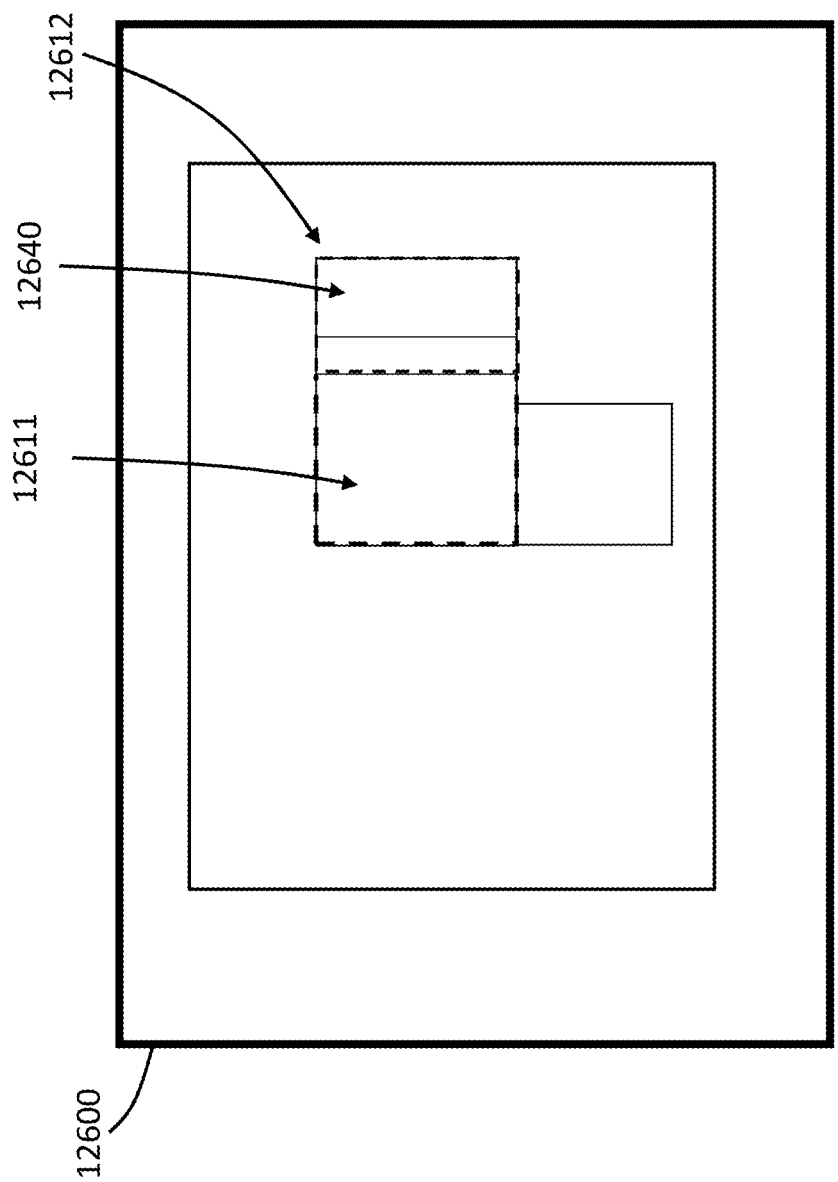
Figure 12G:
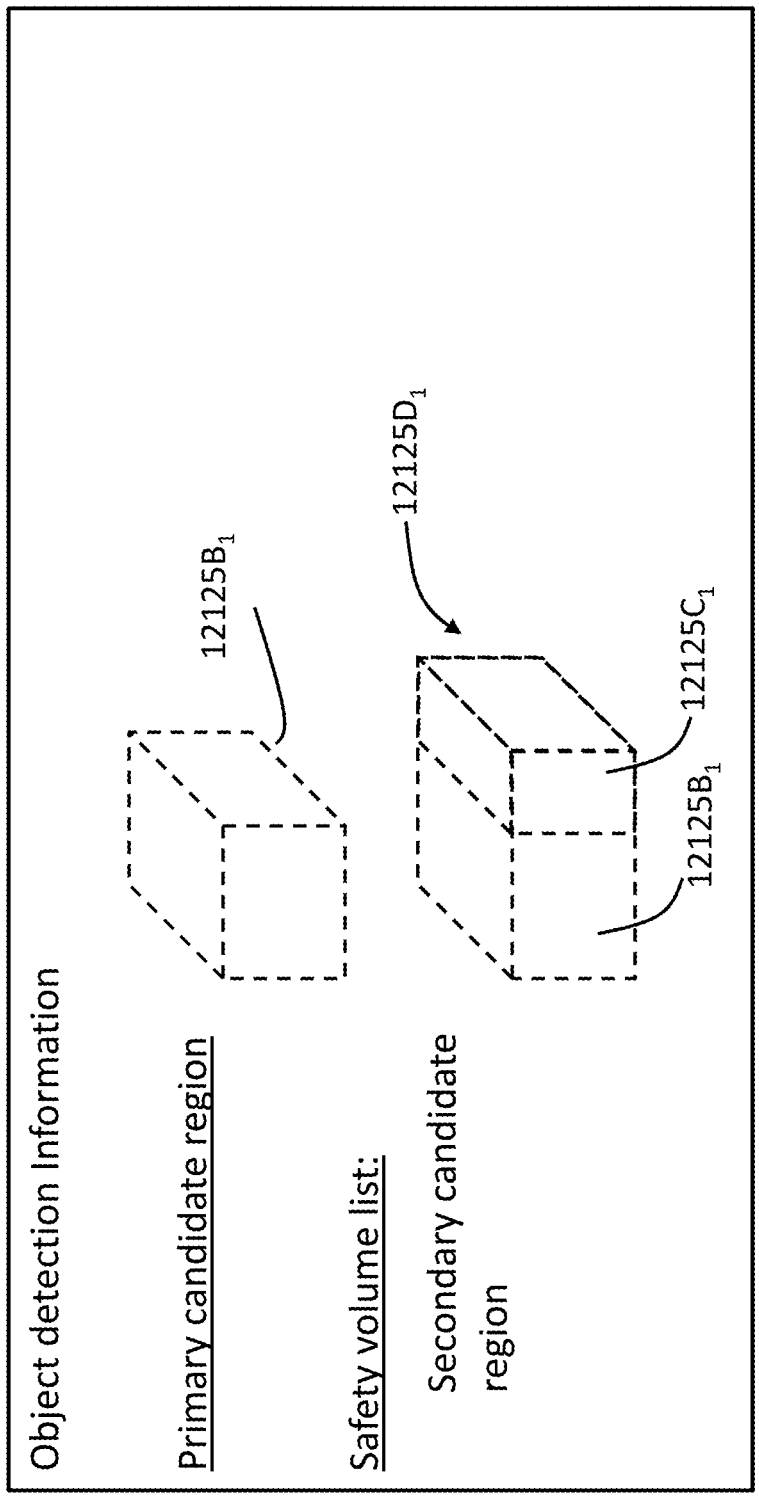

In the example of FIG. 12E, the second image region 12612 may include an unmatched image portion. More specifically, as illustrated in FIG. 12F, the image information may include an image portion 12640 (e.g., another image region) that is adjacent to the image region 12611. The image portion 12640 may fail to match the predefined template matching condition with respect to the object recognition templates 12122A₁ and 12122B₁. The unmatched image portion 12640 may represent an unmatched region, which is depicted as region 12125C₁ in FIG. 12G. In this example, the computing system 1100 may be configured, in response to a determination that the second image region 12612 includes the unmatched image portion 12640, generate a secondary candidate region 12125D₁ that is based on the unmatched image portion 12640. More particularly, the secondary candidate region 12125D₁, which is depicted in FIG. 12G, may be a region which encompasses the primary candidate region 12125B₁ and the unmatched region 12125C₁. The unmatched region 12125C₁ in this example may be a region that is immediately adjacent to the primary candidate region 12125B₁.

Figure 12H:
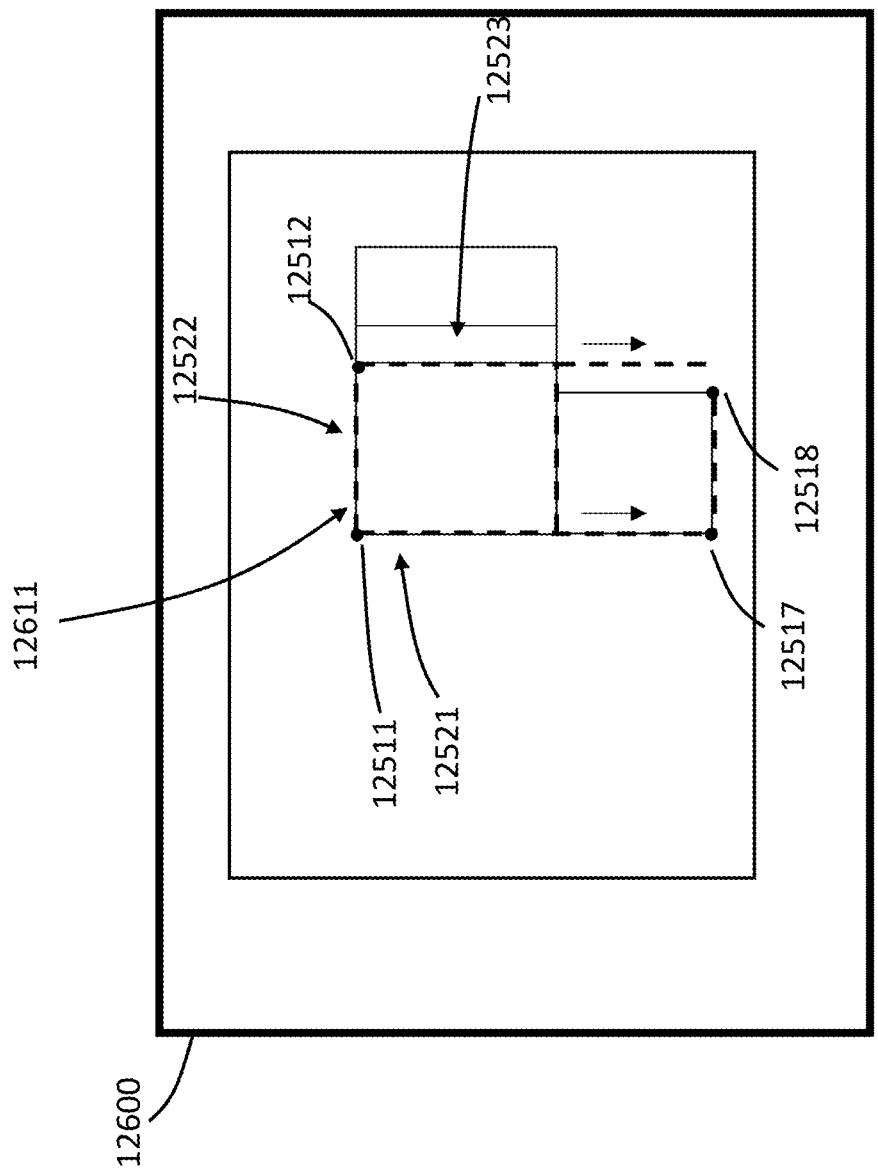

FIG. 12H illustrates an example in which the computing system 1100 may search for a third image region, by extending image edges of the first image region 12611 in a second direction. If the computing system 1100 identifies such a third image region, it may generate another candidate region (e.g., another secondary candidate region), in a manner similar to the discussion above with respect to FIGS. 12E-12G. In this example, the computing system 1100 may attempt, as the third image region, a region formed specifically by extending at least one pair of image edges, such as image edges 12521 and 12523 of FIG. 12H, past the first image region 12611 toward another pair of image corners, more specifically 12517, 12518, in the second direction illustrated in FIG. 12H. In this example, however, the computing system 1100 may determine that such a third image region cannot be formed, because while the image edge 12521 can be extended to reach the image corner 12517, the image edge 12523 has an offset relative to the image corner 12518, and thus cannot reach the image corner 12518 even when the image edge 12523 is extended. More particularly, the image corner 12518 may not be located on an axis of the image edge 12523, such that the image corner 12518 does not intersect the image edge 12523 even when the image edge 12523 is extended. Such a situation may indicate that a structure corresponding to the image corners 12517, 12518 is not part of the same object as a structure corresponding to the first image region 12611, such that information regarding the structure around the corners 12517, 12518 does not need to be included in the safety volume list. Thus, the computing system 1100 may determine that the image information (e.g., 12600) does not have a third image region which can be used for generating another candidate region for the safety volume list.

In an embodiment, the computing system 1100 may be configured to generate a new object recognition template based on an unmatched image portion and/or an unmatched region. Generating the new object recognition template may be part of an automatic object registration process, and may be performed by, e.g., the object registration module 1128 of FIG. 2D. For instance, the computing system 1100 may generate a new object recognition template in response to the situation of FIG. 12E, in which the second image region 12612 includes an unmatched image portion 12640 that fails to match any existing object recognition template. The new object recognition template may be generated based on the unmatched image portion 12640. In some instances, the computing system 1100 may determine whether the unmatched image portion 12640 or an unmatched region $12125C_1$ represented by the unmatched image portion meets or exceeds a predefined size threshold. The predefined size threshold may be equal to or based on, e.g., a predefined minimum object size. If the size of the unmatched image portion 12640 or the unmatched region $12125C_1$ meets or exceeds the predefined size threshold, the computing system 1100 may generate the new object recognition template based on the unmatched image portion 12640 and/or the unmatched region $12125C_1$. If the size is less than the predefined size threshold, the computing system 1100 may in some instances determine that a new object recognition template does not need to be generated based on the unmatched image portion 12640. In such instances, the computing system 1100 may update an existing object recognition template, such as the object recognition template $12122B_1$ associated with the primary candidate region $12125B_1$, wherein the update may be performed to further describe, or is more generally based on, the unmatched image portion 12640 and/or unmatched region $12125C_1$.

Figure 13A:
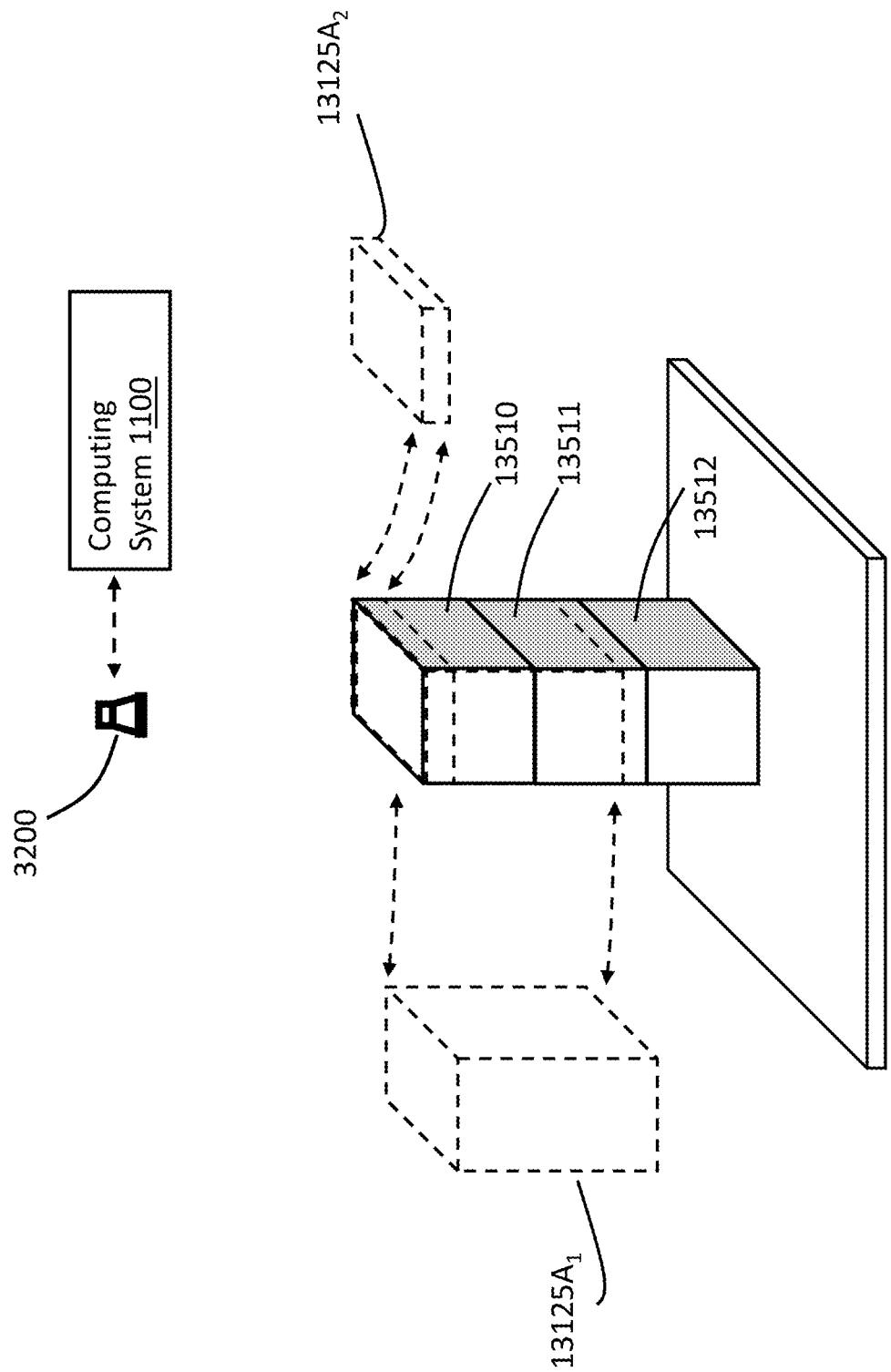
FIGS. 13A-13B illustrate performing object detection or motion planning based on a candidate region having a predefined maximum object height, according to an embodiment hereof.

In an embodiment, the computing system may be configured to generate, for inclusion in the safety volume list, a candidate region which represents or is based on a predefined maximum object size or predefined maximum object height. For example, FIG. 13A illustrates a scenario involving a stack of objects 13510, 13511, 13512 (e.g., boxes) that are in a camera field of view of camera 3200. In this scenario, the camera 3200 may generate image information which represents at least a top surface of the object 13510. Such image information may provide no indication or only limited indication of an object height for the object 13510. In this example, the computing system 1100 may generate a safety volume list which includes a first candidate region $13125A_1$ that has a height which is equal to or based on the predefined maximum object height, and/or has a size (e.g., a combination of object length, object width, and object height) which is equal to or based on the predefined maximum object size. In some instances, the computing system 1100 may further include in the safety volume list an additional candidate region $13125A_2$ which has a height equal to or based on a predefined minimum object height, and/or has a size equal to or based on a predefined minimum object size. The computing system 1100 may be configured to use the first candidate region $13125A_1$ and/or the additional candidate region $13125A_1$ to perform motion planning for the object 13510.

Figure 13B:
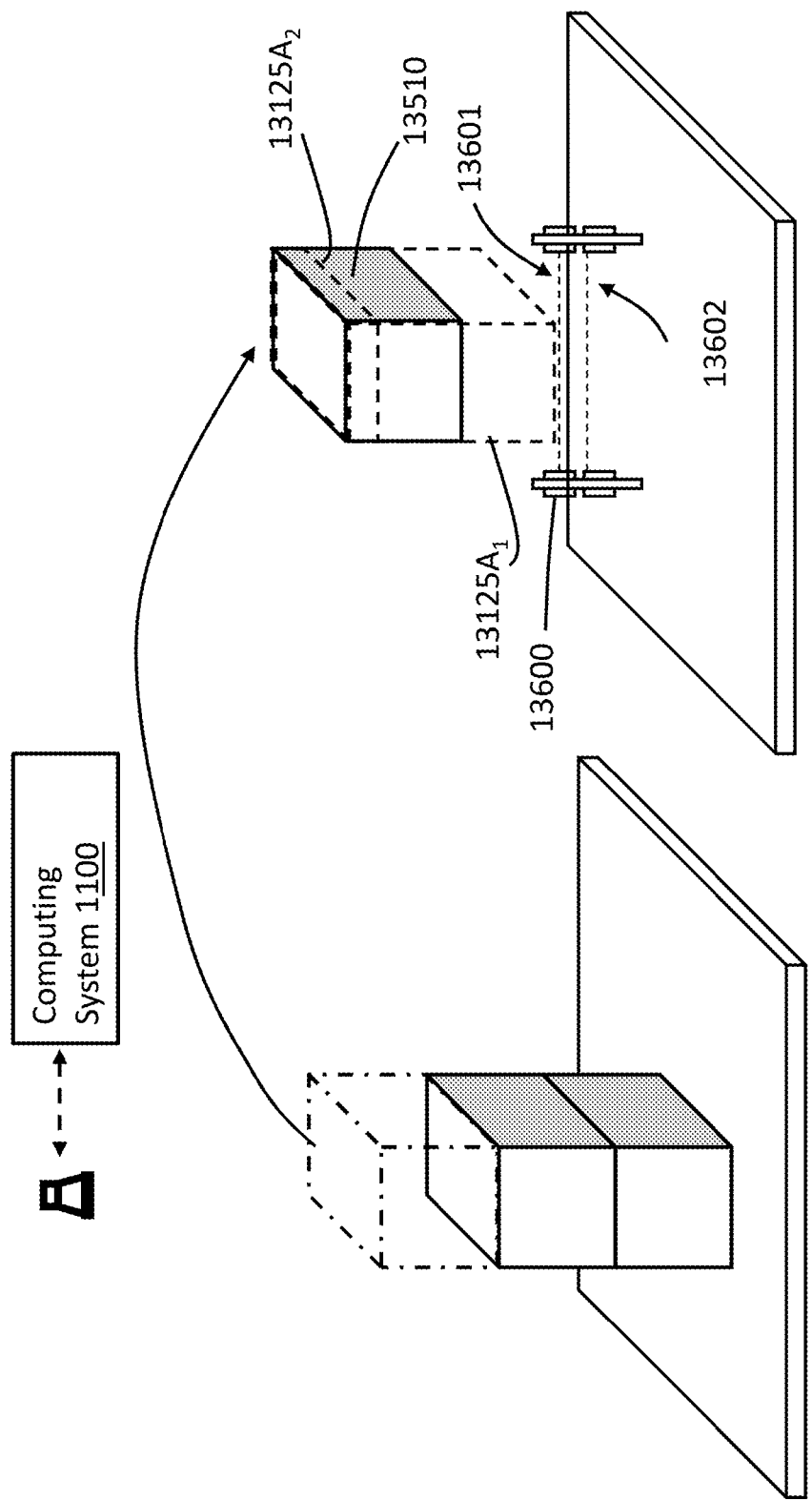

FIG. 13B illustrates the object 13510 being moved by a robot (e.g., 3300 of FIG. 3A) from the stack to a destination location. In this example, one or more line sensors 13600 may be disposed at the destination location, which may be configured to detect presence of the object 13510. In some implementations, the one or more line sensors 13600 may detect when an object has reached or crossed a first imaginary line 13601 that is a first distance from the destination location, and detect when the object has reached or crossed a second imaginary line 13602 that has a second distance from the destination location, wherein the second distance may be shorter than the first distance. The computing system 1100 or another computing system may be in communication with the one or more line sensors 13600, and may be configured to cause the robot to decelerate when the object has reached or crossed the first imaginary line 13601. In some implementations, the computing system 1100 may receive sensor information from the one or more line sensors 13600 to determine an actual object height of the object 13510.

In an embodiment, the predefined thresholds or other predefined values discussed herein may have been defined manually, and stored on the non-transitory computer-readable medium 1120 or elsewhere. In an embodiment, the predefined thresholds or other predefined values may have been dynamically calculated or otherwise defined by the computing system 1100, based on, e.g., an environment of a camera (e.g., 3200) or robot (e.g., 3300), and stored on the non-transitory computer-readable medium 1120 or elsewhere.

Further, as discussed above, the computing system 1100 may in an embodiment receive image information and identify multiple matching object recognition templates from among a plurality of object recognition templates. The computing system 1100 may generate multiple candidate regions based on the multiple matching object recognition templates, respectively, and perform motion planning based on the multiple candidate regions.

ADDITIONAL DISCUSSION OF VARIOUS EMBODIMENTS

Embodiment 1 relates to a computing system and a method performed by the computing system. The method may be performed based on instructions stored on a non-transitory computer-readable medium. The computing system may include a communication interface and at least one processing circuit. The communication interface may be configured to communicate with a robot and with a camera having a camera field of view. The at least one processing circuit may be configured, when an object is or has been in the camera field of view, to: receive image information representing the object, wherein the image information is generated by the camera; identify a set of one or more matching object recognition templates, which are one or more object recognition templates that satisfy a predefined template matching condition when compared against the image information, wherein the set of one or more matching object recognition templates are associated with a set of one or more detection hypotheses, which are one or more respective estimates on which object or object type is represented by the image information; and select, as a primary detection hypothesis, a detection hypothesis from among the set of one or more detection hypotheses, wherein the primary detection hypothesis is associated with a matching object recognition template of the set of one or more matching object recognition templates, wherein the detection hypothesis that is selected as the primary detection hypothesis has a confidence value which is highest among a set of one or more respective confidence values, wherein the set of one or more respective confidence values are associated with the set of one or more detection hypotheses, and indicate respective degrees by which the image information matches the set of one or more matching object recognition templates associated with the set of one or more detection hypotheses.

In this embodiment, the at least one processing circuit may be configured to further generate, as a primary candidate region, a candidate region which estimates object boundary locations for the object or estimates which locations in the camera field of view are occupied by the object, wherein the primary candidate region is generated based on the matching object recognition template associated with the primary detection hypothesis; determine at least one of: (i) whether the set of one or more matching object recognition templates has, in addition to the matching object recognition template associated with the primary detection hypothesis, a subset of one or more remaining matching object recognition templates that also satisfy the predefined template matching condition when compared against the image information, or (ii) whether the image information has a portion representing an unmatched region which is adjacent to the primary candidate region and which fails to satisfy the predefined template matching condition; in response to a determination that there is the subset of one or more remaining matching object recognition templates, or that the image information has the portion representing the unmatched region, generate a safety volume list, which is a list that describes at least one of: (i) the unmatched region, or (ii) one or more additional candidate regions that also estimate object boundary locations for the object or estimate which locations are occupied by the object, wherein the one or more additional candidate regions are generated based on the subset of one or more remaining matching object recognition templates; and perform motion planning based on the primary candidate region and based on the safety volume list, wherein the motion planning is for robot interaction between the robot and the object.

Embodiment 2 includes the computing system of embodiment 1. In this embodiment, the at least one processing circuit is configured to determine a bounding region which encompasses the primary candidate region and at least one of: (i) the one or more additional candidate regions or (ii) the unmatched region, wherein performing the motion planning includes determining a trajectory associated with a robot end effector apparatus based on the bounding region.

Embodiment 3 includes the computing system of embodiment 2. In this embodiment, performing the motion planning includes determining robot gripping motion based on the primary candidate region, and determining the trajectory based on the bounding region.

Embodiment 4 includes the computing system of any one of embodiment 1. In this embodiment, the set of one or more detection hypotheses include, in addition to the primary detection hypothesis, a subset of one or more remaining detection hypotheses which are associated with the subset of one or more remaining matching object recognition templates. In this embodiment, the at least one processing circuit is configured, for each detection hypothesis of the subset of one or more remaining detection hypotheses, to: determine whether a respective confidence value associated with the detection hypothesis is within a predefined confidence similarity threshold relative to the confidence value associated with the primary detection hypothesis, wherein the at least one processing circuit is configured to include, in the safety volume list, a respective candidate region associated with the detection hypothesis in response to a determination that the respective confidence value associated with the detection hypothesis is within the predefined confidence similarity threshold relative to the confidence value associated with the primary detection hypothesis, such that the respective candidate region is part of the one or more additional regions of the safety volume list.

Embodiment 5 includes the computing system of embodiment 4. In this embodiment, each candidate region of the one or more additional candidate regions in the safety volume list is associated with a respective detection hypothesis which has a confidence value that is within the predefined confidence similarity threshold relative to the confidence value associated with the primary detection hypothesis.

Embodiment 6 includes the computing system of embodiment 4 or 5. In this embodiment, each candidate region of the one or more additional candidate regions in the safety volume list is associated with a respective detection hypothesis which has a confidence value that is greater than or equal to a predefined template matching threshold.

Embodiment 7 includes the computing system of any one of embodiments 1-6. In this embodiment, the subset of one or more remaining matching object recognition templates include a plurality of matching object recognition templates associated with a plurality of respective candidate regions. In this embodiment, the at least one processing circuit is configured, for each candidate region of the plurality of candidate regions, to: determine a respective amount of overlap between the candidate region and the primary candidate region; determine whether the respective amount of overlap is equal to or exceeds a predefined overlap threshold, wherein the at least one processing circuit is configured to include the candidate region in the safety volume list in response to a determination that the amount of overlap is equal to or exceeds the predefined overlap threshold, such that the candidate region is part of the one or more additional candidate regions of the safety volume list.

Embodiment 8 includes the computing system of any one of embodiments 1-7. In this embodiment, the image information includes 2D image information, and wherein the matching object recognition template associated with the primary detection hypothesis includes a set of visual description information which is determined by the at least one processing circuit to satisfy the predefined template matching condition when compared against the 2D image information.

Embodiment 9 includes the computing system of embodiment 8. In this embodiment, at least one matching object recognition template of the subset of one or more remaining matching object recognition templates has a respective set of visual description information that is also determined by the at least one processing circuit to satisfy the predefined template matching condition when compared against the 2D image information, and wherein the at least one processing circuit is configured to generate the safety volume list based on the at least one matching object recognition template.

Embodiment 10 includes the computing system of embodiment 9. In this embodiment, the matching object recognition template associated with the primary detection hypothesis includes a respective set of structure description information that indicates a first object size, and wherein the at least one matching object recognition template includes a respective set of structure description information that indicates a second object size different than the first object size.

Embodiment 11 includes the computing system of any one of embodiments 8-10. In this embodiment, the image information further includes 3D image information, and wherein at least one object recognition template of the subset of one or more remaining matching object recognition templates has a respective set of structure description information that is determined by the at least one processing circuit to satisfy the predefined template matching condition when compared against the 3D image information, and wherein the at least one processing circuit is configured to generate the safety volume list based on the at least one object recognition template.

Embodiment 12 includes the computing system of any one of embodiments 8-11. In this embodiment, the matching object recognition template associated with the primary detection hypothesis is a first matching object recognition template among the set of one or more matching object recognition templates. In this embodiment, the at least one processing circuit is configured, when the set of one or more matching object recognition templates are part of a plurality of object recognition templates stored in a template storage space, to: determine whether the plurality of object recognition templates has, in addition to the first matching object recognition template, at least one object recognition template which satisfies a predefined template similarity condition when compared against the first matching object recognition template; and in response to a determination that the plurality of object recognition templates includes the at least one object recognition template which satisfies the predefined template similarity condition when compared against the first matching object recognition template, generate the safety volume list based on the at least one object recognition template.

Embodiment 13 includes the computing system of any one of embodiments 1-12. In this embodiment, the primary candidate region represents a first manner of aligning the image information with the matching object recognition template associated with the primary detection hypothesis, and wherein the at least one processing circuit is configured to include in the safety volume list another candidate region which represents a second manner of aligning the image information with the matching object recognition template.

Embodiment 14 includes the computing system of any one of embodiments 1-13. In this embodiment, the at least one processing circuit is configured to: identify a first set of image corners or a first set of image edges represented by the image information; identify a first image region, which is an image region located between the first set of image corners or the first set of image edges, wherein the matching object recognition template associated with the primary detection hypothesis is determined by the at least one processing circuit to satisfy the predefined matching condition when compared against the first image region, the matching object recognition template being a first matching object recognition template among the set of one or more matching object recognition templates; identify, based on the image information, a second set of image corners or a second set of image edges, wherein the second set of image corners include at least one image corner which is part of the first set of image corners and include at least one image corner which is outside of the first image region, and wherein the second set of image edges include at least one image edge which is part of the first set of image edges and include at least one image edge which is outside the first image region; identify a second image region, which is an image region located between the second set of image corners or the second set of image edges, wherein the second image region extends beyond the first image region, and wherein the set of one or more matching object recognition templates includes a second matching object recognition template, which is determined by the at least one processing circuit to satisfy the predefined template matching condition when compared against the second image region. In this embodiment, the at least one processing circuit is configured to generate the primary candidate region based on the first matching object recognition template, and to generate at least one candidate region in the safety volume list based on the second matching object recognition template.

Embodiment 15 includes the computing system of any one of embodiments 1-14. In this embodiment, the at least one processing circuit is configured, in response to a determination that the image information has the portion representing the unmatched region, to generate a new object recognition template based on the unmatched region.

Embodiment 16 includes the computing system of any one of embodiments 1-15. In this embodiment, the primary candidate region is a region representing a first orientation for an object shape described by the matching object recognition template associated with the primary detection hypothesis, and wherein the at least one processing circuit is configured to add, to the safety volume list, a candidate region which represents a second orientation for the object shape, the second orientation being perpendicular to the first orientation.

Embodiment 17 includes the computing system of any one of embodiments 1-16. In this embodiment, the at least one processing circuit is configured to add, to the safety volume list, a candidate region which represents a predefined maximum object height.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. For instance, the embodiment(s) discussed with respect to FIGS. 6A-6J may be combined with the embodiment(s) of FIGS. 7A-7G, FIGS. 8A-8G, FIGS. 9A-9F, FIGS. 10A-10H, FIGS. 11A-11E, FIGS. 12A-12H, and FIGS. 13A-13B. In another example, the embodiments of FIGS. 6D, 6E, 7B, 7E, 8G, and 9F may be combined in various ways. It should also be understood that, depending on the example, certain acts or events of any of the processes or methods described herein may be performed in a different sequence, may be added, merged, or left out altogether (e.g., all described acts or events may not be necessary to carry out the methods or processes). For example, method 4000 may be modified by omitting various steps, modifying various steps, or performing additional steps (e.g., omitting step 4006). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:
1. A computing system comprising:
a communication interface configured to communicate with a robot and with a camera having a camera field of view; and
at least one processing circuit configured, when an object is or has been in the camera field of view, to:
receive image information representing the object, wherein the image information is generated by the camera;
identify a set of one or more matching object recognition templates, which are one or more object recognition templates that satisfy a predefined template matching condition when compared against the image information, wherein the set of one or more matching object recognition templates are associated with a set of one or more detection hypotheses, which are one or more respective estimates on which object or object type is represented by the image information;
select, as a primary detection hypothesis, a detection hypothesis from among the set of one or more detection hypotheses, wherein the primary detection hypothesis is associated with a matching object recognition template of the set of one or more matching object recognition templates, wherein the detection hypothesis that is selected as the primary detection hypothesis has a confidence value which is highest among a set of one or more respective confidence values, wherein the set of one or more respective confidence values are associated with the set of one or more detection hypotheses, and indicate respective degrees by which the image information matches the set of one or more matching object recognition templates associated with the set of one or more detection hypotheses;
generate, as a primary candidate region, a candidate region which estimates object boundary locations for the object or estimates which locations in the camera field of view are occupied by the object, wherein the primary candidate region is generated based on the matching object recognition template associated with the primary detection hypothesis;
determine, in addition to the matching object recognition template associated with the primary detection hypothesis, at least one of:
(i) whether the set of one or more matching object recognition templates has a subset of one or more remaining matching object recognition templates that also satisfy the predefined template matching condition when compared against the image information, or
(ii) whether the image information has a portion representing an unmatched region which is adjacent to the primary candidate region and which fails to satisfy the predefined template matching condition;
generate a safety volume list in response to a determination that there is the subset of one or more remaining matching object recognition templates, or that the image information has the portion representing the unmatched region,
wherein the safety volume list is a list that describes at least one of:
(i) the unmatched region, or
(ii) one or more additional candidate regions that also estimate object boundary locations for the object or estimate which locations are occupied by the object, wherein the one or more additional candidate regions are generated based on the subset of one or more remaining matching object recognition templates; and
perform motion planning based on the primary candidate region and based on the safety volume list, wherein the motion planning is for robot interaction between the robot and the object for gripping or picking up the object and moving the object from the occupied location of the object to a destination location.

2. The computing system of claim 1, wherein the at least one processing circuit is configured to determine a bounding region which encompasses the primary candidate region and at least one of: (i) the one or more additional candidate regions or (ii) the unmatched region, wherein performing the motion planning includes determining a trajectory associated with a robot end effector apparatus based on the bounding region.

3. The computing system of claim 2, wherein performing the motion planning includes determining robot gripping motion based on the primary candidate region, and determining the trajectory based on the bounding region.

4. The computing system of claim 1, wherein the set of one or more detection hypotheses include, in addition to the primary detection hypothesis, a subset of one or more remaining detection hypotheses which are associated with the subset of one or more remaining matching object recognition templates, wherein the at least one processing circuit is configured, for each detection hypothesis of the subset of one or more remaining detection hypotheses, to:
determine whether a respective confidence value associated with the detection hypothesis is within a predefined confidence similarity threshold relative to the confidence value associated with the primary detection hypothesis,
wherein the at least one processing circuit is configured to include, in the safety volume list, a respective candidate region associated with the detection hypothesis in response to a determination that the respective confidence value associated with the detection hypothesis is within the predefined confidence similarity threshold relative to the confidence value associated with the primary detection hypothesis, such that the respective candidate region is part of the one or more additional regions of the safety volume list.

5. The computing system of claim 4, wherein each candidate region of the one or more additional candidate regions in the safety volume list is associated with a respective detection hypothesis which has a confidence value that is within the predefined confidence similarity threshold relative to the confidence value associated with the primary detection hypothesis.

6. The computing system of claim 4, wherein each candidate region of the one or more additional candidate regions in the safety volume list is associated with a respective detection hypothesis which has a confidence value that is greater than or equal to a predefined template matching threshold.

7. The computing system of claim 1, wherein the subset of one or more remaining matching object recognition templates include a plurality of matching object recognition templates associated with a plurality of respective candidate regions, wherein the at least one processing circuit is configured, for each candidate region of the plurality of candidate regions, to:
- determine a respective amount of overlap between the candidate region and the primary candidate region;
- determine whether the respective amount of overlap is equal to or exceeds a predefined overlap threshold,
- wherein the at least one processing circuit is configured to include the candidate region in the safety volume list in response to a determination that the amount of overlap is equal to or exceeds the predefined overlap threshold, such that the candidate region is part of the one or more additional candidate regions of the safety volume list.

8. The computing system of claim 1, wherein the image information includes 2D image information, and wherein the matching object recognition template associated with the primary detection hypothesis includes a set of visual description information which is determined by the at least one processing circuit to satisfy the predefined template matching condition when compared against the 2D image information.

9. The computing system of claim 8, wherein at least one matching object recognition template of the subset of one or more remaining matching object recognition templates has a respective set of visual description information that is also determined by the at least one processing circuit to satisfy the predefined template matching condition when compared against the 2D image information, and wherein the at least one processing circuit is configured to generate the safety volume list based on the at least one matching object recognition template.

10. The computing system of claim 9, wherein the matching object recognition template associated with the primary detection hypothesis includes a respective set of structure description information that indicates a first object size, and wherein the at least one matching object recognition template includes a respective set of structure description information that indicates a second object size different than the first object size.

11. The computing system of claim 8, wherein the image information further includes 3D image information, and wherein at least one object recognition template of the subset of one or more remaining matching object recognition templates has a respective set of structure description information that is determined by the at least one processing circuit to satisfy the predefined template matching condition when compared against the 3D image information, and wherein the at least one processing circuit is configured to generate the safety volume list based on the at least one object recognition template.

12. The computing system of claim 8, wherein the matching object recognition template associated with the primary detection hypothesis is a first matching object recognition template among the set of one or more matching object recognition templates,
wherein the at least one processing circuit is configured, when the set of one or more matching object recognition templates are part of a plurality of object recognition templates stored in a template storage space, to:
determine whether the plurality of object recognition templates has, in addition to the first matching object recognition template, at least one object recognition template which satisfies a predefined template similarity condition when compared against the first matching object recognition template; and
in response to a determination that the plurality of object recognition templates includes the at least one object recognition template which satisfies the predefined template similarity condition when compared against the first matching object recognition template, generate the safety volume list based on the at least one object recognition template.

13. The computing system of claim 1, wherein the primary candidate region represents a first manner of aligning the image information with the matching object recognition template associated with the primary detection hypothesis, and
wherein the at least one processing circuit is configured to include in the safety volume list another candidate region which represents a second manner of aligning the image information with the matching object recognition template.

14. The computing system of claim 1, wherein the at least one processing circuit is configured to:
identify a first set of image corners or a first set of image edges represented by the image information;
identify a first image region, which is an image region located between the first set of image corners or the first set of image edges, wherein the matching object recognition template associated with the primary detection hypothesis is determined by the at least one processing circuit to satisfy the predefined matching condition when compared against the first image region, the matching object recognition template being a first matching object recognition template among the set of one or more matching object recognition templates;
identify, based on the image information, a second set of image corners or a second set of image edges, wherein the second set of image corners include at least one image corner which is part of the first set of image corners and include at least one image corner which is outside of the first image region, and wherein the second set of image edges include at least one image edge which is part of the first set of image edges and include at least one image edge which is outside the first image region;
identify a second image region, which is an image region located between the second set of image corners or the second set of image edges, wherein the second image region extends beyond the first image region, and wherein the set of one or more matching object recognition templates includes a second matching object recognition template, which is determined by the at least one processing circuit to satisfy the predefined template matching condition when compared against the second image region,
wherein the at least one processing circuit is configured to generate the primary candidate region based on the first matching object recognition template, and to generate at least one candidate region in the safety volume list based on the second matching object recognition template.

15. The computing system of claim 1, wherein the at least one processing circuit is configured, in response to a determination that the image information has the portion representing the unmatched region, to generate a new object recognition template based on the unmatched region.

16. The computing system of claim 1, wherein the primary candidate region is a region representing a first orientation for an object shape described by the matching object recognition template associated with the primary detection hypothesis, and wherein the at least one processing circuit is configured to add, to the safety volume list, a candidate region which represents a second orientation for the object shape, the second orientation being perpendicular to the first orientation.

17. The computing system of claim 1, wherein the at least one processing circuit is configured to add, to the safety volume list, a candidate region which represents a predefined maximum object height.

18. A non-transitory computer-readable medium having instructions that, when executed by at least one processing circuit of a computing system, causes the at least one processing circuit to:
receive image information by the at least one processing circuit of the computing system, wherein the computing system is configured to communicate with: (i) a robot, and (ii) a camera having a camera field of view, wherein the image information is for representing an object in the camera field of view, and is generated by the camera;
identify a set of one or more matching object recognition templates, which are one or more object recognition templates that satisfy a predefined template matching condition when compared against the image information, wherein the set of one or more matching object recognition templates are associated with a set of one or more detection hypotheses, which are one or more respective estimates on which object or object type is represented by the image information;
select, as a primary detection hypothesis, a detection hypothesis from among the set of one or more detection hypotheses, wherein the primary detection hypothesis is associated with a matching object recognition template of the set of one or more matching object recognition templates, wherein the detection hypothesis that is selected as the primary detection hypothesis has a confidence value which is highest among a set of one or more respective confidence values, wherein the set of one or more respective confidence values are associated with the set of one or more detection hypotheses, and indicate respective degrees by which the image information matches the set of one or more matching object recognition templates associated with the set of one or more detection hypotheses;
generate, as a primary candidate region, a candidate region which estimates object boundary locations for the object or estimates which locations in the camera field of view are occupied by the object, wherein the primary candidate region is generated based on the matching object recognition template associated with the primary detection hypothesis;
determine, in addition to the matching object recognition template associated with the primary detection hypothesis, at least one of:
(i) whether the set of one or more matching object recognition templates has a subset of one or more remaining matching object recognition templates that also satisfy the predefined template matching condition when compared against the image information, or
(ii) whether the image information has a portion representing an unmatched region which is adjacent to the primary candidate region and which fails to satisfy the predefined template matching condition;
generate a safety volume list in response to a determination that there is the subset of one or more remaining matching object recognition templates, or that the image information has the portion representing the unmatched region,
wherein the safety volume list is a list that describes at least one of:
(i) the unmatched region, or
(ii) one or more additional candidate regions that also estimate object boundary locations for the object or estimate which locations are occupied by the object, wherein the one or more additional candidate regions are generated based on the subset of one or more remaining matching object recognition templates; and
perform motion planning based on the primary candidate region and based on the safety volume list, wherein the motion planning is for robot interaction between the robot and the object for gripping or picking up the object and moving the object from the occupied location of the object to a destination location.

19. The non-transitory computer-readable medium of claim 18, wherein the instructions, when executed by the at least one processing circuit, cause the at least one processing circuit to determine a bounding region which encompasses the primary candidate region and at least one of: (i) the one or more additional candidate regions or (ii) the unmatched region, and
wherein the instructions further cause the at least one processing circuit to perform the motion planning by determining a trajectory associated with a robot end effector apparatus based on the bounding region.

20. A method performed by a computing system, the method comprising:
receiving image information by the computing system, wherein the computing system is configured to communicate with: (i) a robot, and (ii) a camera having a camera field of view, wherein the image information is for representing an object in the camera field of view, and is generated by the camera;
identifying a set of one or more matching object recognition templates, which are one or more object recognition templates that satisfy a predefined template matching condition when compared against the image information, wherein the set of one or more matching object recognition templates are associated with a set of one or more detection hypotheses, which are one or more respective estimates on which object or object type is represented by the image information;
selecting, as a primary detection hypothesis, a detection hypothesis from among the set of one or more detection hypotheses, wherein the primary detection hypothesis is associated with a matching object recognition template of the set of one or more matching object recognition templates, wherein the detection hypothesis that is selected as the primary detection hypothesis has a confidence value which is highest among a set of one or more respective confidence values, wherein the set of one or more respective confidence values are associated with the set of one or more detection hypotheses, and indicate respective degrees by which the image information matches the set of one or more matching object recognition templates associated with the set of one or more detection hypotheses;
generating, as a primary candidate region, a candidate region which estimates object boundary locations for the object or estimates which locations in the camera field of view are occupied by the object, wherein the primary candidate region is generated based on the matching object recognition template associated with the primary detection hypothesis;

determining, in addition to the matching object recognition template associated with the primary detection hypothesis, at least one of:
(i) that the set of one or more matching object recognition templates has a subset of one or more remaining matching object recognition templates that also satisfy the predefined template matching condition when compared against the image information, or
(ii) that the image information has a portion representing an unmatched region which is adjacent to the primary candidate region and which fails to satisfy the predefined template matching condition;
generating a safety volume list, which is a list that describes at least one of:
(i) the unmatched region, or
(ii) one or more additional candidate regions that also estimate object boundary locations for the object or estimate which locations are occupied by the object, wherein the one or more additional candidate regions are generated based on the subset of one or more remaining matching object recognition templates; and
performing motion planning based on the primary candidate region and based on the safety volume list, wherein the motion planning is for robot interaction between the robot and the object for gripping or picking up the object and moving the object from the occupied location of the object to a destination location.

21. The computing system of claim 1, wherein the at least one processing circuit is further configured to:
determine, in addition to the matching object recognition template associated with the primary detection hypothesis, both:
(i) whether the set of one or more matching object recognition templates has the subset of one or more remaining matching object recognition templates that also satisfy the predefined template matching condition when compared against the image information, and
(ii) whether the image information has the portion representing the unmatched region which is adjacent to the primary candidate region and which fails to satisfy the predefined template matching condition; and
generate the safety volume list in response to a determination that there is the subset of one or more remaining matching object recognition templates, and that the image information has the portion representing the unmatched region.

22. The computing system of claim 21, wherein the safety volume list describes both the unmatched region and the one or more additional candidate regions that also includes an estimate of the object boundary locations for the object or an estimate of which locations are occupied by the object.

23. The computing system of claim 22, wherein the one or more additional candidate regions include both the estimate of the object boundary locations for the object and the estimate of which locations are occupied by the object.

* * * * *